United States Patent
Ran et al.

(10) Patent No.: US 12,551,576 B2
(45) Date of Patent: Feb. 17, 2026

(54) CHEMILUMINESCENT PROBES

(71) Applicant: The General Hospital Corporation, Boston, MA (US)

(72) Inventors: Chongzhao Ran, Winchester, MA (US); Jing Yang, Melrose, MA (US); Wei Yin, Melrose, MA (US); Biyue Zhu, Malden, MA (US); Fan Yang, Melrose, MA (US)

(73) Assignee: The General Hospital Corporation, Boston, MA (US)

(*) Notice: Subject to any disclaimer, the term of this patent is extended or adjusted under 35 U.S.C. 154(b) by 799 days.

(21) Appl. No.: 17/796,464

(22) PCT Filed: Jan. 29, 2021

(86) PCT No.: PCT/US2021/015765
§ 371 (c)(1),
(2) Date: Jul. 29, 2022

(87) PCT Pub. No.: WO2021/155190
PCT Pub. Date: Aug. 5, 2021

(65) Prior Publication Data
US 2023/0346984 A1 Nov. 2, 2023

Related U.S. Application Data

(60) Provisional application No. 62/968,858, filed on Jan. 31, 2020.

(51) Int. Cl.
*A61K 49/00* (2006.01)
*A61B 5/00* (2006.01)
*G01N 33/68* (2006.01)

(52) U.S. Cl.
CPC ........ *A61K 49/0021* (2013.01); *A61B 5/0071* (2013.01); *A61K 49/0052* (2013.01); *G01N 33/6896* (2013.01); *G01N 2800/2814* (2013.01)

(58) Field of Classification Search
None
See application file for complete search history.

(56) References Cited

U.S. PATENT DOCUMENTS

| | | | |
|---|---|---|---|
| 5,304,121 A | 4/1994 | Sahatjian | |
| 5,886,026 A | 3/1999 | Hunter et al. | |
| 6,099,562 A | 8/2000 | Ding et al. | |
| 6,803,031 B2 | 10/2004 | Rabinowitz et al. | |
| 2005/0080260 A1 | 4/2005 | Mills et al. | |
| 2007/0258887 A1* | 11/2007 | Tamagnan | A61K 31/424 548/150 |
| 2011/0201808 A1 | 8/2011 | Tanifuji et al. | |

FOREIGN PATENT DOCUMENTS

| | | |
|---|---|---|
| WO | WO 2010/099199 | 9/2010 |
| WO | WO 2012/121746 | 9/2012 |

OTHER PUBLICATIONS

Ahmed, "Sample preparation and fractionation for proteome analysis and cancer biomarker discovery by mass spectrometry," J Sep Sci., Mar. 2009, 32(5-6):771-798.
Aoyagi et al., "Aβ and tau prion-like activities decline with longevity in the Alzheimer's disease human brain," Sci Transl Med., May 2019, 11(490):eaat8462, 13 pages.
Atarashi et al., "Real-time quaking-induced conversion: A highly sensitive assay for prion detection," Prion, Jul.-Sep. 2011, 5(3):150-153.
Atarashi et al., "Ultrasensitive human prion detection in cerebrospinal fluid by real-time quaking-induced conversion," Nat Med., Feb. 2011, 17(2):175-178, 35 pages.
Bajar et al., "A Guide to Fluorescent Protein FRET Pairs," Sensors, Sep. 2016, 16(9):1488, 24 pages.
Biancalana and Koide, "Molecular mechanism of Thioflavin-T binding to amyloid fibrils," Biochim Biophys Acta., Jul. 2010, 1804(7):1405-1412, 17 pages.
Blume et al., "Rapid, deep and precise profiling of the plasma proteome with multi-nanoparticle protein corona," Nat Commun., Jul. 2020, 11:3662, 14 pages.
Bolognesi et al., "From companion diagnostics to theranostics: A new avenue for Alzheimer's disease?," Journal of Medicinal Chemistry, Apr. 2016, 59(17):7759-7770, 42 pages.
Bruggink et al., "Methods for analysis of amyloid-β aggregates," J Alzheimers Dis., 2012, 28(4):735-758.
Carrell and Gooptu, "Conformational changes and disease—serpins, prions and Alzheimer's," Curr Opin Struct Biol., Dec. 1998, 8(6):799-809.
Carrell and Lomas, "Conformational disease," Lancet., Jul. 1997, 350(9071):134-138.
Chen et al., "N,O-benzamide difluoroboron complexes as near-infrared probes for the detection of β-amyloid and tau fibrils," Chem Commun (Camb), Jul. 2020, 56(53):7269-7272, 4 pages.
Chou and Fasman, "Conformational parameters for amino acids in helical, beta-sheet, and random coil regions calculated from proteins," Biochemistry, Jan. 1974, 13(2):211-222.
Cristóvão et al., "Biophysical and spectroscopic methods for monitoring protein misfolding and amyloid aggregation," Methods Mol Biol., 2019, 1873:3-18.

(Continued)

Primary Examiner — Michael G. Hartley
Assistant Examiner — Samantha L Mejias
(74) Attorney, Agent, or Firm — Fish & Richardson P.C.

(57) ABSTRACT

The present application provides a compound of Formula (I): A-L-B (I), or a pharmaceutically acceptable salt thereof, wherein A, L, and B are as described herein. Compositions comprising the compounds of Formula (I) (and optionally a fluorescent probe) are also provided, as well as the methods of (i) using the compound of formula (I) for identifying a misfolding-prone or an aggregating-prone protein in a sample, (ii) determining concentration of a misfolding-prone or an aggregating-prone protein in a sample, (iii) imaging an organ or tissue comprising a misfolding-prone or an aggregating-prone protein in a subject, (iv) diagnosing or monitoring treatment of a disease or condition associated with a misfolding-prone or an aggregating-prone protein in a subject, and (v) diagnosing a disease or condition characterized by accumulation of misfolding-prone or aggregation-prone peptides or proteins in a blood of a subject.

8 Claims, 47 Drawing Sheets

(56) References Cited

OTHER PUBLICATIONS

De la Torre et al., "Serum levels of immunoglobulins and severity of community-acquired pneumonia," BMJ Open Respir Res., Nov. 2016, 3(1):e000152, 7 pages.
Doan et al., "Objective assessment of stored blood quality by deep learning," Proc Natl Acad Sci U S A, Sep. 2020, 117(35):21381-21390.
Doody et al., "Phase 3 trials of solanezumab for mild-to-moderate Alzheimer's disease," N Engl J Med., Jan. 2014, 370(4):311-321.
Eraña, "The Prion 2018 round tables (II): Aβ, tau, α-synuclein . . . are they prions, prion-like proteins, or what?," Prion., Jan. 2019, 13(1):41-45.
Fehlmann et al., "Common diseases alter the physiological age-related blood microRNA profile," Nat Commun., Nov. 2020, 11(1):5958, 14 pages.
Fraser, "Prions and prion-like proteins," J Biol Chem., Jul. 2014, 289(29):19839-19840.
Frost and Diamond, "Prion-like mechanisms in neurodegenerative diseases," Nat Rev Neurosci., Mar. 2010, 11(3):155-159, 5 pages.
Fu et al., "Fluorescent Imaging of Amyloid-β Deposits in Brain: An Overview of Probe Development and a Highlight of the Applications for In Vivo Imaging," Curr Med Chem, 2018, 25(23):2736-2759.
Gibbs et al., "A rationally designed humanized antibody selective for amyloid beta oligomers in Alzheimer's disease, " Sci Rep., Jul. 2019, 9(1):9870, 14 pages.
Goedert, "Neurodegeneration. Alzheimer's and Parkinson's diseases: The prion concept in relation to assembled Aβ, tau, and a-synuclein," Science, Aug. 2015, 349(6248):1255555.
Gomez-Gutierrez and Morales, "The prion-like phenomenon in Alzheimer's disease: Evidence of pathology transmission in humans," PLoS Pathog., Oct. 2020, 16:e1009004, 6 pages.
Gregoire et al., "Techniques for monitoring protein misfolding and aggregation in vitro and in living cells, " Korean J Chem Eng., Jun. 2012, 29(6):693-702, 21 pages.
Gyasi et al., "Biological applications of near infrared fluorescence dye probes in monitoring Alzheimer's disease," Eur. J Med Chem., Feb. 2020, 187(1):111982, 16 pages.
Halliday et al., "Prions: Generation and spread versus neurotoxicity," J Biol Chem., Jul. 2014, 289(29):19862-19868.
He et al., "Detection of IgG aggregation by a high throughput method based on extrinsic fluorescence," J Pharm Sci., Jun. 2010, 99(6):2598-2608.
Hong et al., "Near-infrared fluorophores for biomedical imaging, " Nature Biomedical Engineering, Jan. 2017, 1(0010): 22 pages.
Illum, "Is nose-to-brain transport of drugs in man a reality?," J Pharm Pharmacol, Jan. 2004, 56(1):3-17.
Illum, "Transport of drugs from the nasal cavity to the central nervous system," Eur J Pharm Sci, Jul. 2000, 11(1):1-18.
Imbimbo et al., "Solanezumab for the treatment of mild-to-moderate Alzheimer's disease, " Expert Rev Clin Immunol., Feb. 2012, 8(2):135-149.
International Preliminary Report on Patentability in International Appln. No. PCT/US2021/015765, mailed Aug. 11, 2022, 6 pages.
International Search Report and Written Opinion in International Appln. No. PCT/US2021/015765, mailed May 24, 2021, 8 pages.
Kayed et al., "Conformation dependent monoclonal antibodies distinguish different replicating strains or conformers of prefibrillar Aβ oligomers," Mol Neurodegener., Dec. 2010, 5:57, 10 pages.
Kim et al., "Tailoring Hydrophobic Interactions between Probes and Amyloid-beta Peptides for Fluorescent Monitoring of Amyloid-beta Aggregation," ACS Omega, May 2018, 5:5141-5154.
Kopito and Ron, "Conformational disease," Nat Cell Biol., Nov. 2000, 2(11):E207-209.
Levine, "Quantification of beta-sheet amyloid fibril structures with thioflavin T," Methods Enzymol., 1999, 309:274-284.
Levites et al., "A human monoclonal IgG that binds aβ assemblies and diverse amyloids exhibits anti-amyloid activities in vitro and in vivo," J Neurosci., Apr. 2015, 35(16):6265-6276.
Liu-Seifert et al., "Delayed-start analysis: Mild Alzheimer's disease patients in solanezumab trials, 3.5 years," Alzheimer's & Dementia, Jul. 2015, 1(2):111-121.
Makarava et al., "Methods of protein misfolding cyclic amplification," Methods Mol Biol., 2017, 1658:169-183, 16 pages.
Marciniuk et al., "Evidence for prion-like mechanisms in several neurodegenerative diseases: Potential implications for immunotherapy," Clin Dev Immunol., 2013, 2013:473706, 20 pages.
Marrero-Winkens et al., "From seeds to fibrils and back: Fragmentation as an overlooked step in the propagation of prions and prion-like proteins," Biomolecules, Sep. 2020, 10(9):1305, 20 pages.
Mcdougal et al., "Binding of immunoglobulin G aggregates and immune complexes in human sera to Staphylococci containing protein A," J Clin Invest., Apr. 1979, 63(4):627-636.
Menni et al., "Circulating proteomic signatures of chronological age," J Gerontol A Biol Sci Med Sci., Jul. 2015, 70(7):809-816.
Minor and Kim, "Measurement of the beta-sheet-forming propensities of amino acids," Nature, Feb. 1994, 367(6464):660-663.
Mostany and Portera-Cailliau, "A method for 2-photon imaging of blood flow in the neocortex through a cranial window," J. Vis. Exp., Feb. 2008, 12:678, 2 pages.
Nakamura et al., "High performance plasma amyloid-β biomarkers for Alzheimer's disease," Nature, Feb. 2018, 554(7691):249-254, 24 pages.
Nowick, "Exploring beta-sheet structure and interactions with chemical model systems," Acc Chem Res., Oct. 2008, 41(10):1319-1330, 27 pages.
Oshima et al., "Extreme Fluorescence Sensitivity of Some Aniline Derivatives to Aqueous and Nonaqueous Environments: Mechanistic Study and Its Implication as a Fluorescent Probe," J. Phys. Chem. A, 2006, 110:4629-4637.
Park et al., "A Pyridazine-Based Fluorescent Probe Targeting Aβ Plaques in Alzheimer's Disease," Journal of Analytical Methods in Chemistry, Feb. 2018, 2018:1651989, 6 pages.
Park et al., "Visualizing Alzheimer's Disease Mouse Brain with Multispectral Optoacoustic Tomography using a Fluorescent probe, CDnir7," Sci Rep, Aug. 2019, 9:12052, 8 pages.
Peccati et al., "Binding of thioflavin T and related probes to polymorphic models of amyloid-β fibrils," J Phys Chem B, Sep. 2017, 121(38):8926-8934, 29 pages.
Prusiner, "Novel proteinaceous infectious particles cause scrapie," Science, Apr. 1982, 216(4542):136-144.
Ran et al., "Design, synthesis, and testing of difluoroboron-derivatized curcumins as near-infrared probes for in vivo detection of amyloid-beta deposits," J Am Chem Soc., Oct. 2009, 131(42):15257-15261, 11 pages.
Saborio and Soto, "Sensitive detection of pathological prion protein by cyclic amplification of protein misfolding," Nature, Jun. 2001, 411(6839):810-813.
Sasaki et al., "Age-related increase of reactive oxygen generation in the brains of mammals and birds: Is reactive oxygen a signaling molecule to determine the aging process and life span?," Geriatr Gerontol Int, 2010, 10(Suppl 1):S10-S24.
Schindler et al., "High-precision plasma β-amyloid 42/40 predicts current and future brain amyloidosis," Neurology, Oct. 2019, 93(17):e1647-e1659.
Schneider, "A resurrection of aducanumab for Alzheimer's disease," Lancet Neurol., Feb. 2020, 19(2):111-112.
Schwab and Nimmerjahn, "Intravenous immunoglobulin therapy: How does IgG modulate the immune system?," Nat Rev Immunol., Mar. 2013, 13(3):176-189.
Selkoe, "Alzheimer disease and aducanumab: Adjusting our approach," Nat Rev Neurol., Jul. 2019, 15(7):365-366.
Sevigny et al., "The antibody aducanumab reduces Aβ plaques in Alzheimer's disease," Nature, Sep. 2016, 537(7618):50-56, 21 pages.
Smith et al., "A thermodynamic scale for the beta-sheet forming tendencies of the amino acids," Biochemistry, May 1994, 33(18):5510-5517.
Sorbi et al., "The ratio of aspartate aminotransferase to alanine aminotransferase: Potential value in differentiating nonalcoholic steatohepatitis from alcoholic liver disease," Am J Gastroenterol., Apr. 1999, 94(4):1018-1022.

(56) References Cited

OTHER PUBLICATIONS

Soto and Pritzkow, "Protein misfolding, aggregation, and conformational strains in neurodegenerative diseases," Nature Neuroscience, Oct. 2018, 21(10):1332-1340, 25 pages.
Sperling et al., "Amyloid-related imaging abnormalities (ARIA) in patients with Alzheimer's disease treated with bapineuzumab: A retrospective analysis," Lancet Neurology, Mar. 2012, 11(3):241-249, 22 pages.
Sun et al., "Kinetic analysis of the multistep aggregation pathway of human transthyretin," Proc Natl Acad Sci U S A, Jul. 2018, 115(27):E6201-E6208.
Teranishi, "Luminescence of imidazo[1,2-a]pyrazin-3(7H)-one compounds," Bioorganic Chemistry, Feb. 2007, 35(1):82-111.
Tong et al., "Near-infrared fluorescent probes for imaging of amyloid plaques in Alzheimer's disease," Acta Pharm Sin B, Jan. 2015, 5(1):25-33.
Tuite and Serio, "The prion hypothesis: From biological anomaly to basic regulatory mechanism," Nat Rev Mol Cell Biol., Dec. 2010, 11(12):823-833, 25 pages.
Ueda et al., "Application of FRET probes in the analysis of neuronal plasticity," Front Neural Circuits, Oct. 2013, 7:163, 19 pages.
Wallin et al., "Serum proteomic analysis of a pre-symptomatic multiple sclerosis cohort," Eur J Neurol., Mar. 2015, 22(3):591-599, 9 pages.
Wang et al., "Robust amyloid clearance in a mouse model of Alzheimer's disease provides novel insights into the mechanism of amyloid-β immunotherapy," The Journal of Neuroscience, Mar. 2011, 31(11):4124-4136.
Wester et al., "Supramolecular exchange among assemblies of opposite charge leads to hierarchical structures, " J Am Chem Soc., Jun. 2020, 142(28):12216-12225.
Williams et al., "Plasma protein patterns as comprehensive indicators of health," Nat Med., Dec. 2019, 25(12):1851-1857, 31 pages.
Wu and Brand, "Resonance Energy Transfer: Methods and Applications," Analytical Biochemistry, 1994, 218(1):1-13.
Yang et al., "Imaging hydrogen peroxide in Alzheimer's disease via cascade signal amplification," Scientific Reports, Oct. 2016, 6:35613, 8 pages.
Yang et al., "Turn-on chemiluminescence probes and dual-amplification of signal for detection of amyloid beta species in vivo," Nature Communications, Aug. 2020, 11:1-14.
Zhang et al., "A bifunctional curcumin analogue for two-photon imaging and inhibiting crosslinking of amyloid beta in Alzheimer's disease," Chem Commun., Oct. 2014, 50(78):11550-11553, 10 pages.
Zhang et al., "Near-infrared fluorescence molecular imaging of amyloid beta species and monitoring therapy in animal models of Alzheimer's disease," Proc Natl Acad Sci USA, Jul. 2015, 112(31):9734-9739.
Zhou et al., "Environment-sensitive near-infrared probe for fluorescent discrimination of Aβ and tau fibrils in AD brain," Journal of Medicinal Chemistry, Jul. 2019, 62(14):6694-6704.

\* cited by examiner

ADLumin-1, n = 1;
ADLumin-2, n = 2.

CHEMILUMINESCENT PROBES

CLAIM OF PRIORITY

This application is a U.S. National Phase Application under 35 U.S.C. § 371 of International Patent Application No. PCT/US2021/015765, filed on Jan. 29, 2021, which claims priority to U.S. Patent Application Ser. No. 62/968,858, filed on Jan. 31, 2020, the entire contents of which are hereby incorporated by reference.

TECHNICAL FIELD

This invention relates to chemiluminescence probes and in particular to the application of chemiluminescence resonance energy transfer (CRET) for detection of a misfolding-prone or an aggregating-prone protein (e.g., amyloid protein).

BACKGROUND

Optical imaging has been widely applied in preclinical and clinical studies. Among the optical imaging modalities, near infrared fluorescence imaging (NIRF) is one the most used technologies for preclinical investigations. However, NIRF imaging has several intrinsic limitations that are caused by excitation light, which is needed as input light to excite the imaging probe.

SUMMARY

The present application provides a compound of Formula (I):

$$A\text{-}L\text{-}B \qquad (I),$$

or a pharmaceutically acceptable salt thereof, wherein A, L, and B are as described herein. Compositions comprising the compounds of Formula (I) (and optionally a fluorescent probe) are also provided, as well as the methods of (i) using the compound of formula (I) (and optionally a fluorescent probe) for identifying a misfolding-prone or an aggregating-prone protein in sample, (ii) determining concentration of a misfolding-prone or an aggregating-prone protein in a sample using the compound of formula (I) (and optionally a fluorescent probe), (iii) imaging an organ or tissue comprising a misfolding-prone or an aggregating-prone protein of a subject using the compound of formula (I) (and optionally a fluorescent probe), (iv) diagnosing a disease or condition associated with a misfolding-prone or an aggregating-prone protein in a subject using the compound of formula (I) (and optionally a fluorescent probe), (v) diagnosing a disease or condition characterized by accumulation of misfolding-prone or aggregation-prone peptides or proteins in a blood of a subject using the compound of Formula (I) (and optionally a fluorescent probe), and (vi) monitoring treatment of a disease or condition associated with a misfolding-prone or an aggregating-prone protein in a subject using the compound of formula (I) (and optionally a fluorescent probe).

Unless otherwise defined, all technical and scientific terms used herein have the same meaning as commonly understood by one of ordinary skill in the art to which the present application belongs. Methods and materials are described herein for use in the present application; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the present application will be apparent from the following detailed description and figures, and from the claims.

DETAILED DESCRIPTION

Figure 1A:
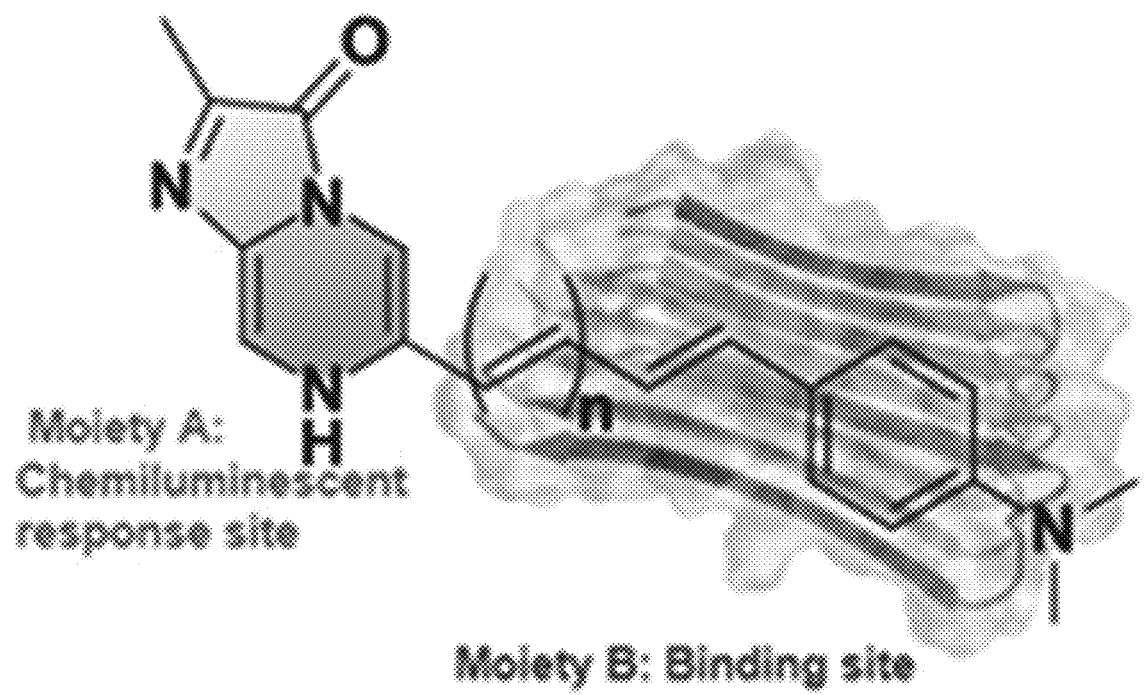
FIG. 1A contains chemical structures of the designed chemiluminescent probes.
Figure 1B:
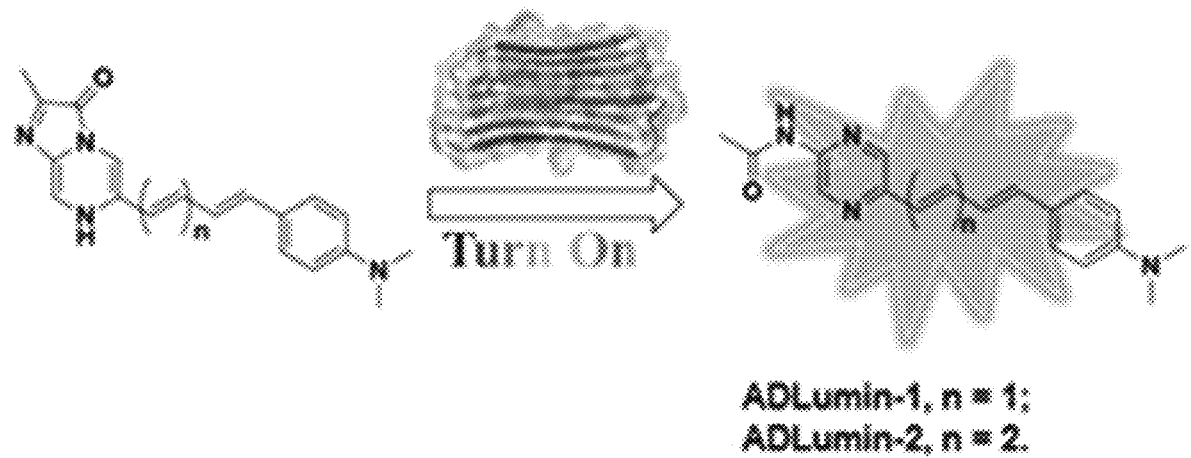
FIG. 1B contains a diagram for illustrating "turn-on" with ADLumin-X (X=-1 and -2) in the presence of Aβs.

Fluorescence and chemiluminescence imaging are the most widely applied optical emissive imaging methods in biomedical research. "Smart" (turn-on) fluorescence imaging has been routinely used for in vitro, cellular and in vivo imaging; however, smart chemiluminescence imaging has been rarely explored. The present disclosure provides chemiluminescence probes (such as ADLumin-1) and shows that these probes are useful to detect misfolding-prone or aggregation-prone proteins and peptides, such as amyloid beta (Aβ) species, as evidenced by a 216-fold amplification of chemiluminescence intensity by the probe upon mixing with Aβs in vitro.

In vivo photon imaging indicated that the chemiluminescence probe of the present disclosure (e.g., ADLumin-1) efficiently crossed blood-brain-barrier (BBB) and provided excellent contrast for Aβ plaques and cerebral amyloid angiopathy (CAA). In vivo imaging showed that the chemiluminescence signal of the probe from 5-month-old transgenic AD (5×FAD) mice was 1.80-fold higher than that from the age-matched wild-type mice. Moreover, the present disclosure shows that the detectable signal can be increased via chemiluminescence resonance energy transfer (CRET) using a non-conjugated "smart" fluorescent probe (such as CRANAD-3) in solutions, brain homogenates, and in vivo whole brain imaging. The results presented herein showed that CRET could provide a 2.25-fold margin between 5-month-old 5×FAD mice and a wild type mice. Hence, the chemiluminescence probes of this disclosure are useful for detecting Aβ species both in vitro and in vivo.

Furthermore, chemiluminescence probes of this disclosure (e.g., ADLumin-1) can specifically detect beta-sheets of misfolding-prone and misfolded proteins, as well as their aggregates, in blood and serum, including detecting amyloid beta (Aβ) in serum. The probes of the instant disclosure are highly sensitive, and more sensitive compared to the gold standard thioflavin T fluorescence test (~100-fold). The chemiluminescence probes are versatile for aggregates of various misfolding-prone and misfolded proteins and peptides (also referred to herein as "misfoldons"). Surprisingly and unexpectedly, the present disclosure shows that Aβ aggregates and other misfoldons induce prion-like propagation in serum. Experimental results further show that IgG and other proteins are likely the converters of the prion-like propagation in serum. Remarkably, the present disclosure also shows that the probes within the present claims provide a considerably large chemiluminescence signal difference between sera from ill individuals and health controls (>50-fold). Such large differences could be detected in sera of patients having many chronic diseases, such as Alzheimer's, diabetes, multiple sclerosis, pulmonary fibrosis and rheumatoid arthritis. The large differences are likely reflecting the accumulation of misfoldons in sera of these chronic diseases. The present disclosure also shows that disease sera could induce prion-like propagation in healthy serum.

Accordingly, the present disclosure provides compounds of Formula (I) that are useful, e.g., as chemiluminescence imaging probes. The compositions, including pharmaceutically acceptable compositions, comprising the compounds of Formula (I) are also provided. The disclosure also provides various methods of using the compounds of Formula (I), alone or in combination with fluorescent probes, for detecting misfolding-prone or aggregating-prone peptides and proteins in tissues or samples in vitro, in vivo, and ex vivo, including in serum or plasma collected from healthy or ill subjects. Certain embodiments of the compounds, compositions, and methods are described below.

Compounds of Formula (I)

In some embodiments, the present disclosure provides a compound of Formula (I):

$$A\text{-}L\text{-}B \qquad (I),$$

or a pharmaceutically acceptable salt thereof, wherein:
A is a moiety comprising a chemiluminescent scaffold;
L is absent or a $C_{2-12}$ alkenylene, which is optionally substituted with 1, 2, or 3 substituents independently selected from $C_{6-12}$ aryl, 5-10-membered heteroaryl, oxo, halo, cyanide, $C_{1-3}$ haloalkyl, OH, HO—Se—, $C_{1-3}$ alkoxy, $C_{1-3}$ haloalkoxy, amino, $C_{1-6}$ alkylamino, di($C_{1-6}$ alkyl)amino, thio, $C_{1-6}$ alkylthio, and $C_{1-6}$ alkylseleno; or any two oxo or OH substituents of $C_{2-12}$ alkylene together with the carbon atoms to which they are attached form a dioxaborinane ring, which is optionally substituted with 1 or 2 halogen atoms; and
B is a binding moiety capable of non-covalently binding to a misfolding-prone or an aggregating-prone protein.

In some embodiments, L is a $C_{2-12}$ alkenylene, which is optionally substituted with 1, 2, or 3 substituents independently selected from halo, $C_{1-3}$ haloalkyl, OH, $C_{1-3}$ alkoxy, $C_{1-3}$ haloalkoxy, amino, $C_{1-6}$ alkylamino, di($C_{1-6}$ alkyl)amino, thio, and $C_{1-6}$ alkylthio.

In some embodiments, L is absent (e.g., L is a bond between moiety A and moiety B). In some embodiments, the compound of formula (I) has formula A-B.

In some embodiments, L is a $C_{4-8}$ alkenylene.
In some embodiments, L is a $C_{4-6}$ alkenylene.
In some embodiments, L is a $C_{2-8}$ alkenylene.
In some embodiments, L is a $C_{2-6}$ alkenylene.

In some embodiments, L comprises at least two double bonds (e.g., two or three double bonds). In some embodiments, L comprises at least two conjugated double bonds comprising delocalized electrons (e.g., the double bonds are conjugated and the electrons are delocalized between A, L, and B).

In some embodiments, L is substituted with an $C_{6-12}$ aryl.
In some embodiments, L is substituted with a 5-10-membered heteroaryl.
In some embodiments, L is substituted with at least one oxo. In some embodiments, L is substituted with at least one OH. In some embodiments, L is substituted with one oxo and one OH.

In some embodiments, L comprises at least one dioxaborinane ring (e.g., formed by oxo and/or OH substituents on L).

In some embodiments, L is a moiety of formula:

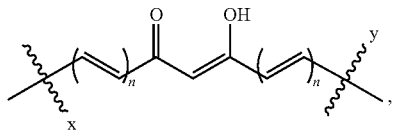

wherein x indicates a point of attachment to A, y indicates a point of attachment to B, and each n is independently an integer from 1 to 6.

In some embodiments, L is a moiety of formula:

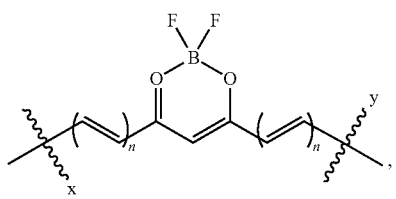

wherein x indicates a point of attachment to A, y indicates a point of attachment to B, and each n is independently an integer from 1 to 6.

In some embodiments, L is a moiety of formula:

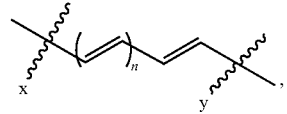

wherein x indicates a point of attachment to A, y indicates a point of attachment to B, and n is an integer from 1 to 6.

In some embodiments, n is 1 or 2.
In some embodiments, n is 1.
In some embodiments, n is 2.

In some embodiments, the chemiluminescent scaffold comprises a moiety selected from dioxetane, luminol, imidazo[1,2-a]pyrazin-3(7H)-one, oxalate, lucigenin, acridinium, and 9,10-dimethyl-anthracene.

In some embodiments, the chemiluminescent scaffold comprises a imidazo[1,2-a]pyrazin-3(7H)-one of formula:

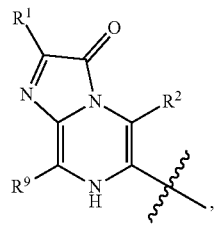

wherein
$R^1$ is $C_{1-3}$ alkyl, and
$R^2$ and $R^9$ are each independently selected from H, $C_{1-3}$ alkyl, and $L^1$-$R^{10}$;
each $L^1$ is absent or $C_{2-12}$ alkenylene, which is optionally substituted with 1, 2, or 3 substituents independently selected from $C_{6-12}$ aryl, 5-10-membered heteroaryl, oxo, halo, cyanide, $C_{1-3}$ haloalkyl, OH, HO—Se—, $C_{1-3}$ alkoxy, $C_{1-3}$ haloalkoxy, amino, $C_{1-6}$ alkylamino, di($C_{1-6}$ alkyl)amino, thio, $C_{1-6}$ alkylthio, and $C_{1-6}$ alkylseleno; or any two oxo or OH substituents of $C_{2-12}$ alkylene together with the carbon atoms to which they are attached form a dioxaborinane ring, which is optionally substituted with 1 or 2 halogen atoms;
each $R^{10}$ is selected from moiety B, $C_{6-12}$ aryl, and 5-10-membered heteroaryl, wherein said $C_{6-12}$ aryl and 5-10-membered heteroaryl are each optionally substituted with 1, 2, or 3 substituents independently selected from halo, cyanide, $C_{1-3}$ alkyl, $C_{1-3}$ cyanoalkyl, $C_{1-3}$ haloalkyl, OH, $C_{1-3}$ alkoxy, $C_{2-4}$ alkenyl, $C_{2-4}$ cyanoalkenyl, thio, $C_{1-3}$ alkylthio, $C_{1-3}$ haloalkoxy, amino, $C_{1-6}$ alkylamino, and di($C_{1-6}$ alkyl)amino.

In some embodiments, $R^2$ is H.
In some embodiments, $R^2$ is H and $R^9$ is $L^1$-$R^{10}$.
In some embodiments, $L^1$ is absent (e.g., $L^1$ is a bond between imidazo[1,2-a]pyrazin-3(7H)-one and $R^{10}$).
In some embodiments, $L^1$ is $C_{2-12}$ alkenylene.
In some embodiments, $L^1$ is a $C_{4-8}$ alkenylene.
In some embodiments, $L^1$ is a $C_{4-6}$ alkenylene.
In some embodiments, $L^1$ is a $C_{2-8}$ alkenylene.
In some embodiments, $L^1$ is a $C_{2-6}$ alkenylene.

In some embodiments, $L^1$ is ethendiyl.

In some embodiments, $L^1$ comprises at least two double bonds (e.g., two or three double bonds).

In some embodiments, $R^{10}$ is a moiety B (e.g., any of the moieties B described herein).

In some embodiments, $R^{10}$ is $C_{6-12}$ aryl (e.g., phenyl), optionally substituted with 1, 2, or 3 substituents independently selected from halo, cyanide, $C_{1-3}$ alkyl, $C_{1-3}$ cyanoalkyl, $C_{1-3}$ haloalkyl, OH, $C_{1-3}$ alkoxy, $C_{2-4}$ alkenyl, $C_{2-4}$ cyanoalkenyl, thio, $C_{1-3}$ alkylthio, $C_{1-3}$ haloalkoxy, amino, $C_{1-6}$ alkylamino, and di($C_{1-6}$ alkyl)amino.

In some embodiments, $R^{10}$ is 5-10-membered heteroaryl, optionally substituted with 1, 2, or 3 substituents independently selected from halo, cyanide, $C_{1-3}$ alkyl, $C_{1-3}$ cyanoalkyl, $C_{1-3}$ haloalkyl, OH, $C_{1-3}$ alkoxy, $C_{2-4}$ alkenyl, $C_{2-4}$ cyanoalkenyl, thio, $C_{1-3}$ alkylthio, $C_{1-3}$ haloalkoxy, amino, $C_{1-6}$ alkylamino, and di($C_{1-6}$ alkyl)amino. In some embodiments, heteroaryl of $R^{10}$ is any one of the heteroaryl groups described herein (e.g., pyridinyl, furanyl, thioenyl).

In some embodiments, $L^1$ is $C_{2-12}$ alkenylene (optionally substituted as described herein), and $R^{10}$ is a moiety B.

In some embodiments, $L^1$ is absent and $R^{10}$ is selected from $C_{6-12}$ aryl and 5-10-membered heteroaryl (optionally substituted as described herein).

In some embodiments, the chemiluminescent scaffold comprises a imidazo[1,2-a]pyrazin-3(7H)-one of formula:

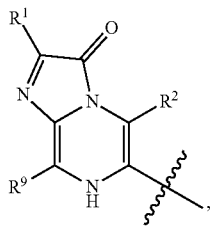

wherein $R^1$ is $C_{1-3}$ alkyl, and $R^2$ and $R^9$ are each independently selected from H and $C_{1-3}$ alkyl.

In some embodiments, $R^2$ is H. In some embodiments, $R^2$ is $C_{1-3}$ alkyl.

In some embodiments, $R^9$ is H. In some embodiments, $R^9$ is $C_{1-3}$ alkyl.

In some embodiments, the chemiluminescent scaffold comprises a imidazo[1,2-a]pyrazin-3(7H)-one of formula:

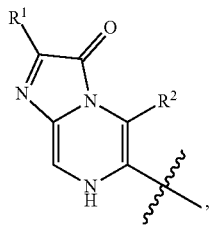

wherein $R^1$ is $C_{1-3}$ alkyl and $R^2$ is selected from H and $C_{1-3}$ alkyl.

In some embodiments, the chemiluminescent scaffold comprises a moiety of formula:

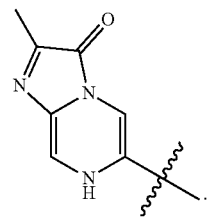 [SMILES: *c1cn2c(=O)c(C)nc-2c[nH]1]

In some embodiments, the chemiluminescent scaffold undergoes auto-oxidation in response to $O_2$.

In some embodiments, the binding moiety B comprises a hydrophobic and planar fragment capable of non-covalently binding to a hydrophobic segment of the misfolding-prone or the aggregation-prone protein.

In some embodiments, the binding moiety B comprises a residue of a fluorescent dye. In some embodiments, B comprises a reside of a fluorescent dye selected from a curcumin derivatives, a boron dipyrromethane derivative, a bisthiophene derivative, an oxazine derivatives, a coumarin derivative, a cyanine derivative, a quinoline-malononitrile derivative, and a benzothiazole derivative.

In some embodiments, the binding moiety B comprises a moiety of formula:

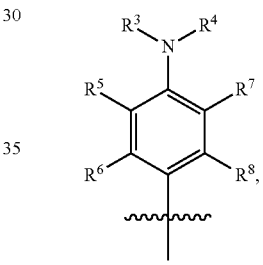

wherein $R^3$ and $R^4$ are each individually a $C_{1-3}$ alkyl; and $R^5$, $R^6$, $R^7$, and $R^8$ are each independently selected from H and $C_{1-3}$ alkyl, or $R^3$ and $R^5$ together with the carbon atom to which $R^5$ is attached and N atom to which $R^3$ is attached form a 5-7 membered heterocycloalkyl ring, or $R^4$ and $R^7$ together with the carbon atom to which $R^1$ is attached and N atom to which $R^4$ is attached form a 5-7 membered heterocycloalkyl ring.

In some embodiments, $R^3$ and $R^5$ together with the carbon atom to which $R^5$ is attached and N atom to which $R^3$ is attached form a 5-7 membered heterocycloalkyl ring (e.g., 5-, 6-, or 7-membered ring).

In some embodiments, $R^4$ and $R^7$ together with the carbon atom to which $R^7$ is attached and N atom to which $R^4$ is attached form a 5-7 membered heterocycloalkyl ring (e.g., 5-, 6-, or 7-membered ring).

In some embodiments, the binding moiety B comprises a moiety of formula:

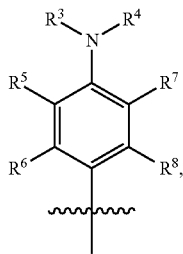

wherein
$R^3$ and $R^4$ are each independently a $C_{1-3}$ alkyl; and
$R^5$, $R^6$, $R^7$, and $R^8$ are each independently selected from H, halo, CN, $NO_2$, $C_{1-3}$ alkyl, and $C_{1-3}$ alkoxy.

In some embodiments, $R^5$, $R^6$, $R^7$, and $R^8$ are each independently selected from H and $C_{1-3}$ alkyl.

In some embodiments, $R^5$, $R^6$, $R^7$, and $R^8$ are each H.

In some embodiments, $R^3$ and $R^4$ are each independently selected from methyl, ethyl, propyl, and isopropyl. In some embodiments, $R^3$ and $R^4$ are each methyl. In some embodiments, $R^3$ and $R^4$ are each ethyl. In some embodiments, $R^3$ is methyl and $R^4$ is ethyl.

In some embodiments, the binding moiety B has formula:

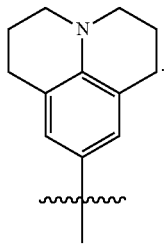

In some embodiments, the binding moiety B has formula:

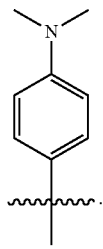

In some embodiments, the compound of Formula (I) has formula:

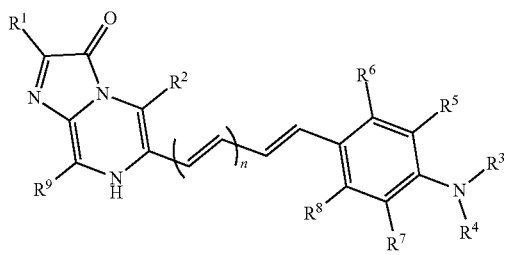

or a pharmaceutically acceptable salt thereof, wherein:
$R^1$ is $C_{1-3}$ alkyl;
$R^2$ and $R^9$ are each independently selected from H and $C_{1-3}$ alkyl;
$R^3$ and $R^4$ are each independently a $C_{1-3}$ alkyl; and
$R^5$, $R^6$, $R^7$, and $R^8$ are each independently selected from H, halo, CN, $NO_2$, $C_{1-3}$ alkyl, and $C_{1-3}$ alkoxy.

In some embodiments, $R^5$, $R^6$, $R^7$, and $R^8$ are each independently selected from H and $C_{1-3}$ alkyl. In some embodiments, $R^5$, $R^6$, $R^7$, and $R^8$ are each H.

In some embodiments, the non-covalent binding of moiety B to the misfolding-prone or the aggregating-prone protein comprises hydrogen bonds, electrostatic effects, π-effects, hydrophobic interactions, Van der Waals forces, or any combination thereof.

In some embodiments, the binding of the moiety B to the misfolding-prone or the aggregating-prone protein leads to amplification of intensity of chemiluminescence of the moiety A (or the entire compound of Formula (I)). In some embodiments, the amplification of detectable emission is about 50-fold, about 100-fold, about 200-fold, or about 250-fold. In some embodiments, moiety B is not selective to any specific misfoldon (i.e., the moeity B indiscriminately binds to any misfoldon present in a sample, an organ, or a tissue. In other embodiments, moeity B has a selective binding affinity to a particular misfolding-prone or aggregation-prone peptide or protein. For example, the moeity B is 2-fold, 4-fold, 10-fold, 25-fold, 50-fold, or 100-fold more selective for one misfoldon over any other misfoldon that can be present in a sample, an organ, or a tissue (e.g., moeity B is selective for Aβ peptide over tau protein and/or α-synuclein).

In some embodiments, the misfolding-prone or the aggregating-prone protein is selected from any one of the misfolding-prone or the aggregating-prone proteins or peptides described herein (e.g., any of the misfoldons described in "Misfolding-prone or the aggregating-prone proteins" section herein).

In some embodiments, the misfolding-prone or the aggregating-prone protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

In some embodiments, the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.

In some embodiments, the amyloid beta (Aβ) protein is selected from $Aβ_{40}$ and $Aβ_{42}$.

In some embodiments, the misfolding-prone or the aggregating-prone protein is in the misfolded or the aggregated state.

In some embodiments, the protein is amyloid beta (Aβ) protein in a form of aggregates or plaques.

In some embodiments, the misfolding-prone or the aggregating-prone protein comprises hydrophobic beta-sheets capable of non-covalently binding to the moiety B.

In some embodiments, the compound of Formula (I) is selected from any one of the following compounds:

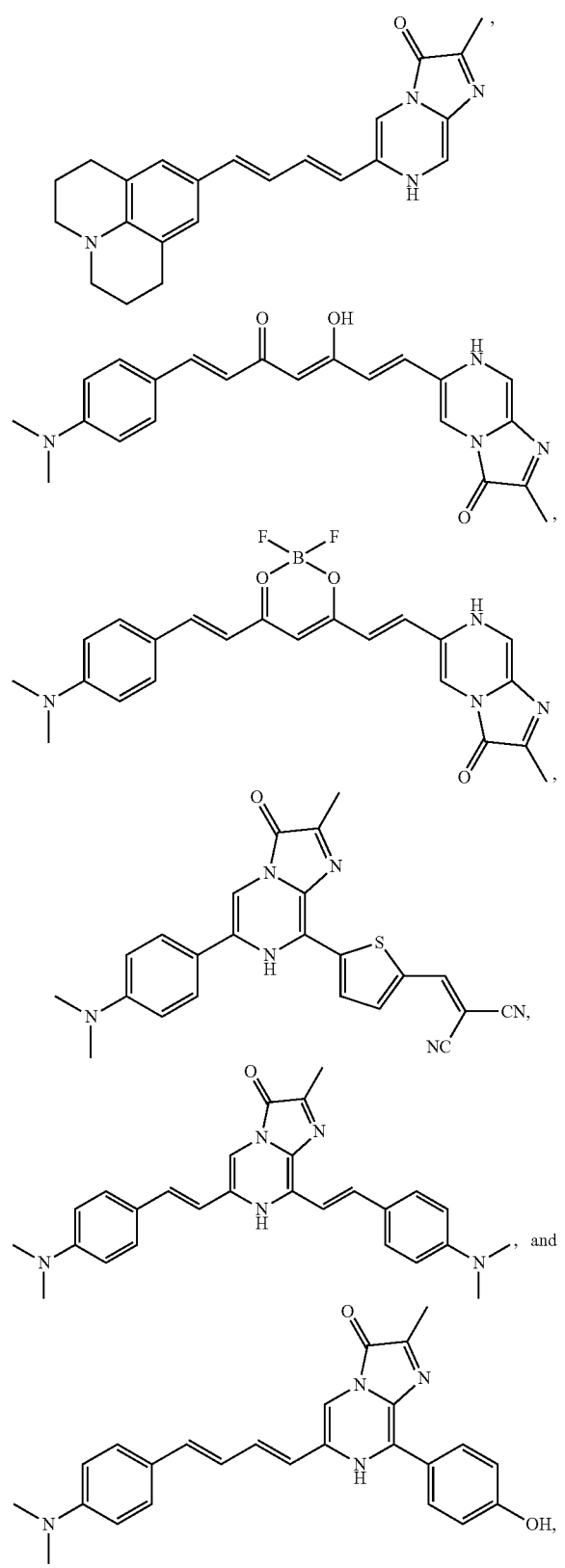

or a pharmaceutically acceptable salt thereof.

In some embodiments, the compound of Formula (I) is selected from any one of the following compounds:

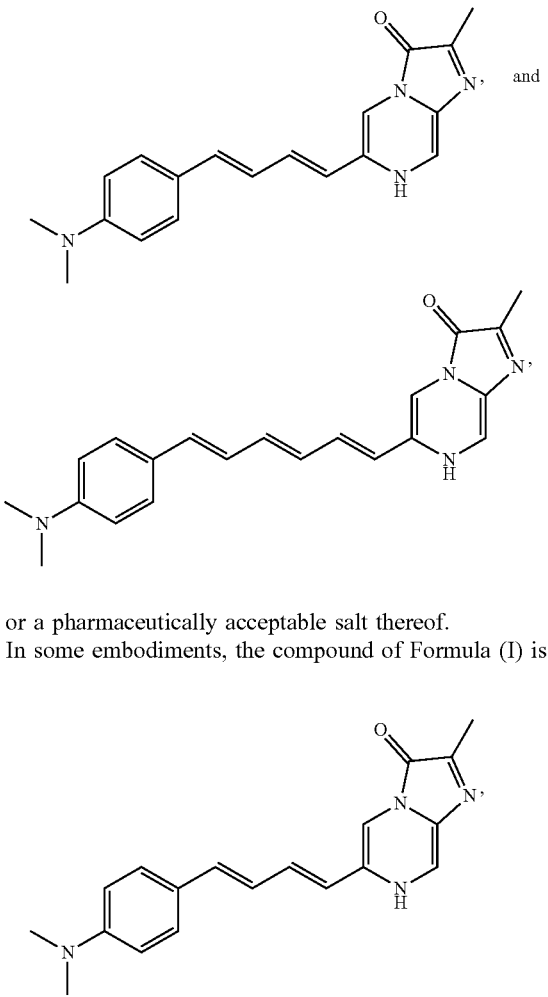

or a pharmaceutically acceptable salt thereof.

In some embodiments, the compound of Formula (I) is:

or a pharmaceutically acceptable salt thereof.

Pharmaceutically Acceptable Salts

In some embodiments, a salt of any one of the compounds of the present disclosure (e.g., a compound of Formula (I) or a fluorescent probe) is formed between an acid and a basic group of the compound, such as an amino functional group, or a base and an acidic group of the compound, such as a carboxyl functional group.

According to another embodiment, the compound is a pharmaceutically acceptable acid addition salt.

In some embodiments, acids commonly employed to form pharmaceutically acceptable salts of the compounds include inorganic acids such as hydrogen bisulfide, hydrochloric acid, hydrobromic acid, hydroiodic acid, sulfuric acid and phosphoric acid, as well as organic acids such as para-toluenesulfonic acid, salicylic acid, tartaric acid, bitartaric acid, ascorbic acid, maleic acid, besylic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid and acetic acid, as well as related inorganic and organic acids. Such pharmaceutically acceptable salts thus include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, acrylate, formate, isobutyrate, caprate, heptanoate, propiolate, oxalate, malonate, succinate, suberate, sebacate, fumarate, maleate, butyne-1, 4-dioate, hexyne-1,6-dioate, benzoate, chlorobenzoate, methylbenzoate, dinitrobenzoate, hydroxybenzoate, methoxybenzoate, phthalate, terephthalate, sulfonate, xylene sulfonate, phenylacetate, phenylpropionate, phenylbutyrate, citrate, lactate, β-hydroxybutyrate, glycolate, maleate, tartrate, methanesulfonate, propanesulfonate, naphthalene-1-sulfonate, naphthalene-2-sulfonate, mandelate and other salts. In one embodiment, pharmaceutically acceptable acid addition salts include those formed with mineral acids such as hydrochloric acid and hydrobromic acid, and especially those formed with organic acids such as maleic acid.

In some embodiments, bases commonly employed to form pharmaceutically acceptable salts of the compounds include hydroxides of alkali metals, including sodium, potassium, and lithium; hydroxides of alkaline earth metals such as calcium and magnesium; hydroxides of other metals, such as aluminum and zinc; ammonia, organic amines such as unsubstituted or hydroxyl-substituted mono-, di-, or trialkylamines, dicyclohexylamine; tributyl amine; pyridine; N-methyl, N-ethylamine; diethylamine; triethylamine; mono-, bis-, or tris-(2-OH—($C_1$-$C_6$)-alkylamine), such as N,N-dimethyl-N-(2-hydroxyethyl)amine or tri-(2-hydroxyethyl)amine; N-methyl-D-glucamine; morpholine; thiomorpholine; piperidine; pyrrolidine; and amino acids such as arginine, lysine, and the like.

Compositions Comprising a Compound of Formula (I)

In some embodiments, the present disclosure provides a composition comprising a compound of Formula (I) as described herein, or a pharmaceutically acceptable salt thereof, and an acceptable carrier. An example of the composition is an aqueous solution (e.g., a buffer such as a PBS solution) or a solution in an organic solvent (e.g., DMSO). Such a composition is useful in diagnostic and/or analytical methods of this disclosure. An example of such a use of the composition is for detecting a misfolding-prone or an aggregation-prone peptide or protein in a serum obtained from a subject for diagnosing the subject with a disease or condition in which the misfolding-prone or the aggregation-prone peptide or protein is implicated (e.g., any one of the chronic conditions and/or the neurodegenerative conditions described herein).

In some embodiments, the present disclosure provides a composition comprising a compound of Formula (I) as described herein, or a pharmaceutically acceptable salt thereof, and a pharmaceutically acceptable carrier. In some embodiments, the composition is a pharmaceutical composition (e.g., as any one of the pharmaceutical compositions as described herein). In some embodiments, the composition is an aqueous solution for an injection or an infusion to a subject. The subject may be in need of the composition, for example, for a diagnosis of a disease or condition in which a misfolding-prone or aggregating-prone protein is implicated. In this example, an organ or tissue of the subject (e.g., brain, eye, skin, or nose) can be imaged after administration of the pharmaceutical composition and a passage of a time to allow the compound of formula (I) to accumulate in the organ or the tissue to be imaged. In some embodiments, the pharmaceutical composition is in the form of eye drops or a nasal spray.

In some embodiments, the composition comprising the compound of Formula (I) also comprises a fluorescent probe (e.g., any one of the fluorescent probes described herein, such as any of the fluorescent probes provided in "Fluorescent probes" section herein). Such a composition can be used, e.g., in diagnostic and/or analytical methods described herein. In some embodiments, the fluorescent probe and the compound of Formula (I) can be administered to a subject in a single pharmaceutical composition (e.g., in a single dosage form). In some embodiments, the fluorescent probe and the compound of Formula (I) can be administered to a subject in need thereof in separate dosage forms (simultaneously or consecutively). For example, the compound of Formula (I) can be administered to the subject in one dosage form for imaging of an organ or tissue of the subject, followed by a passage of time to allow the compound to accumulate in the organ or tissue to be imaged, and then a fluorescent probe can be administered to the subject in another dosage form, followed by a passage of time to allow the fluorescent probe to accumulate in the organ or tissue to be imaged. Without being bound by any theory, it is believed that the administration of the fluorescent probe to the subject leads to amplification of a signal detected during imaging of the organ or tissue of the subject, e.g., through chemiluminescence resonance energy transfer (CRET) from the chemiluminescent moiety A within Formula (I) to the fluorescent probe.

Fluorescent Probes

In some embodiments, a fluorescent probe useful in the compositions and methods of this disclosure is capable of non-covalently binding to a misfolding-prone or an aggregating-prone protein.

In some embodiments, the non-covalent binding of the fluorescent probe to the misfolding-prone or the aggregating-prone protein comprises hydrogen bonding, electrostatic effects, π-effects, hydrophobic interactions, Van der Waals forces, or any combination thereof.

In some embodiments, the binding of the fluorescent probe to the misfolding-prone or the aggregating-prone protein leads to amplification of intensity of fluorescent signal of the fluorescent probe.

In some embodiments, there is an overlap of luminescent emission spectrum of the compound of Formula (I), which contain moiety A, as described herein and the excitation spectrum of the fluorescent probe. In some embodiments, there is an overlap of luminescent emission spectrum of moiety A of the compound of Formula (I) as described herein and the excitation spectrum of the fluorescent probe. In one example, luminescent emission spectrum of the compound of Formula (I) is from about 400 nm to about 800 nm, and the excitation spectrum of the fluorescent probe is from 500 nm to about 700 nm. In another example, luminescent emission spectrum of the compound of Formula (I) is from about 450 nm to about 700 nm, and the excitation spectrum of the fluorescent probe is from 550 nm to about 650 nm.

In some embodiments, the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.

In some embodiments, the fluorescent probe is any one of the fluorescent probes described in Gyasi et al., Biological applications of near infrared fluorescence dye probes in monitoring Alzheimer's disease, Eur. J. Med. Chem., 2020, 187 (1), 111982, which is incorporated herein by reference in its entirety.

In some embodiments, the fluorescent probe is selected from a compound of any one of the following Formulae:

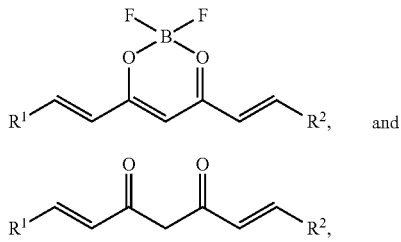

(II) and (III), or a pharmaceutically acceptable salt thereof, wherein:
each $R^1$ and $R^2$ is independently selected from $C_{6-12}$ aryl and 5-10-membered heteroaryl, each of which is optionally substituted with 1, 2, or 3 substituents independently selected from amino, $C_{1-3}$ alkylamino, di($C_{1-3}$ alkyl)amino, $C_{1-3}$ alkyl, $C_{1-3}$ alkoxy, halo, CN, $NO_2$, $C_{6-12}$ aryl, and 5-10-membered heteroaryl.

In some embodiments, the fluorescent probe is selected from CRANAD-2, CRANAD-3, CRANAD-17, CRANAD-28, CRANAD-30, CRANAD-44, CRANAD-58, CRANAD-88, and CRANAD-102.

In some embodiments, the fluorescent probe is selected from CRANAD-2, CRANAD-3, CRANAD-30, CRANAD-58, CRANAD-88, and CRANAD-102.

In some embodiments, the fluorescent probe is a CRANAD-3 compound of formula:

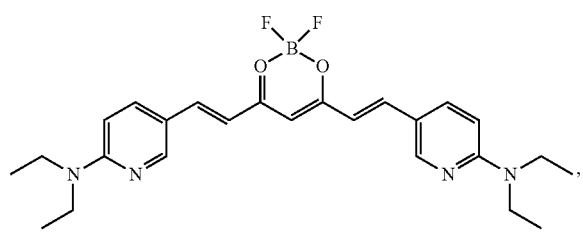

or a pharmaceutically acceptable salt thereof.

In some embodiments, the fluorescent probe is a compound of Formula (IV):

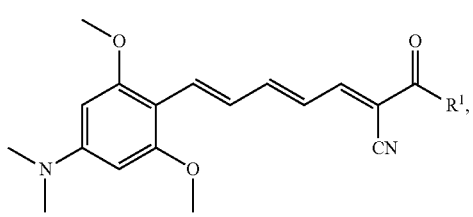

(IV)

or a pharmaceutically acceptable salt thereof, wherein $R^1$ is selected from $C_{6-12}$ aryl, 5-10 membered heteroaryl, $C_{6-12}$ aryl-$C_{1-3}$ alkoxy, and 5-10 membered heteroaryl-$C_{1-3}$ alkoxy, wherein each of said $C_{6-12}$ aryl and 5-10 membered heteroaryl is optionally substituted with 1, 2, or 3 substituents independently selected from halo, CN, $NO_2$, $C_{1-3}$ alkoxy, and $C_{1-3}$ alkyl.

In some embodiments, the compound of Formula (IV) is:

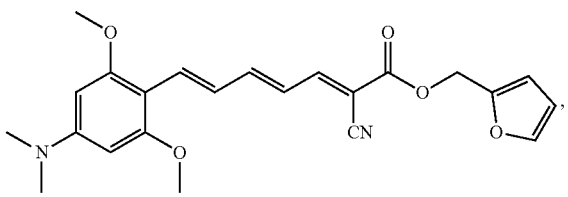 [SMILES: COc1cc(N(C)C)cc(OC)c1/C=C/C=C/C=C(\C#N)C(=O)OCc1ccco1]

or a pharmaceutically acceptable salt thereof.

In some embodiments, the fluorescent probe is selected from a curcumin derivative (e.g., any one of the CRANAD compounds), a boron dipyrromethane derivative (e.g., any one of the BODIPY compounds), a bisthiophene derivative (e.g., any one of the NIAD compounds), an oxazine derivative (e.g., any one of the AOI compounds), a coumarin derivative, a cyanine derivative, a quinoline-malononitrile derivative, a benzothiazole derivative, a quinoline derivative, a stilbene derivative, a flavone or a flavonoid derivative, a dibenzylideneacetone derivative, and a lacmoid derivative.

In some embodiments, the fluorescent probe is a BODIPY compound selected from BODIPY-7, BAP-1, BAP-2, BAP-3, BAP-4, and BAP-5. In some embodiments, the fluorescent probe is a NIAD compound selected from NIAD-4, NIAD-11, and NIAD-16. In some embodiments, the fluorescent probe is selected from QAD-1, EUA-1, EUA-2, EUA-3, EUA-4, and EUA-5.

In some embodiments, the fluorescent probe is a near-infrared fluorescence (NIRF) probe, such as a "smart" NIRF probe. As used herein, the terms "smart" and "turn-on" are used interchangeably and refer to a fluorescent probe that is capable of substantially changing its fluorescent properties upon binding to a biological molecule, such as to a hydrophobic pocket of a misfolding-prone or an aggregation-prone peptide or protein. These changes can include a shift in excitation and/or emission wavelength, a red-shift, or an increase in fluorescence intensity upon binding to the misfolding-prone or aggregation-prone peptide or protein (e.g., Aβ aggregate or fibril). The increase in fluorescence of the "smart" (turn-on) probe may include a 2-fold, a 3-fold, a 5-fold, a 10-fold, or a 25-fold increase.

In some embodiments, the fluorescent probe has a selective binding affinity to a particular misfolding-prone or aggregation-prone peptide or protein. For example, the fluorescent probe is 2-fold, 4-fold, 10-fold, 25-fold, 50-fold, or 100-fold more selective for one misfoldon over any other misfoldon that can be present in a sample, an organ, or a tissue.

In some embodiments, the fluorescent probe has a selective binding affinity Aβ peptide (e.g., CRANAD-X compounds). In some embodiments, the fluorescent probe is tau-selective (e.g., Tau-1, Tau-2, or BD-Tau). In some embodiments, the fluorescent probe is synuclein-selective (e.g., PP-BTA-4).

Misfolding-prone or the aggregating-prone proteins Numerous peptides and proteins have the tendency to misfold by changing their native conformations (random coils or alpha-helices) to a beta-sheet conformation, and then to aggregate in these misfolded forms to form aggregates (amyloids), which accumulate in the affected tissue and are associated with numerous pathological conditions. Once the native conformation is disrupted, the protein is ready to adapt to misfolded beta-sheet conformation and consequentially assemble into oligomers, profibrils and fibrils, and even large deposits like amyloid plaques or tau tangles in AD brains.

These peptides and proteins are referred to herein as "misfoldons." Although these "misfoldons" have different amino acid sequences, charge status, hydrophobicity, and water solubility, the commonality is that they could gradually form oligomers and fibrils under proper conditions in vitro and in vivo. In addition, a single misfoldon can serve as a seed to accelerate the conversion of other similar proteins from their native conformation to form misfolded beta-sheets and also to form aggregates of resultant beta-sheets.

In general, several amino acids, including Ala, Val, Ile, Leu, Phe, can be highly frequently found in most of beta-sheets, and the tendency of these amino acids to adopting beta-sheet structures was generally known from their statistical occurrence in protein secondary structures (commonly referred to as the "Chou-Fasman parameters") and from empirical studies. In fact, from recently available Cryo-EM structures of 10 or more misfoldons that contain beta-sheets, one or more hydrophobic pockets are formed by at least three amino acids selected from Ala, Val, Ile, Leu, and Phe. Without being bound by a theory, it is believed that such a hydrophobic pocket is a general secondary-structure for beta-sheets. Hence, a generic ligand (such as a moiety B of Formula (I) within the present claims or the fluorescent probe) matches with this typical binding site and indiscriminately binds to any misfoldon.

In some embodiments, the misfolding-prone or the aggregating-prone protein comprises hydrophobic beta-sheets capable of non-covalently binding the moiety B of the compound of Formula (I) as described herein and/or the fluorescent probe as described herein. In some embodiments, moiety B and/or the fluorescent probe bind to at least three amino acids selected from Ala, Val, Ile, Leu, and Phe, within the hydrophobic beta-sheets within the misfolding-prone or the aggregating-prone peptide or a protein. In some embodiments, the moiety B and/or the fluorescent probe bind to a hydrophobic pocket formed by Phe19, Ala21, Val24, and Ile31 in a beta-sheet of a protein.

In some embodiments, the moiety B of the compound of Formula (I) and the fluorescent probe, when used or administered together, are randomly inserted within the beta-sheets of protein aggregates, fibrils, and/or amyloids, within close spatial proximity of one another. Close special proximity may include about 5 nm, about 10 nm, about 20 nm, or about 50 nm. Without being bound by any theory, it is believed that in close special proximity, chemiluminescence from the compound of Formula (I) increases detectable emission signal (e.g., fluorescence emission signal) from the fluorescent probe by about 1.5-fold, about 2-fold, about 3-fold, or about 4-fold.

In some embodiments, the misfolding-prone or the aggregating-prone peptide or protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

In some embodiments, the misfolding-prone or the aggregating-prone peptide or protein is selected from amyloid beta (Aβ), tau, an α-synuclein, TDP-43, amylin, fibrinogen, prion, fused in sarcoma (FUS) protein, SOD and transthyretin.

In some embodiments, the misfolding-prone or the aggregating-prone peptide or protein is amyloid beta (Aβ). In some embodiments, the amyloid beta (Aβ) protein is selected from $A\beta_{40}$ and $A\beta_{42}$.

In some embodiments, the misfolding-prone or the aggregating-prone peptide or protein is a tau protein. In some embodiments, the misfolding-prone or the aggregating-prone peptide or protein is α-synuclein. In some embodiments, the misfolding-prone or the aggregating-prone peptide or protein is serpin. In some embodiments, the misfolding-prone or the aggregating-prone peptide or protein is selected from proinsulin, insulin. In some embodiments, the misfolding-prone or the aggregating-prone peptide or protein is apolipoprotein A-I (APO).

In some embodiments, the misfolding-prone or the aggregating-prone protein is in the misfolded or the aggregated state. In some embodiments, the protein is amyloid beta (Aβ) protein in a form of aggregates or plaques.

Methods of Detecting a Misfolding-Prone or an Aggregating-Prone Proteins

In some embodiments, the present disclosure provides a method of detecting a misfolding-prone or an aggregating-prone protein in a sample, the method comprising contacting the sample with an effective amount of a compound of Formula (I) as described herein, or a pharmaceutically acceptable salt thereof, or a composition comprising the compound of Formula (I), or a pharmaceutically acceptable salt thereof, as described herein.

In some embodiments, the method is carried out in vitro or ex vivo.

In some embodiments, the method is carried out in vitro.

In some embodiments, the method is carried out ex vivo.

In some embodiments, the detecting is qualitative (e.g., determining a presence of a misfoldon in the sample by detecting a chemiluminescent or a fluorescent signal from the sample using an appropriate imaging technique as described herein).

In some embodiments, the detecting is quantitative (e.g., determining a concentration of the misfoldon in the sample using, e.g., a calibration curve method).

In some embodiments, the sample is a brain homogenate.

In some embodiments, the sample is a blood, a serum, a cerebrospinal fluid, a plasma, or a brain interstitial fluid obtained from a subject.

In some embodiments, the sample is a purified aqueous solution comprising the misfolding-prone or the aggregating-prone protein.

In some embodiments, the method comprises detecting a chemiluminescence emission of the compound of Formula (I) from the sample, wherein said detecting is indicative of a presence of a misfolding-prone or an aggregating-prone protein in the sample.

In some embodiments, the method further comprises contacting the sample with a fluorescent probe as described herein (e.g., any of the fluorescent probes described under the "Fluorescent probes" section herein).

In some embodiments, the method comprises detecting a fluorescence emission of the fluorescent probe from the sample, wherein said detecting is indicative of a presence of a misfolding-prone or an aggregating-prone protein in the sample.

In some embodiments, the fluorescent probe is capable of non-covalently binding to the misfolding-prone or the aggregating-prone protein (e.g., as described herein). In some embodiments, the non-covalent binding of the fluorescent probe to the misfolding-prone or the aggregating-prone protein comprises hydrogen bonding, electrostatic effects, π-effects, hydrophobic interactions, Van der Waals forces, or any combination thereof (e.g., as described herein).

In some embodiments, the binding of the fluorescent probe to the misfolding-prone or the aggregating-prone protein leads to amplification of intensity of fluorescent signal of the fluorescent probe (e.g., as described herein).

In some embodiments, contacting the sample with the fluorescent probe leads to the amplification of the detected signal through chemiluminescence resonance energy transfer (CRET) (e.g., due to spatial proximity between moiety A of the compound of Formula (I) and the fluorescent probe as described herein).

In some embodiments, contacting the sample with the compound of Formula (I) and the fluorescent probe is carried out such that there is an overlap of luminescent emission spectrum of the compound of Formula (I), which contain moiety A, and the excitation spectrum of the fluorescent probe (e.g., as described herein for Formula (I)). In some embodiments, contacting the sample with the compound of Formula (I) and the fluorescent probe is carried out such that there is an overlap of luminescent emission spectrum of moiety A of the compound of Formula (I) and the excitation spectrum of the fluorescent probe (e.g., as described herein for Formula (I)).

In some embodiments, the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.

In some embodiments, the fluorescent probe is selected from CRANAD-2, CRANAD-3, CRANAD-30, CRANAD-58, CRANAD-88, and CRANAD-102.

In some embodiments, the fluorescent probe is a CRANAD-3 compound of formula:

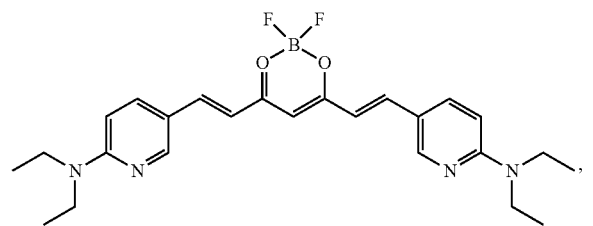

or a pharmaceutically acceptable salt thereof.

In some embodiments, the detecting comprises detecting a fluorescence or a luminescence in the sample by an imaging technique.

In some embodiments, the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy.

In some embodiments, the method comprises detecting a chemiluminescence emission of the compound of Formula (I) from the sample and/or a fluorescence emission of the fluorescent probe from the sample using a fluorescent imaging technique.

In some embodiments, the misfolding-prone or the aggregating-prone peptide or protein is selected from any of the misfolding-prone or the aggregating-prone peptides or proteins described in "Misfolding-prone or the aggregating-prone proteins" section herein, or a combination thereof. The method may comprise detecting a single misfoldon in the sample, for example, when the sample is a purified aqueous solution of a misfoldon or when moeity B of Formula (I) and/or the fluorescent probe have a selective binding affinity to a particular misfoldon. The method may also comprise detecting any (or all) misfoldons present in the sample, for example, when the sample is a serum obtained from a subject and a misfoldon associated with a particular pathology has induced a prion-like propagation in the serum (and also the moeity B of Formula (I) and/or the fluorescent probe indiscriminately bind to beta-sheets of various misfoldons).

In some embodiments, the misfolding-prone or the aggregating-prone peptide or protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

In some embodiments, the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.

In some embodiments, the amyloid beta (Aβ) protein is selected from Aβ$_{40}$ and Aβ$_{42}$. In some embodiments, the misfolding-prone or the aggregating-prone protein is in the misfolded or the aggregated state. In some embodiments, the protein is amyloid beta (Aβ) protein in a form of aggregates or plaques.

In some embodiments, the misfolding-prone or the aggregating-prone protein comprises hydrophobic beta-sheets capable of non-covalently binding the moiety B of the compound of Formula (I) as described herein and/or the fluorescent probe as described herein.

Method of Determining Concentration of a Misfolding-Prone or an Aggregating-Prone Proteins In some embodiments, the present disclosure provides a method of determining concentration of a misfolding-prone or an aggregating-prone protein in a sample, the method comprising contacting the sample with an effective amount of a compound of Formula (I), or a pharmaceutically acceptable salt thereof, as described herein, or a composition comprising a compound of Formula (I), or a pharmaceutically acceptable salt thereof, as described herein.

In some embodiments, the method is carried out in vitro or ex vivo.

In some embodiments, the method is carried out in vitro.
In some embodiments, the method is carried out ex vivo.
In some embodiments, the sample is a brain homogenate.
In some embodiments, the sample is a blood, a serum, a cerebrospinal fluid, a plasma, or a brain interstitial fluid obtained from a subject. In some embodiments, the sample is serum obtain from a blood of the subject (e.g., an ill subject or a healthy subject).

In some embodiments, the sample is a purified aqueous solution comprising the misfolding-prone or the aggregating-prone protein.

In some embodiments, the method comprises detecting intensity of a chemiluminescence emission of the compound of Formula (I) from the sample, wherein said intensity is correlated to a concentration of a misfolding-prone or an aggregating-prone protein in the sample (e.g., the intensity is correlated to concentration using a calibration curve method).

In some embodiments, the method further comprises contacting the sample with a fluorescent probe (e.g., any of the fluorescent probes described under the "Fluorescent probes" section herein).

In some embodiments, the method comprises detecting intensity of a fluorescence emission of the fluorescent probe from the sample, wherein said intensity is correlated to a concentration of a misfolding-prone or an aggregating-prone protein in the sample (e.g., the intensity is correlated to concentration using a calibration curve method).

In some embodiments, the fluorescent probe is capable of non-covalently binding to the misfolding-prone or the aggregating-prone protein (e.g., as described herein). In some embodiments, the non-covalent binding of the fluorescent probe to the misfolding-prone or the aggregating-prone protein comprises hydrogen bonding, electrostatic effects, π-effects, hydrophobic interactions, Van der Waals forces, or any combination thereof.

In some embodiments, the binding of the fluorescent probe to the misfolding-prone or the aggregating-prone protein leads to amplification of intensity of fluorescent signal of the fluorescent probe (e.g., as described herein).

In some embodiments, contacting the sample with the fluorescent probe leads to the amplification of the detected signal through chemiluminescence resonance energy transfer (CRET) (e.g., due to spatial proximity between the compound of Formula (I), which contain moiety A, and the fluorescent probe as described herein). In some embodiments, contacting the sample with the fluorescent probe leads to the amplification of the detected signal through chemiluminescence resonance energy transfer (CRET) (e.g., due to spatial proximity between moiety A of the compound of Formula (I) and the fluorescent probe as described herein).

In some embodiments, contacting the sample with the compound of Formula (I) and the fluorescent probe is carried out such that there is an overlap of luminescent emission spectrum of the compound of Formula (I), which contain moiety A, and the excitation spectrum of the fluorescent probe (e.g., as described herein for Formula (I)). In some embodiments, contacting the sample with the compound of Formula (I) and the fluorescent probe is carried out such that there is an overlap of luminescent emission spectrum of moiety A of the compound of Formula (I) and the excitation spectrum of the fluorescent probe (e.g., as described herein for Formula (I)).

In some embodiments, the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.

In some embodiments, the fluorescent probe is selected from CRANAD-2, CRANAD-3, CRANAD-30, CRANAD-58, CRANAD-88, and CRANAD-102.

In some embodiments, the fluorescent probe is a CRANAD-3 compound of formula:

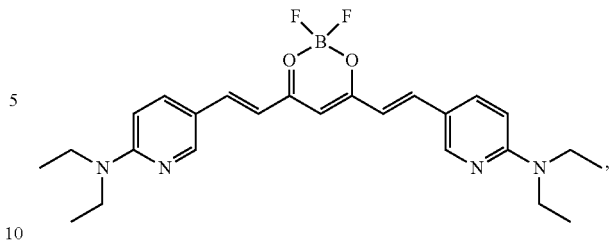

or a pharmaceutically acceptable salt thereof.

In some embodiments, determining the concentration of the misfolding-prone or the aggregating-prone protein comprises detecting a fluorescence or a luminescence in the sample by an imaging technique.

In some embodiments, an intensity of the fluorescence or the luminescence in the sample is correlated with the concentration of the misfolding-prone or the aggregating-prone protein in the sample (e.g., using a calibration curve method).

In some embodiments, the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy.

In some embodiments, the method comprises detecting intensity of a chemiluminescence emission of the compound of Formula (I) from the sample and/or a fluorescence emission of the fluorescent probe from the sample using a fluorescent imaging technique. In some embodiments, the chemiluminescence or fluorescence intensity is linearly proportional to the concentration of the misfoldon in the sample.

In some embodiments, the misfolding-prone or the aggregating-prone peptide or protein is selected from any of the misfolding-prone or the aggregating-prone peptides or proteins described in "Misfolding-prone or the aggregating-prone proteins" section herein, or a combination thereof.

In some embodiments, the misfolding-prone or the aggregating-prone peptide or protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

In some embodiments, the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.

In some embodiments, the amyloid beta (Aβ) protein is selected from $A\beta_{40}$ and $A\beta_{42}$.

In some embodiments, the misfolding-prone or the aggregating-prone protein is in the misfolded or the aggregated state.

In some embodiments, the protein is amyloid beta (Aβ) protein in a form of aggregates or plaques.

In some embodiments, the misfolding-prone or the aggregating-prone protein comprises hydrophobic beta-sheets capable of non-covalently binding the moiety B of the compound of Formula (I) as described herein and/or the fluorescent probe as described herein.

Method of Imaging an Organ or a Tissue

In some embodiments, the present disclosure provides a method of imaging an organ or tissue comprising a misfolding-prone or an aggregating-prone protein of a subject, the method comprising:

i) administering to the subject an effective amount of a compound of Formula (I), or a pharmaceutically acceptable salt thereof, or a composition comprising the compound of Formula (I), or a pharmaceutically acceptable salt thereof;

ii) waiting a time sufficient to allow the compound to accumulate in the organ or tissue to be imaged (e.g., the sufficient time may include 30 sec, 1 min, 2 min, 10 min, 15 min, 30 min, 1 hour, or 2 hours.); and iii) imaging the organ or tissue with an imaging technique.

In some embodiments, the organ or tissue is selected from skin, eyes, and nose. In some embodiments, the organ or tissue is a brain.

In some embodiments, the method further comprises:

i) administering to the subject an effective amount of a fluorescent probe as described herein (e.g., any of the fluorescent probes described under the "Fluorescent probes" section herein); and ii) waiting a time sufficient to allow the fluorescent probe to accumulate in the organ or tissue to be imaged. The sufficient time may include 30 sec, 1 min, 2 min, 10 min, 15 min, 30 min, 1 hour, or 2 hours.

In some embodiments, the compound of Formula (I), or a pharmaceutically acceptable salt thereof, and the fluorescent probe, are administered to the subject simultaneously.

In some embodiments, the compound of Formula (I), or a pharmaceutically acceptable salt thereof, and the fluorescent probe, are administered to the subject in the same dosage form.

In some embodiments, the compound of Formula (I), or a pharmaceutically acceptable salt thereof, and the fluorescent probe, are administered to the subject in separate dosage forms.

In some embodiments, the compound of Formula (I), or a pharmaceutically acceptable salt thereof, and the fluorescent probe, are administered to the subject consecutively.

In some embodiments, the fluorescent probe is capable of non-covalently binding to the misfolding-prone or the aggregating-prone protein (e.g., as described herein). In some embodiments, the non-covalent binding of the fluorescent probe to the misfolding-prone or the aggregating-prone protein comprises hydrogen bonding, electrostatic effects, π-effects, hydrophobic interactions, Van der Waals forces, or any combination thereof.

In some embodiments, the binding of the fluorescent probe to the misfolding-prone or the aggregating-prone protein leads to amplification of intensity of fluorescent signal of the fluorescent probe (e.g., as described herein).

In some embodiments, contacting the sample with the fluorescent probe leads to the amplification of the detected signal through chemiluminescence resonance energy transfer (CRET) (e.g., due to special proximity between moiety A of the compound of Formula (I) and the fluorescent probe as described herein).

In some embodiments, contacting the sample with the compound of Formula (I) and the fluorescent probe is carried out such that there is an overlap of luminescent emission spectrum of moiety A of the compound of Formula (I) and the excitation spectrum of the fluorescent probe (e.g., as described herein for Formula (I)).

In some embodiments, the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.

In some embodiments, the fluorescent probe is selected from CRANAD-2, CRANAD-3, CRANAD-30, CRANAD-58, CRANAD-88, and CRANAD-102.

In some embodiments, the fluorescent probe is a CRANAD-3 compound of formula:

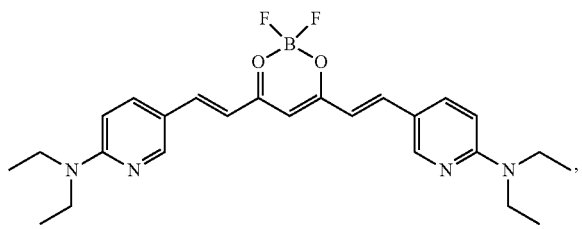

or a pharmaceutically acceptable salt thereof.

In some embodiments, the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy. Imaging the organ or tissue with an imaging technique may result in detection of a signal (e.g., chemiluminescence or fluorescence signal) from the organ or tissue that was imaged. Without being bound by any theory, it is believed that detection of the signal is indicative of a presence of a misfoldon in the organ or tissue. For example, detecting a fluorescence signal from the imaged brain can be indicative of a presence of amyloid beta (Aβ) misfoldons, tau misfoldons, and/or α-synuclein misfoldons in the brain.

In some embodiments, the misfolding-prone or the aggregating-prone peptide or protein is selected from any of the misfolding-prone or the aggregating-prone peptides or proteins described in "Misfolding-prone or the aggregating-prone proteins" section herein, or a combination thereof.

In some embodiments, the misfolding-prone or the aggregating-prone peptide or protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

In some embodiments, the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.

In some embodiments, the amyloid beta (Aβ) protein is selected from $A\beta_{40}$ and $A\beta_{42}$.

In some embodiments, the misfolding-prone or the aggregating-prone protein is in the misfolded or the aggregated state.

In some embodiments, the protein is amyloid beta (Aβ) protein in a form of aggregates or plaques.

In some embodiments, the misfolding-prone or the aggregating-prone protein comprises hydrophobic beta-sheets capable of non-covalently binding the moiety B of the compound of Formula (I) as described herein and/or the fluorescent probe as described herein.

Methods of Diagnosing a Disease or Condition

In 1997, Carrell and Lomas proposed "conformational disease" as a general category for several disorders, including prion disease, Alzheimer's disease (AD) and serpin disease (serpinopathy). In conformational diseases, proteins with abnormal conformation form aggregates that trigger downstream harmful cascades. For example, the aggregation of amyloid beta (Aβ) species into oligomers and plaques could lead to the over-activation of microglia and consequential inflammation in Alzheimer's disease. In prion disease, the abnormal beta-sheet prion protein serves as the template for conformationally infecting other prions. The key feature of conformational disease is the accumulation of misfolded beta-sheet peptides and proteins via prion-like assembling in its pathological organ or tissue.

Prion disease is a typical conformational disease, and the infection capacity of prion proteins has been widely considered as strong, effective and exemplary. Although numerous neurodegenerative diseases, such as AD, Huntington disease, have not been considered as infectious as prion disease, these diseases show propagation of pathology in brain that is similar to prionopathies. In recent years, mounting evidence suggests that Aβ, α-synuclein, and tau proteins share prion-like biophysical and biochemical characteristics, particularly the propagation of the misfolded beta-sheet of the peptides or proteins under different disease conditions. Hence, misfolded beta-sheets of proteins can be used as biomarkers of various diseases where misfolded proteins are implicated.

In some embodiments, the present disclosure provides a method of diagnosing a disease or condition in which a misfolding-prone or an aggregating-prone protein is implicated in a subject, the method comprising:
  i) administering to the subject an effective amount of a compound of Formula (I) as described herein, or a pharmaceutically acceptable salt thereof, or a composition comprising a compound of Formula (I) as described herein, or a pharmaceutically acceptable salt thereof;
  ii) waiting a time sufficient to allow the compound to accumulate in a tissue or a cell site associated with disorder or condition (e.g., the sufficient time may include 30 sec, 1 min, 2 min, 10 min, 15 min, 30 min, 1 hour, or 2 hours); and
  iii) imaging the cell site or the tissue with an imaging technique.

In some embodiments, the method further comprises:
  i) administering to the subject an effective amount of a fluorescent probe as described herein (e.g., any of the fluorescent probes described under the "Fluorescent probes" section herein); and
  ii) waiting a time sufficient to allow the fluorescent probe to accumulate in the tissue or the cell site associated with the disorder or condition (e.g., the sufficient time may include 30 sec, 1 min, 2 min, 10 min, 15 min, 30 min, 1 hour, or 2 hours).

In some embodiments, the compound of Formula (I), or a pharmaceutically acceptable salt thereof, and the fluorescent probe, are administered to the subject simultaneously.

In some embodiments, the compound of Formula (I), or a pharmaceutically acceptable salt thereof, and the fluorescent probe, are administered to the subject in the same dosage form.

In some embodiments, the compound of Formula (I), or a pharmaceutically acceptable salt thereof, and the fluorescent probe, are administered to the subject in separate dosage forms.

In some embodiments, the compound of Formula (I), or a pharmaceutically acceptable salt thereof, and the fluorescent probe, are administered to the subject consecutively.

In some embodiments, the fluorescent probe is capable of non-covalently binding to the misfolding-prone or the aggregating-prone protein (e.g., as described herein). In some embodiments, the non-covalent binding of the fluorescent probe to the misfolding-prone or the aggregating-prone protein comprises hydrogen bonding, electrostatic effects, π-effects, hydrophobic interactions, Van der Waals forces, or any combination thereof.

In some embodiments, the binding of the fluorescent probe to the misfolding-prone or the aggregating-prone protein leads to amplification of intensity of fluorescent signal of the fluorescent probe (e.g., as described herein).

In some embodiments, contacting the sample with the fluorescent probe leads to the amplification of the detected signal through chemiluminescence resonance energy transfer (CRET) (e.g., due to spatial proximity between moiety A of the compound of Formula (I) and the fluorescent probe as described herein).

In some embodiments, contacting the sample with the compound of Formula (I) and the fluorescent probe is carried out such that there is an overlap of luminescent emission spectrum of moiety A of the compound of Formula (I) and the excitation spectrum of the fluorescent probe (e.g., as described herein for Formula (I)).

In some embodiments, the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.

In some embodiments, the fluorescent probe is selected from CRANAD-2, CRANAD-3, CRANAD-30, CRANAD-58, CRANAD-88, and CRANAD-102.

In some embodiments, the fluorescent probe is a CRANAD-3 compound of formula:

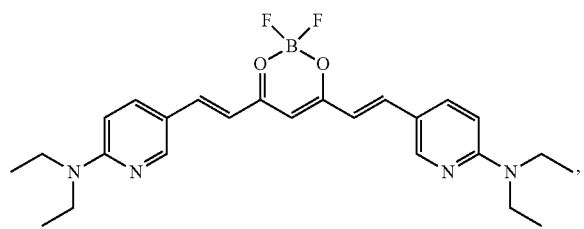

or a pharmaceutically acceptable salt thereof.

In some embodiments, the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy.

Imaging the tissue or the cell site associated with disorder or condition with an imaging technique may result in detection of a signal (e.g., chemiluminescence or fluorescence signal) from the tissue or the cell site that was imaged. Without being bound by any theory, it is believed that detection of the signal is indicative of a presence of a misfoldon in the tissue or the cell site, hence, the detection of the signal is indicative of a misfoldon-associated disease or condition in the subject. For example, detecting a fluorescence signal from the imaged brain can be indicative of a presence of amyloid beta (Aβ) misfoldons, tau misfoldons, and/or α-synuclein misfoldons, hence, detecting the signal can be indicative of an Alzheimer's disease and/or Parkinson's disease in the subject. Based on the imaging results, the subject may be diagnosed with the disease or condition by a treating physician. The physician may diagnose the subject based on a combination of other factors, such as other test results and a presence of other symptoms of the misfoldon-associated disorder. Such symptoms may include memory loss, confusion, inability to learn, dementia, shortened attention span, agitation, tremor, trembling, and/or impaired balance.

In some embodiments, the present disclosure provides a method of diagnosing a disease or condition in which a misfolding-prone or an aggregating-prone peptide or protein is implicated in a subject, the method comprising (i) contacting a sample comprising a blood, a serum, a cerebrospinal fluid, a plasma, or a brain interstitial fluid obtained from a subject with an effective amount of a compound of Formula (I) as described herein, or a pharmaceutically acceptable salt thereof, or a composition comprising the compound of Formula (I), or a pharmaceutically acceptable salt thereof, as described herein.

In some embodiments, the present disclosure provides a method of diagnosing a disease or condition characterized by accumulation of misfolding-prone or aggregation-prone peptides or proteins a subject, the method comprising (i) contacting a sample comprising a blood, a serum, a cerebrospinal fluid, a plasma, or a brain interstitial fluid obtained from a subject with an effective amount of a compound of Formula (I) as described herein, or a pharmaceutically acceptable salt thereof, or a composition comprising the compound of Formula (I), or a pharmaceutically acceptable salt thereof, as described herein.

In some embodiments, the method comprises obtaining a blood, a serum, a cerebrospinal fluid, a plasma, or a brain interstitial fluid from a subject.

In some embodiments, the method further comprises contacting the sample with a fluorescent probe as described herein (e.g., any of the fluorescent probes described under the "Fluorescent probes" section herein).

In some embodiments, the method comprises detecting a misfolding-prone or an aggregating-prone protein in the sample. In these embodiments, said contacting results in chemiluminescence emission of the compound of Formula (I) (or the fluorescence emission of the fluorescent probe) from the sample (e.g., said contacting is carried out under conditions that allow the compound of Formula (I) and/or the fluorescent probe to non-covalently bind to a misfoldon in the sample). In some embodiments, said chemiluminescence emission (or the fluorescence emission) is indicative of a presence of a misfolding-prone or an aggregating-prone protein in the sample (e.g., detecting said emission using an imaging technique results in detecting the misfoldon). Hence, in some embodiments, the method comprises detecting a chemiluminescence emission (or the fluorescence emission) of the compound of Formula (I) from the sample. In some embodiments, said detecting is indicative of a presence of a misfolding-prone or an aggregating-prone protein in the sample. As such, the detecting is indicative of a presence of a misfoldon in a blood, a serum, a cerebrospinal fluid, a plasma, or a brain interstitial fluid of the subject. In some embodiments, the method comprises comparing the emission intensity to an intensity of emission of the compound of Formula (I) or the fluorescent probe from a sample comprising a blood, a serum, a cerebrospinal fluid, a plasma, or a brain interstitial fluid obtained from a healthy subject.

The misfoldon present in the blood or serum can be an Aβ aggregate or any other misfoldon that is commonly associated with a chronic disease or condition. For example, the misfoldon can be a beta-sheet containing form of immunoglobulin G (IgG), proinsulin, insulin, or apolipoprotein A-I (APO), and can be indicative or diabetes, obesity, or compromised immunity in the subject. Hence, detecting the misfoldon in the blood or serum may be indicative or a chronic condition or a neurodegenerative disease in the subject, in the pathology of either of which a misfoldon is implicated, or which is characterized by accumulation of misfoldons in the blood. Without being bound by any theory, it is believed that Aβ aggregates and other misfoldons commonly associated with neurodegenerative diseases can induce prion-like propagation in serum. That is, these misfoldons can cause other blood peptides and proteins, such as immunoglobulin G (IgG), proinsulin, insulin, or apolipoprotein A-I (APO), to form beta-sheets and aggregates, leading to accumulation of various misfoldons in the blood or serum of the subject. Based on the test results, the subject may be diagnosed with the disease or condition by a treating physician. The physician may diagnose the subject based on combination of other factors, such as other test results and a presence of other symptoms of the misfoldon-associated disorder.

In some embodiments, the misfolding-prone or the aggregating-prone peptide or protein is selected from any of the misfolding-prone or the aggregating-prone peptides or proteins described in "Misfolding-prone or the aggregating-prone proteins" section herein, or a combination thereof.

In some embodiments, the misfolding-prone or the aggregating-prone peptide or protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

In some embodiments, the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.

In some embodiments, the amyloid beta (Aβ) protein is selected from $A\beta_{40}$ and $A\beta_{42}$.

In some embodiments, the misfolding-prone or the aggregating-prone protein is in the misfolded or the aggregated state.

In some embodiments, the protein is amyloid beta (Aβ) protein in a form of aggregates or plaques.

In some embodiments, the misfolding-prone or the aggregating-prone protein comprises hydrophobic beta-sheets capable of non-covalently binding the moiety B of the compound of Formula (I) as described herein and/or the fluorescent probe as described herein.

In some embodiments, the disease or condition in which a misfolding-prone or an aggregating-prone protein is implicated is a neurological or a neurodegenerative disorder.

In some embodiments, the neurological or the neurodegenerative disorder is selected from the group consisting of Alzheimer's disease (AD) (familial or sporadic), Parkinson's disease (PD), Huntington's Disease (HD), motor neuron disease (MND), Prion disease (including rare sporadic prion disease), variably protease-sensitive prionopathy, cerebral amyloid angiopathy, vascular cognitive impairment (VCI), dementia, dementia with Lewy bodies, frontotemporal dementia (FTD), amyotrophic lateral sclerosis (ALS), multiple sclerosis, hippocampal sclerosis, Binswanger's disease, Creutzfeldt-Jakob disease, Gerstmann-Sträussler-Scheinker syndrome, and serpinopathy (e.g., α1-antitrypsin deficiency or familial encephalopathy with neuroserpin inclusion bodies).

In some embodiments, the neurological or the neurodegenerative disorder is selected from the group consisting of Alzheimer's disease (AD), Parkinson's disease (PD), Huntington's Disease (HD), motor neuron disease (MND), Prion disease, cerebral amyloid angiopathy, vascular cognitive impairment (VCI), dementia, dementia with Lewy bodies, frontotemporal dementia (FTD), amyotrophic lateral sclerosis (ALS), multiple sclerosis, hippocampal sclerosis, Binswanger's disease, and Creutzfeldt-Jakob disease.

In some embodiments, the disease or condition in which a misfolding-prone or an aggregating-prone protein is implicated is chronic disease or condition. Without being bound by a theory, it is believed that sera of patients ill with chronic diseases include plenty of misfoldons. In some embodiments, the chronic disease or condition is characterized by accumulation of misfolding-prone or aggregation-prone peptides or proteins in the blood of a subject. In some embodiments, the chronic disease or condition is selected from diabetes (e.g., type 2 diabetes), multiple sclerosis, pulmonary fibrosis, arthritis (e.g., rheumatoid arthritis), ALS, cystic fibrosis, osteoporosis, asthma, and cancer (e.g., lung cancer, head and neck cancer, breast cancer, or prostate cancer).

In some embodiments, the method can be carried out substantially similar to the methods described herein under the section "Methods of detecting a misfolding-prone or an aggregating-prone proteins."

In some embodiments, the present disclosure provides a method of determining a healthy state of a serum obtained from a subject, the method comprising contacting a sample comprising the serum with an effective amount of a compound of Formula (I) as described herein, or a pharmaceutically acceptable salt thereof, or a composition comprising the compound of Formula (I), or a pharmaceutically acceptable salt thereof, as described herein.

In some embodiments, the method further comprises contacting the sample with a fluorescent probe as described herein (e.g., any of the fluorescent probes described under the "Fluorescent probes" section herein).

In these embodiments, said contacting does not result in any substantial chemiluminescence emission of the compound of Formula (I) (or the fluorescence emission of the fluorescent probe) from the sample (e.g., no substantial emission signal can be detected from the sample using an appropriate imaging technique). In some embodiments, the absence of any substantial chemiluminescence emission (or any fluorescence emission) is indicative of the healthy state of the serum obtained from the subject. The healthy state of the serum is indicative of the absence of a chronic disease or condition in the subject, as well as the absence of a neurodegenerative disease in the subject. As such, the method is widely applicable in routine blood tests, for example, to determine if the subject is suitable as a blood donor. That is, absence of any misfoldons in the blood obtained from the subject indicates that the blood is safe to be transfused to a recipient. The compositions, methods, and probes can be used to efficiently evaluate quality of blood, serum, and plasma from a donor. Determining healthy state of the blood, serum, or plasma prior to transfusion advantageously allows to avoid prion-like propagation in the blood of the recipients, thereby preventing the spread to the receipts of chronic diseases and conditions and neurodegenerative conditions in which misfoldons are implicated.

Methods of Monitoring Treatment of a Disease or a Condition

In some embodiments, the present disclosure provides a method of monitoring treatment of a disease or condition in which a misfolding-prone or an aggregating-prone protein is implicated in a subject, the method comprising:
i) administering to the subject an effective amount of a compound of Formula (I), or a pharmaceutically acceptable salt thereof, or a composition comprising a compound of Formula (I), or a pharmaceutically acceptable salt thereof, as described herein;
ii) waiting a time sufficient to allow the compound to accumulate in a cell site or a tissue associated with the disease or condition (e.g., the sufficient time may include 30 sec, 1 min, 2 min, 10 min, 15 min, 30 min, 1 hour, or 2 hours);
iii) imaging the cell site or the tissue with an imaging technique;
iv) administering to the subject a therapeutic agent in an effective amount to treat the disease or condition;
v) after iv), administering to the subject an effective amount of a compound of Formula (I), or a pharmaceutically acceptable salt thereof, or a composition comprising a compound of Formula (I), or a pharmaceutically acceptable salt thereof, as described herein;
vi) waiting a time sufficient to allow the compound to accumulate in the cell site or the tissue associated with the disease or condition; (e.g., the sufficient time may include 30 sec, 1 min, 2 min, 10 min, 15 min, 30 min, 1 hour, or 2 hours)
vii) imaging the cell site or the tissue with an imaging technique; and
viii) comparing the image of step iii) and the image of step vii).

In some embodiments, the comparing in step viii) is carried out by a treating physician.

In some embodiments, the cell site or the tissue is a brain.
In some embodiments, the cell site of the tissue is an eye, a skin, or a nose of the subject.

In some embodiments, the method further comprises:
i) administering to the subject an effective amount of a fluorescent probe as described herein (e.g., any of the fluorescent probes described under the "Fluorescent probes" section herein); and
ii) waiting a time sufficient to allow the fluorescent probe to accumulate at the cell site or the tissue associated with the disease or condition (e.g., the sufficient time may include 30 sec, 1 min, 2 min, 10 min, 15 min, 30 min, 1 hour, or 2 hours).

In some embodiments, the compound of Formula (I), or a pharmaceutically acceptable salt thereof, and the fluorescent probe, are administered to the subject simultaneously.

In some embodiments, the compound of Formula (I), or a pharmaceutically acceptable salt thereof, and the fluorescent probe, are administered to the subject in the same dosage form.

In some embodiments, the compound of Formula (I), or a pharmaceutically acceptable salt thereof, and the fluorescent probe, are administered to the subject in separate dosage forms.

In some embodiments, the compound of Formula (I), or a pharmaceutically acceptable salt thereof, and the fluorescent probe, are administered to the subject consecutively.

In some embodiments, the fluorescent probe is capable of non-covalently binding to the misfolding-prone or the aggregating-prone protein (e.g., as described herein). In some embodiments, the non-covalent binding of the fluorescent probe to the misfolding-prone or the aggregating-prone protein comprises hydrogen bonding, electrostatic effects, π-effects, hydrophobic interactions, Van der Waals forces, or any combination thereof.

In some embodiments, the binding of the fluorescent probe to the misfolding-prone or the aggregating-prone protein leads to amplification of intensity of fluorescent signal of the fluorescent probe (e.g., as described herein).

In some embodiments, contacting the sample with the fluorescent probe leads to the amplification of the detected signal through chemiluminescence resonance energy transfer (CRET) (e.g., due to special proximity between moiety A of the compound of Formula (I) and the fluorescent probe as described herein).

In some embodiments, contacting the sample with the compound of Formula (I) and the fluorescent probe is carried out such that there is an overlap of luminescent emission spectrum of moiety A of the compound of Formula (I) and the excitation spectrum of the fluorescent probe (e.g., as described herein for Formula (I)).

In some embodiments, the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.

In some embodiments, the fluorescent probe is selected from CRANAD-2, CRANAD-3, CRANAD-30, CRANAD-58, CRANAD-88, and CRANAD-102.

In some embodiments, the fluorescent probe is a CRANAD-3 compound of formula:

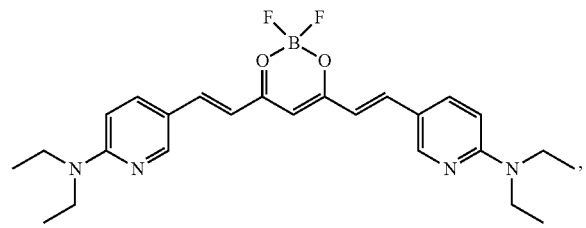

or a pharmaceutically acceptable salt thereof.

In some embodiments, the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy.

In some embodiments, the misfolding-prone or the aggregating-prone peptide or protein is selected from any of the misfolding-prone or the aggregating-prone peptides or proteins described in "Misfolding-prone or the aggregating-prone proteins" section herein, or a combination thereof.

In some embodiments, the misfolding-prone or the aggregating-prone peptide or protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

In some embodiments, the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.

In some embodiments, the amyloid beta (Aβ) protein is selected from $A\beta_{40}$ and $A\beta_{42}$.

In some embodiments, the misfolding-prone or the aggregating-prone protein is in the misfolded or the aggregated state.

In some embodiments, the protein is amyloid beta (Aβ) protein in a form of aggregates or plaques.

In some embodiments, the misfolding-prone or the aggregating-prone protein comprises hydrophobic beta-sheets capable of non-covalently binding the moiety B of the compound of Formula (I) as described herein and/or the fluorescent probe as described herein.

In some embodiments, the disease or condition in which a misfolding-prone or an aggregating-prone protein is implicated is a neurological or a neurodegenerative disorder.

In some embodiments, the neurological or the neurodegenerative disorder is selected from the group consisting of Alzheimer's disease (AD) (familial or sporadic), Parkinson's disease (PD), Huntington's Disease (HD), motor neuron disease (MND), Prion disease (including rare sporadic prion disease), variably protease-sensitive prionopathy, cerebral amyloid angiopathy, vascular cognitive impairment (VCI), dementia, dementia with Lewy bodies, frontotemporal dementia (FTD), amyotrophic lateral sclerosis (ALS), multiple sclerosis, hippocampal sclerosis, Binswanger's disease, Creutzfeldt-Jakob disease, Gerstmann-Sträussler-Scheinker syndrome, and serpinopathy (e.g., α1-antitrypsin deficiency or familial encephalopathy with neuroserpin inclusion bodies).

In some embodiments, the neurological or the neurodegenerative disorder is selected from the group consisting of Alzheimer's disease (AD), Parkinson's disease (PD), Huntington's Disease (HD), motor neuron disease (MND), Prion disease, cerebral amyloid angiopathy, vascular cognitive impairment (VCI), dementia, dementia with Lewy bodies, frontotemporal dementia (FTD), amyotrophic lateral sclerosis (ALS), multiple sclerosis, hippocampal sclerosis, Binswanger's disease, and Creutzfeldt-Jakob disease.

In some embodiments, the present disclosure also provides a method for determining (or predicting) effectiveness of immunotherapy for a neurodegenerative disease or condition (e.g., any of the neurodegenerative disease or conditions described herein), the method comprising:

(i) administering immunotherapy to a subject in need thereof;

(ii) after (i), obtaining a serum from the subject; and (iii) contacting a sample comprising the serum with an effective amount of a compound of Formula (I) as described herein, or a pharmaceutically acceptable salt thereof, or a composition comprising the compound of Formula (I), or a pharmaceutically acceptable salt thereof, as described herein.

In some embodiments, the method further comprises, after (iii), contacting the sample with a fluorescent probe as described herein (e.g., any of the fluorescent probes described under the "Fluorescent probes" section herein).

In some embodiments, the method further comprises, after (iii) or (iv), determining that said contacting does not result in any substantial chemiluminescence emission of the compound of Formula (I) (or the fluorescence emission of the fluorescent probe) from the sample (e.g., no substantial emission signal can be detected from the sample using an appropriate imaging technique as described herein). In some embodiments, the absence of any substantial chemiluminescence emission (or any fluorescence emission) is indicative of the effectiveness of the immunotherapy. Without being bound by a theory, it is believed that the absence of the emission can be attributed to effective blocking by the immunotherapy (e.g., an antibody) of a misfoldon associated with the neurodegenerative disease or condition in the blood of the subject. As such, the effective blocking prevents prion-like propagation of misfoldons in the blood of the subject induced by the misfoldon associated with the neurodegenerative disease or condition.

In some embodiments, the neurodegenerative disease or condition is selected from Alzheimer's disease and Parkinson's disease. In some embodiments, the neurodegenerative disease or condition is Alzheimer's disease.

In some embodiments, the antibody is anti-Aβ antibody (e.g., aducanumab, 6E10 antibody, 6E10 antibody, ab2539, gantenerumab, and crenezumab, or saracatinib). In some embodiments, the antibody is anti-tau. In some embodiments, the antibody is anti-α-synuclein.

Pharmaceutical Compositions

The present application also provides pharmaceutical compositions comprising an effective amount of a compound of the present disclosure (e.g., Formula (I) or a fluorescent probe) disclosed herein, or a pharmaceutically acceptable salt thereof; and a pharmaceutically acceptable carrier. The pharmaceutical composition may also comprise any one of the additional therapeutic agents described herein. In certain embodiments, the application also provides pharmaceutical compositions and dosage forms comprising any one the additional therapeutic agents described herein. The carrier(s) are "acceptable" in the sense of being compatible with the other ingredients of the formulation and, in the case of a pharmaceutically acceptable carrier, not deleterious to the recipient thereof in an amount used in the medicament.

Pharmaceutically acceptable carriers, adjuvants and vehicles that may be used in the pharmaceutical compositions of the present application include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium tri silicate, polyvinyl pyrrolidone, cellulose-based substances, polyethylene glycol, sodium carboxymethylcellulose, polyacrylates, waxes, polyethylene-polyoxypropylene-block polymers, polyethylene glycol, and wool fat.

The compositions or dosage forms may contain any one of the compounds and therapeutic agents described herein in the range of 0.005% to 100% with the balance made up from the suitable pharmaceutically acceptable excipients. The contemplated compositions may contain 0.001%-100% of any one of the compounds and therapeutic agents provided herein, in one embodiment 0.1-95%, in another embodiment 75-85%, in a further embodiment 20-80%, wherein the balance may be made up of any pharmaceutically acceptable excipient described herein, or any combination of these excipients.

Routes of Administration and Dosage Forms

The pharmaceutical compositions of the present application include those suitable for any acceptable route of administration. Acceptable routes of administration include, but are not limited to, buccal, cutaneous, endocervical, endosinusial, endotracheal, enteral, epidural, interstitial, intra-abdominal, intra-arterial, intrabronchial, intrabursal, intracerebral, intracisternal, intracoronary, intradermal, intraductal, intraduodenal, intradural, intraepidermal, intraesophageal, intragastric, intragingival, intraileal, intralymphatic, intramedullary, intrameningeal, intramuscular, intranasal, intraovarian, intraperitoneal, intraprostatic, intrapulmonary, intrasinal, intraspinal, intrasynovial, intratesticular, intrathecal, intratubular, intratumoral, intrauterine, intravascular, intravenous, nasal, nasogastric, oral, parenteral, percutaneous, peridural, rectal, respiratory (inhalation), subcutaneous, sublingual, submucosal, topical, transdermal, transmucosal, transtracheal, ureteral, urethral and vaginal.

Compositions and formulations described herein may conveniently be presented in a unit dosage form, e.g., tablets, sustained release capsules, and in liposomes, and may be prepared by any methods well known in the art of pharmacy. See, for example, Remington: The Science and Practice of Pharmacy, Lippincott Williams & Wilkins, Baltimore, MD (20th ed. 2000). Such preparative methods include the step of bringing into association with the molecule to be administered ingredients such as the carrier that constitutes one or more accessory ingredients. In general, the compositions are prepared by uniformly and intimately bringing into association the active ingredients with liquid carriers, liposomes or finely divided solid carriers, or both, and then, if necessary, shaping the product.

In some embodiments, any one of the compounds and therapeutic agents disclosed herein are administered orally. Compositions of the present application suitable for oral administration may be presented as discrete units such as capsules, sachets, granules or tablets each containing a predetermined amount (e.g., effective amount) of the active ingredient; a powder or granules; a solution or a suspension in an aqueous liquid or a non-aqueous liquid; an oil-in-water liquid emulsion; a water-in-oil liquid emulsion; packed in liposomes; or as a bolus, etc. Soft gelatin capsules can be useful for containing such suspensions, which may beneficially increase the rate of compound absorption. In the case of tablets for oral use, carriers that are commonly used include lactose, sucrose, glucose, mannitol, and silicic acid and starches. Other acceptable excipients may include: a) fillers or extenders such as starches, lactose, sucrose, glucose, mannitol, and silicic acid, b) binders such as, for example, carboxymethylcellulose, alginates, gelatin, polyvinylpyrrolidinone, sucrose, and acacia, c) humectants such as glycerol, d) disintegrating agents such as agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. For oral administration in a capsule form, useful diluents include lactose and dried corn starch. When aqueous suspensions are administered orally, the active ingredient is combined with emulsifying and suspending agents. If desired, certain sweetening and/or flavoring and/or coloring agents may be added. Compositions suitable for oral administration include lozenges comprising the ingredients in a flavored basis, usually sucrose and acacia or tragacanth; and pastilles comprising the active ingredient in an inert basis such as gelatin and glycerin, or sucrose and acacia.

Compositions suitable for parenteral administration include aqueous and non-aqueous sterile injection solutions or infusion solutions which may contain antioxidants, buffers, bacteriostats and solutes which render the formulation isotonic with the blood of the intended recipient; and aqueous and non-aqueous sterile suspensions which may include suspending agents and thickening agents. The formulations may be presented in unit-dose or multi-dose containers, for example, sealed ampules and vials, and may be stored in a freeze dried (lyophilized) condition requiring only the addition of the sterile liquid carrier, for example water for injections, saline (e.g., 0.9% saline solution) or 5% dextrose solution, immediately prior to use. Extemporaneous injection solutions and suspensions may be prepared from sterile powders, granules and tablets. The injection solutions may be in the form, for example, of a sterile injectable aqueous or oleaginous suspension. This suspension may be formulated according to techniques known in the art using suitable dispersing or wetting agents and suspending agents. The sterile injectable preparation may also be a sterile injectable solution or suspension in a non-toxic parenterally-acceptable diluent or solvent, for example, as a solution in 1,3-butanediol. Among the acceptable vehicles and solvents that may be employed are mannitol, water, Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant.

The pharmaceutical compositions of the present application may be administered in the form of suppositories for rectal administration. These compositions can be prepared by mixing a compound of the present application with a suitable non-irritating excipient which is solid at room temperature but liquid at the rectal temperature and therefore will melt in the rectum to release the active components. Such materials include, but are not limited to, cocoa butter, beeswax, and polyethylene glycols.

The pharmaceutical compositions of the present application may be administered by nasal aerosol or inhalation. Such compositions are prepared according to techniques well-known in the art of pharmaceutical formulation and may be prepared as solutions in saline, employing benzyl alcohol or other suitable preservatives, absorption promoters to enhance bioavailability, fluorocarbons, and/or other solubilizing or dispersing agents known in the art. See, for example, U.S. Pat. No. 6,803,031. Additional formulations and methods for intranasal administration are found in Ilium, L., *J Pharm Pharmacol*, 56:3-17, 2004 and Ilium, L., *Eur J Pharm Sci* 11:1-18, 2000.

The topical compositions of the present disclosure can be prepared and used in the form of an aerosol spray, cream, emulsion, solid, liquid, dispersion, foam, oil, gel, hydrogel, lotion, mousse, ointment, powder, patch, pomade, solution, pump spray, stick, towelette, soap, or other forms commonly employed in the art of topical administration and/or cosmetic and skin care formulation. The topical compositions can be in an emulsion form. Topical administration of the pharmaceutical compositions of the present application is especially useful when the desired treatment involves areas or organs readily accessible by topical application. In some embodiments, the topical composition comprises a combination of any one of the compounds and therapeutic agents disclosed herein, and one or more additional ingredients, carriers, excipients, or diluents including, but not limited to, absorbents, anti-irritants, anti-acne agents, preservatives, antioxidants, coloring agents/pigments, emollients (moisturizers), emulsifiers, film-forming/holding agents, fragrances, leave-on exfoliants, prescription drugs, preservatives, scrub agents, silicones, skin-identical/repairing agents, slip agents, sunscreen actives, surfactants/detergent cleansing agents, penetration enhancers, and thickeners.

The compounds and therapeutic agents of the present application may be incorporated into compositions for coating an implantable medical device, such as prostheses, artificial valves, vascular grafts, stents, or catheters. Suitable coatings and the general preparation of coated implantable devices are known in the art and are exemplified in U.S. Pat. Nos. 6,099,562; 5,886,026; and 5,304,121. The coatings are typically biocompatible polymeric materials such as a hydrogel polymer, polymethyldisiloxane, polycaprolactone, polyethylene glycol, polylactic acid, ethylene vinyl acetate, and mixtures thereof. The coatings may optionally be further covered by a suitable topcoat of fluorosilicone, polysaccharides, polyethylene glycol, phospholipids or combinations thereof to impart controlled release characteristics in the composition. Coatings for invasive devices are to be included within the definition of pharmaceutically acceptable carrier, adjuvant or vehicle, as those terms are used herein.

According to another embodiment, the present application provides an implantable drug release device impregnated with or containing a compound or a therapeutic agent, or a composition comprising a compound of the present application or a therapeutic agent, such that said compound or therapeutic agent is released from said device and is therapeutically active.

Dosages and Regimens

In the pharmaceutical compositions of the present application, a compound of the present disclosure (e.g., a compound of Formula (I)) is present in an effective amount (e.g., a therapeutically effective amount). Effective doses may vary, depending on the diseases treated, the severity of the disease, the route of administration, the sex, age and general health condition of the subject, excipient usage, the possibility of co-usage with other therapeutic treatments such as use of other agents and the judgment of the treating physician.

In some embodiments, an effective amount of the compound (e.g., Formula (I)) can range, for example, from about 0.001 mg/kg to about 500 mg/kg (e.g., from about 0.001 mg/kg to about 200 mg/kg; from about 0.01 mg/kg to about 200 mg/kg; from about 0.01 mg/kg to about 150 mg/kg; from about 0.01 mg/kg to about 100 mg/kg; from about 0.01 mg/kg to about 50 mg/kg; from about 0.01 mg/kg to about 10 mg/kg; from about 0.01 mg/kg to about 5 mg/kg; from about 0.01 mg/kg to about 1 mg/kg; from about 0.01 mg/kg to about 0.5 mg/kg; from about 0.01 mg/kg to about 0.1 mg/kg; from about 0.1 mg/kg to about 200 mg/kg; from about 0.1 mg/kg to about 150 mg/kg; from about 0.1 mg/kg to about 100 mg/kg; from about 0.1 mg/kg to about 50 mg/kg; from about 0.1 mg/kg to about 10 mg/kg; from about 0.1 mg/kg to about 5 mg/kg; from about 0.1 mg/kg to about 2 mg/kg; from about 0.1 mg/kg to about 1 mg/kg; or from about 0.1 mg/kg to about 0.5 mg/kg). In some embodiments, an effective amount of a compound of Formula (I) is about 0.1 mg/kg, about 0.5 mg/kg, about 1 mg/kg, about 2 mg/kg, or about 5 mg/kg.

The foregoing dosages can be administered on a daily basis (e.g., as a single dose or as two or more divided doses, e.g., once daily, twice daily, thrice daily) or non-daily basis (e.g., every other day, every two days, every three days, once weekly, twice weekly, once every two weeks, once a month).

Kits

The present invention also includes pharmaceutical kits useful, for example, in the imaging and/or diagnosing or monitoring treatment of disorders, diseases and conditions referred to herein, which include one or more containers containing a pharmaceutical composition comprising a therapeutically effective amount of a compound of the present disclosure. Such kits can further include, if desired, one or more of various conventional pharmaceutical kit components, such as, for example, containers with one or more pharmaceutically acceptable carriers, additional containers, etc. Instructions, either as inserts or as labels, indicating quantities of the components to be administered, guidelines for administration, and/or guidelines for mixing the components, can also be included in the kit. The kit may optionally include an additional therapeutic agent as described herein.

Definitions

As used herein, the term "about" means "approximately" (e.g., plus or minus approximately 10% of the indicated value).

At various places in the present specification, substituents of compounds of the invention are disclosed in groups or in ranges. It is specifically intended that the invention include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

At various places in the present specification various aryl, heteroaryl, cycloalkyl, and heterocycloalkyl rings are described. Unless otherwise specified, these rings can be attached to the rest of the molecule at any ring member as permitted by valency. For example, the term "a pyridine ring" or "pyridinyl" may refer to a pyridin-2-yl, pyridin-3-yl, or pyridin-4-yl ring.

It is further appreciated that certain features of the invention, which are, for clarity, described in the context of separate embodiments, can also be provided in combination in a single embodiment. Conversely, various features of the invention which are, for brevity, described in the context of a single embodiment, can also be provided separately or in any suitable subcombination.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. The substituents are independently selected, and substitution may be at any chemically accessible position. As used herein, the term "substituted" means that a hydrogen atom is removed and replaced by a substituent. A single divalent substituent, e.g., oxo, can replace two hydrogen atoms. It is to be understood that substitution at a given atom is limited by valency.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, the term "$C_{n-m}$ haloalkyl", employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,1-diyl, ethan-1,2-diyl, propan-1,1,-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene moiety contains 2 to 6, 2 to 4, 2 to 3, 1 to 6, 1 to 4, or 1 to 2 carbon atoms.

The term "$(C_{x-y})$alkenylene" (wherein x and y are integers) refers to an alkenylene group containing from x to y carbon atoms. An alkenylene group formally corresponds to an alkene with two C—H bonds replaced by points of attachment of the alkenylene group to the remainder of the polymer. Examples are divalent straight hydrocarbon groups consisting of alkenyl groups, such as —HC=CH— and —HC=CH—CH$_2$—. The $(C_{x-y})$alkenylene groups include $(C_{2-6})$alkenylene and $(C_{2-4})$alkenylene. As used herein, the term "$C_{n-m}$ alkoxy", employed alone or in combination with other terms, refers to a group of formula —O-alkyl, wherein the alkyl group has n to m carbons. Example alkoxy groups include, but are not limited to, methoxy, ethoxy, propoxy (e.g., n-propoxy and isopropoxy), butoxy (e.g., n-butoxy and tert-butoxy), and the like. In some embodiments, the alkyl group has 1 to 6, 1 to 4, or 1 to 3 carbon atoms.

As used herein, "$C_{n-m}$ haloalkoxy" refers to a group of formula —O-haloalkyl having n to m carbon atoms. An example haloalkoxy group is OCF$_3$. In some embodiments, the haloalkoxy group is fluorinated only. In some embodiments, the alkyl group has 1 to 6, 1 to 4, or 1 to 3 carbon atoms.

As used herein, the term "amino" refers to a group of formula —NH$_2$.

As used herein, the term "$C_{n-m}$ alkylamino" refers to a group of formula —NH(alkyl), wherein the alkyl group has n to m carbon atoms. In some embodiments, the alkyl group has 1 to 6, 1 to 4, or 1 to 3 carbon atoms. Examples of alkylamino groups include, but are not limited to, N-methylamino, N-ethylamino, N-propylamino (e.g., N-(n-propyl)amino and N-isopropylamino), N-butylamino (e.g., N-(n-butyl)amino and N-(tert-butyl)amino), and the like.

As used herein, the term "di($C_{n-m}$-alkyl)amino" refers to a group of formula —N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "thio" refers to a group of formula —SH.

As used herein, the term "$C_{n-m}$ alkylthio" refers to a group of formula —S-alkyl, wherein the alkyl group has n to m carbon atoms. In some embodiments, the alkyl group has 1 to 6, 1 to 4, or 1 to 3 carbon atoms.

As used herein, "halo" refers to F, Cl, Br, or I. In some embodiments, a halo is F, Cl, or Br The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

The compounds described herein can be asymmetric (e.g., having one or more stereocenters). All stereoisomers, such as enantiomers and diastereomers, are intended unless otherwise indicated. Compounds of the present invention that contain asymmetrically substituted carbon atoms can be isolated in optically active or racemic forms. Methods on how to prepare optically active forms from optically inactive starting materials are known in the art, such as by resolution of racemic mixtures or by stereoselective synthesis. Many geometric isomers of olefins, C=N double bonds, N=N double bonds, and the like can also be present in the compounds described herein, and all such stable isomers are contemplated in the present invention. Cis and trans geometric isomers of the compounds of the present invention are described and may be isolated as a mixture of isomers or as separated isomeric forms. In some embodiments, the compound has the (R)-configuration. In some embodiments, the compound has the (S)-configuration.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone-enol pairs, amide-imidic acid pairs, lactam-lactim pairs, enamine-imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

As used herein, the term "cell" is meant to refer to a cell that is in vitro, ex vivo or in vivo. In some embodiments, an ex vivo cell can be part of a tissue sample excised from an organism such as a mammal. In some embodiments, an in vitro cell can be a cell in a cell culture. In some embodiments, an in vivo cell is a cell living in an organism such as a mammal.

As used herein, the term "contacting" refers to the bringing together of indicated moieties in an in vitro system, an in vivo system, or ex vivo system. For example, "contacting" the aggregation-prone biomolecule with a compound of the present disclosure includes the administration of a compound of the present disclosure to an individual or patient, such as a human, having aggregation-prone biomolecule, as well as, for example, introducing a compound of the invention into a sample containing a cellular or purified preparation containing the aggregation-prone biomolecule.

As used herein, the term "individual", "patient", or "subject" used interchangeably, refers to any animal, including mammals, preferably mice, rats, other rodents, rabbits, dogs, cats, swine, cattle, sheep, horses, or primates, and most preferably humans.

As used herein, the phrase "effective amount" or "therapeutically effective amount" refers to the amount of active compound or pharmaceutical agent that elicits the biological or medicinal response in a tissue, system, animal, individual or human that is being sought by a researcher, veterinarian, medical doctor or other clinician.

As used herein the term "treating" or "treatment" refers to 1) inhibiting the disease; for example, inhibiting a disease, condition or disorder in an individual who is experiencing or displaying the pathology or symptomatology of the disease, condition or disorder (i.e., arresting further development of the pathology and/or symptomatology), or 2) ameliorating the disease; for example, ameliorating a disease, condition or disorder in an individual who is experiencing or displaying the pathology or symptomatology of the disease, condition or disorder (i.e., reversing the pathology and/or symptomatology).

As used herein, the term "preventing" or "prevention" of a disease, condition or disorder refers to decreasing the risk of occurrence of the disease, condition or disorder in a subject or group of subjects (e.g., a subject or group of subjects predisposed to or susceptible to the disease, condition or disorder). In some embodiments, preventing a disease, condition or disorder refers to decreasing the possibility of acquiring the disease, condition or disorder and/or its associated symptoms. In some embodiments, preventing a disease, condition or disorder refers to completely or almost completely stopping the disease, condition or disorder from occurring.

EXAMPLES

Materials and Methods: reagents used for the synthesis were purchased from Sigma-Aldrich and used without further purification. Column chromatography was performed on a glass column slurry-packed with silica gel (60 Å, 40-63 mm; SiliCycle Inc.). Recombinant Aβ peptide (1-40/42) were purchased from rPeptide (A-1163-1). Aβ aggregates for in vitro studies were generated by slow stirring of Aβ40 in PBS buffer for 3 days at room temperature. $^1$H and $^{13}$C NMR spectra were recorded at 500 MHz and 125 MHz on Bruker spectrometers in CDCl$_3$, CD$_3$OD or DMSO-d$_6$ solutions at room temperature with tetramethylsilane (TMS, δ=0) as an internal standard. Liquid chromatography-mass spectrometry (LC-MS) was performed using an Agilent 1200 Series apparatus with an LC/MSD trap and Daly conversion dynode detector with UV detection at 254 nm. Fluorescence measurements were carried out using an F-7100 fluorescence spectrophotometer (Hitachi). Transgenic female 5xFAD mice and age-matched wild-type female mice were purchased from Jackson Laboratory. All animal experiments were approved by the Institutional Animal Use and Care Committee at Massachusetts General Hospital. The IVIS Spectrum animal imaging system (PerkinElmer) was used for in vitro and in vivo imaging.

Oxygen and ROS sensitivity of ADLumin-1: A 100.0 μL DMSO solution of ADLumin-1 (200.0 μM) was added to a well in a 96-well plate. One group was bubbled with oxygen for 5 seconds at different time points, and the control group was sealed without bubbling. Once the bubbling was over, the plate was subjected to chemiluminescence intensity recording with the IVIS system with the open filter setting (500 nm-840 nm). For ROS tests, A PBS solution (240 μL) was incubated in an Eppendorf tube. To each of above tubes, different ROS ($H_2O_2$ 30 μL, $ClO_4^-$ 30 μL, TBHP 30 μL and $KO_2$ 30 μL) was added, respectively. Then, a solution of ADLumin-1 in DMSO (30 μL, 250.0 μM) was added. Finally, 100.0 μL of the resulting solution was transferred into a well of 96-well plate, and triplicated samples were prepared. Chemiluminescence images were obtained with an IVIS system under the open filter (500 nm-840 nm).

Preparation of Aβ40 aggregates: 1.0 mg of Aβ40 peptide (TFA) was suspended in 1% ammonia hydroxyl solution (1.0 mL). Then 100 μL of the resulting solution was diluted 10-fold with PBS buffer (pH 7.4) and stirred at room temperature for 3 days. Transmission electron microscopy and Thioflavin T solution test were used to confirm the formation of aggregates.

In vitro fluorescence spectral testing of ADLumin-1 with Aβ40 aggregates: to test the interactions of ADLumin-1 with Aβs, the following three-step procedure was used. In step 1, 1.0 mL of double-distilled water was added to a quartz cuvette as a blank control, and its fluorescence was recorded with the same parameters used for ADLumin-1. In step 2, the fluorescence of an ADLumin-1 solution (1.0 mL, 250.0 nM) was recorded with excitation at 410 nm and emission from 450-700 nm. In step 3, to the above ADLumin-1 solution, 10.0 μL of Aβs (25.0 μM stock solution in PBS buffer for Aβ40 aggregates) were added to make the final Aβ concentration of 250.0 nM. Fluorescence readings from this solution were recorded as described in step 2. A blank control from step 1 was used to correct the final spectra from steps 2 and 3.

In vitro chemiluminescence study: a PBS solution (100.0 μL) or brain homogenate (100.0 μL) was incubated in an Eppendorf tube in the presence or absence of Aβ aggregates (final concentration 12.5 μM). To each of the above tubes, a solution of ADLumin-1 in DMSO (5.0 μL, 250 μM) was added. For the CRET test, 5.0 μL DMSO solution of CRANAD-3 (250.0 μM) and 5.0 μL DMSO solution of ADLumin-1 (250.0 μM) were added (Aβ aggregates final concentration 12.5 μM). Finally, 100.0 μL of the resulting solution was transferred into a well of 96-well plate, and triplicated samples were prepared. Chemiluminescence images were obtained with an IVIS system under the open filter (500 nm-840 nm) or specific filters. Binding affinity of ADLumin-1 with Aβs: a series of solutions containing 250.0 nM of ADLumin-1 and various concentrations of Aβ40 aggregates (0.0, 25.0, 100.0, 250.0, 500.0, 1000.0, 2000.0, 4000.0, 8000.0 nM) were subjected to fluorescence spectral recording ($E_x$=420 nm, $E_m$=450-700 nm). The emission readings at 515 nm were used for a nonlinear specific binding fitting.

In vitro histological study: a fresh brain tissue from a 24-month old APP/PS1 mouse was fixed in 4% formaldehyde for 24 hours and transferred into 30% sucrose at 4° C. until the tissue sunk. Then the tissue was embedded in OCT with gradual cooling over dry ice. The OCT embedded tissue block was sectioned into 25-μm slice with a cryostat. 25 μM of ADLumin-1 in 50% ethanol/PBS was prepared as the staining solution. The brain slices were incubated with freshly prepared staining solution for 15 min at room temperature and then washed with 70% ethanol for 1 min, 50% ethanol for 1 min, followed by washing with double distilled water twice. Then the slice was covered with FluoroShield mounting medium (Abcam) and sealed with nail polish. Florescence images were obtained using the Nikon Eclipse 50i microscope with a blue light excitation channel.

In vivo two-photon imaging: a 15-month-old 5xFAD female mouse was anesthetized with 2% isoflurane, and a cranial imaging window was surgically prepared as described. Before ADLumin-1 injection, two-photon images of capillary were acquired using 900-nm laser (Prairie Ultima) with 570 to 620 nm emission by injection of Rhodamine B isothiocyanate-Dextran. A bolus i.v. injection of ADLumin-1 (4 mg/kg in a fresh solution of 15% cremophor, 15% DMSO, and 70% PBS) was administered at time 0 min during image acquisition. The images were acquired with an emission channel of 500 to 550 nm. For imaging, a two-photon microscope (Olympus BX-51) was used equipped with a 20× water-immersion objective (0.45 numerical aperture; Olympus). Single Images were collected with 512×512 pixel resolution. The T-Series images were acquired for 20 min continuously for the same regions. Image analysis was performed with ImageJ software.

Ex vivo histological study: the mouse used for two-photon imaging with ADLumin-1 was sacrificed at 2 h after the injection. The fresh brain tissue was fixed in 4% formaldehyde for 24 hours and transferred into 30% sucrose at 4° C. until the tissue sunk. Then the tissue was embedded in an OCT block, which was sectioned into 25-μm slice with a cryostat. Then the slice was covered with FluoroShield mounting medium (Abcam). Florescence images were observed with a Nikon Eclipse 50i microscope.

In vivo mimic demonstration of DAS-CRET: two different PBS solutions were prepared for this test. The first PBS solution is consisted of 5 μL of ADLumin-1 (250 μM) and 45 μL of the Aβ40 Aggregates (25 μM). The second solution is consisted of 2.5 μL of ADLumin-1 (500 μM), 2.5 μL of CRANAD-3 (500 μM) and 45 μL of the Aβ40 Aggregates (25 μM). After solutions were prepared, one female 8-month old nude mouse was anesthetized, and the left hind limb was subcutaneously injected with the first solution and the right hind limbs was subcutaneously injected with the second solution. The mouse was then placed into the IVIS imaging chamber and images were captured from the dorsal side and from the ventral side with the open filter (500 nm-840 nm) and specific filters.

In vivo chemiluminescence and DAS-CRET imaging: 5-month old female 5xFAD mice (n=4) and age-matched female wild-type control mice (n=4) were shaved before background imaging and were intravenously injected with freshly prepared ADLumin-1 (4 mg/kg, 15% DMSO, 15% cremophor, and 70% PBS) or the mixture solution of ADLumin-1 and CRANAD-3 (the dose for both of the dye was 4 mg/kg with the formulation of 15% DMSO, 15% cremophor, and 70% PBS). The IVIS Spectrum animal imaging system (PerkinElmer) was used for in vivo imaging. Images were acquired with open filter or specific emission filters. Living Image 4.2.1 software (PerkinElmer) was used for data analysis. Chemiluminescent signals from the brain were recorded before and 5, 15, 30, 60 min after i.v. injection of the probe. Chemiluminescent signals from the eyes were recorded at 0 and 45 min after i.v. injection of the probe. Sequence images were captured at 15 min after probe injection with the following parameters: sequence filter from 500 nm to 840 nm with an interval of 20 nm; Exposure time is 30 s, FOV=D. Spectral unmixing was performed with Living Image 4.2.1 software, and guided unmixing method was selected. To evaluate the imaging results, an ROI was drawn around the brain or the eye region. Student t-test was used to calculate P values.

Example 1—Chemiluminescence Probes for Detection of Amyloid Beta Species in Alzheimer's Disease Model Optical imaging has been widely applied in preclinical and clinical studies. Among the optical imaging modalities, near infrared fluorescence imaging (NIRF) is one the most used technologies for preclinical investigations. However, NIRF imaging has several intrinsic limitations that are caused by excitation light, which is needed as input light to excite the imaging probe. First, for a biological sample, the excitation light not only excites the fluorescent probe, but also other fluorophore-containing molecules in the sample to cause troublesome autofluorescence. Second, due to the stoke shift, the wavelength of excitation is always much shorter than the emission wavelength, while the tissue penetration is reversely correlated with the wavelength, therefore the excitation at relatively shorter wavelength could be problematic to penetrate the biological sample. Third, a fluorescent probe with small stoke shift suffers from the interference from excitation leakage in real imaging practice due to imperfection of filters in imaging systems. Fourth, the excitation light generates relatively much stronger emission signals from fluorophores at shallow locations, where contain non-specifically accumulated imaging probe and auto-fluorescent molecules. These excitation-related limitations of NIRF imaging are significantly contributed to low signal to noise ratio (SNR) and poor tissue penetration. Nonetheless, the problems of fluorescence imaging can be partially resolved by chemi- or bio-luminescence imaging, which do not require external excitation light. Therefore, compared to NIRF imaging, chemi- or bio-luminescence imaging provide much better tissue penetration capacity at the same emission wavelength. A recent study demonstrated that 4-cm tissue penetration could be achieved with chemiluminescence imaging at 800 nm emission, while NIRF imaging could not provide this capacity at the same emission.

A chemiluminescence probe of this example is termed ADLumin-1. The experimental data show that auto-oxidation of ADLumin-1 could be utilized and its chemiluminescence is dramatically "turned on" in the presence of Aβ species.

Aβ plaques and neurofibrillary Tau tangles are the most pronounced and characteristic hallmarks of Alzheimer's disease (AD), and several imaging methods been widely applied in preclinical and clinical studies. NIRF imaging probes exist, such as CRANAD-X, for Aβs.

ADLumin-1 described in this example is a smart chemiluminescence probe for Aβ species and the amplification could be beyond 200-fold in vitro. Furthermore, it was feasible to achieve dual-amplification of signal via chemiluminescence resonance energy transfer (termed as DAS-CRET) with two non-conjugated smart probes in solutions, tissues and brain homogenates and in vivo whole brain imaging. As the data in Example 2 shows, the probes of this example are not only applicable for detecting Aβs, but also for a wide variety of other aggregating-prone proteins. Results also show that the strategies for turning-on fluorescence can be used for amplifying chemiluminescence.

Preparation of Chemiluminescent Probes

Several scaffolds have been widely used for generating chemiluminescence, including dioxetane, luminol, imidazo[1,2-a]pyrazin-3(7H)-one, oxalate, lucigenin, 9,10-dimethyl-anthracene, and 10-methyl-9-(phenoxycarbonyl)acridinium. All of these scaffolds have emission wavelengths less than about 500 nm and are not ideal for in vivo imaging, particularly for deep locations such as brains. Moreover, some of the scaffolds have intrinsic limitations for brain imaging. For example, lucigenin and acridinium have charges and are very polar, which can lead to poor brain penetration. Oxalate ester is difficult to extend the wavelength, while dioxetane are not always very stable.

Imidazo[1,2-a]pyrazin-3(7H)-one (IPO) was selected as the scaffold for ADLumin-1 (Moiety A in FIG. 1a), due to its easy modifiability for wavelength extension and good stability.

The probes of this disclosure meet the following requirements. First, the designed compounds bind strongly to Aβs (and other aggregation-prone and misfolding-prone proteins and peptides). In this regard, the structures of fluorescence dyes were surveyed that are sensitive to Aβs, and it was found that numerous dyes contain moiety B (FIG. 1a), which has the potential to insert into the beta sheet of Aβs. Second, the probe has turn-on capacity upon Aβ binding. Moiety B is a hydrophobic and planar fragment, and it interacts with the hydrophobic segment of Aβs. Consequently, the interaction could lead to turn-on chemiluminescence. Third, the probes have longer emissions. To achieve this, the connection between moiety A and B allows electrons to delocalize, which can lead to smaller energy gap between HOMO and LUMO. Based on the above considerations, ADLumin-1 and -2 (FIG. 1a,b) were prepared. Without being bound by any theory, it is believed that moiety A is responsible for generating chemiluminescence and moiety B is for binding to Aβs (and other beta-sheets containing peptides and proteins), and moieties A and B are connected via double bonds that can make the electrons delocalize across the whole molecule. The synthesis of ADLumin-X (X=1, 2) is shown in FIG. 1c and described below.

Figure 1C:
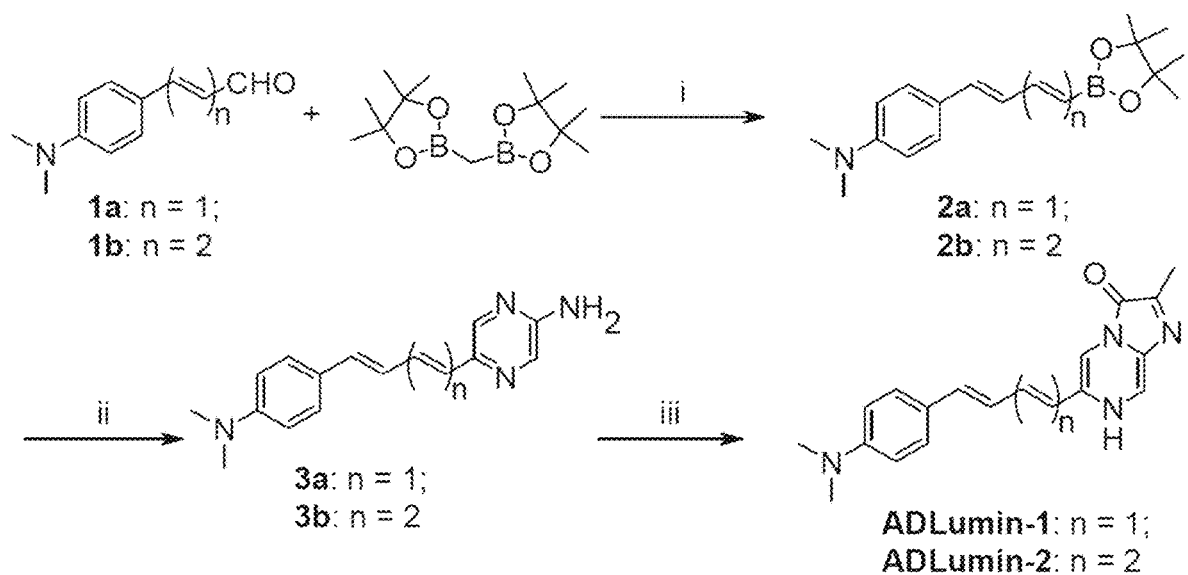
FIG. 1C shows synthetic route of ADLumin-X. Reagents and conditions: (i) TMP, n-BuLi, THF; (ii) 5-bromo-2-aminopyrazine, Pd(PPh$_3$)$_4$, NaCO$_3$ aq, 1,4-dioxane; (iii) Methylglyoxal 1,1-dimethyl acetal, EtOH, HCl aq.

Synthesis of ADLumin-1, ADLumin-2 and ADlumin-3 (See FIG. 1C)

1) Typical procedure for preparation of 1,2-disubstituted vinyl boronates. To a solution of TMP (2,2,6,6-Tetramethylpiperidine, 0.25 mmol, 1.0 equiv) in anhydrous THF (1.0 mL), n-BuLi (0.25 mmol, 1.0 equiv) was added at 0° C. The resulting mixture was stirred for 5 minutes at 0° C., followed by an addition of a solution of bis-(4,4,5,5-tetramethyl-1,3,2-dioxaborolan-2-yl)methane (0.30 mmol, 1.2 equiv) in THF (0.60 mL). The resulting solution was stirred at 0° C. for 15 minutes. Then the reaction vial was cooled to −78° C., and a solution of aldehyde (0.25 mmol, 1.0 equiv) in THF (0.30 mL) was added. The reaction vial was stirred at −78° C. for additional 4 hours. Upon completion, the reaction mixture was concentrated under reduced pressure and the 1,2-disubstituted-vinyl boronate products were purified by flash silica chromatography. Compound 2a was obtained as a yellow solid, 72% yield. $^1$H NMR (500 MHz, CDCl$_3$): δ 7.32 (d, J=8.8 Hz, 2H), 7.20-7.14 (m, 1H), 6.70-6.59 (m, 4H), 5.55 (d, J=17.5 Hz, 1H), 2.97 (s, 6H), 1.29 (s, 12H). $^{13}$C NMR (125 MHz, CDCl$_3$): δ 150.93, 150.53, 136.86, 128.20, 126.51, 125.09, 112.28, 83.12, 40.43, 24.89. ESI-MS (m/z): 300.1 [M+H]$^+$.

N,N-dimethyl-4-((1E,3E,5E)-6-(4,4,5,5-tetramethyl-1,3,2-dioxaborolan-2-yl)hexa-1,3,5-trien-1-yl)aniline (2b). Compound 2b was prepared by the same method as 2a. Yellow solid, 65% yield. $^1$H NMR (500 MHz, CDCl$_3$): δ 7.29 (d, J=8.7 Hz, 2H), 7.07 (dd, J=17.5, 10.7 Hz, 1H), 6.68-6.60 (m, 3H), 6.57-6.46 (m, 2H), 6.32 (dd, J=14.6, 10.8 Hz, 1H), 5.51 (d, J=17.5 Hz, 1H), 2.96 (s, 6H), 1.26 (s, 12H). 13C NMR (125 MHz, CDCl$_3$): δ 150.28, 137.83, 135.32, 132.54, 127.91, 125.58, 124.63, 112.43, 83.24, 40.51, 24.93. ESI-MS (m/z): 267.1 [M+H]$^+$.

2) Synthesis of 5-((1E,3E)-4-(4-(dimethylamino)phenyl)buta-1,3-dien-1-yl)pyrazin-2-amine (3a): Under an argon atmosphere, compound 2a (106.0 mg, 0.39 mmol) and 5-bromo-2-aminopyrazine (57.0 mg, 0.33 mmol) were dissolved in a mixture of 1,4-dioxane (6.0 mL), and 1.0 M NaCO$_3$ aqueous solution (400.0 μL), and the resulting mixture was degassed in vacuo. A catalytic amount of tetrakis (triphenylphosphine)palladium(0) (0.0033 mmol, 3.8 mg) was added into the mixture and the mixture was heated at 75° C. for 6 h. After cooling, the mixture was diluted with EtOAc (20 mL) and washed with water and brine, dried over $Na_2SO_4$ and evaporated. The resulting residue was purified by flash silica chromatography (silica gel, eluent: chloroform/methanol=50/1) to obtain 3a as a yellow solid (56.0 mg, 64.0%). $^1H$ NMR (500 MHz, DMSO-$d_6$): δ 7.93 (s, 1H), 7.87 (s, 1H), 7.32 (d, J=8.7 Hz, 2H), 7.10 (dd, J=15.2, 10.9 Hz, 1H), 6.81 (dd, J=15.4, 11.0 Hz, 1H), 6.69 (d, J=8.8 Hz, 2H), 6.59 (d, J=15.5 Hz, 1H), 6.53-6.50 (m, 3H), 2.92 (s, 6H). $^{13}C$ NMR (125 MHz, DMSO-$d_6$): δ 154.43, 149.92, 140.65, 139.02, 132.97, 132.18, 128.81, 127.42, 126.80, 125.21, 124.78, 112.32, 40.03. ESI-MS (m/z): 326.3 $[M+H]^+$.

Synthesis of 5-((1E,3E,5E)-6-(4-(dimethylamino)phenyl) hexa-1,3,5-trien-1-yl)pyrazin-2-amine (3b). Compound 3b was prepared by the same method as 3a. 41 NMR (500 MHz, DMSO-$d_6$): δ 7.92 (s, 1H), 7.87 (s, 1H), 7.31 (d, J=8.7 Hz, 2H), 7.05 (dd, J=15.2, 10.6 Hz, 1H), 6.75 (dd, J=15.2, 10.6 Hz, 1H), 6.68 (d, J=8.8 Hz, 2H), 6.58-6.40 (m, 6H), 2.92 (s, 6H). $^{13}C$ NMR (125 MHz, DMSO-$d_6$): δ 154.43, 149.87, 140.94, 138.72, 134.29, 132.83, 132.24, 131.05, 128.19, 127.66, 127.41, 125.10, 124.81, 112.25, 39.94. ESI-MS (m/z): 293.1 $[M+H]^+$.

3) Synthesis of 6-((1E,3E)-4-(4-(dimethylamino)phenyl) buta-1,3-dien-1-yl)-2-methylimidazo[1,2-a]pyrazin-3(7H)-one (ADLumin-1). Under an argon atmosphere, compound 3a (50.0 mg, 0.18 mmol) and methylglyoxal-1,1-dimethyl acetal (30.0 mg, 0.25 mmol) were dissolved in a mixture of 20% HCl aq. (200.0 μL), water (200.0 μL), and EtOH (3.0 mL), and the resulting mixture was stirred and heated at 70° C. for 12 h. After cooling, the reaction mixture was evaporated. The resulting residue was purified by flash silica chromatography (eluent: Dichloromethane/methanol=10/1) to obtain ADLumin-1 as a yellow solid (10.0 mg, 17%). $^1H$ NMR (500 MHz, $CD_3OD$): δ 9.03 (s, 1H), 8.39 (s, 1H), 7.76-7.64 (m, 4H), 7.55 (t, J=15 Hz, 1H), 7.23 (t, J=15 Hz, 1H), 6.95-6.87 (m, 2H), 3.29 (s, 6H), 2.52 (s, 3H). $^{13}C$ NMR (125 MHz, $CD_3OD$): δ 143.14, 140.61, 139.91, 139.03, 135.88, 135.47, 135.14, 131.73, 129.69, 128.56, 127.26, 124.46, 122.22, 113.97, 47.2, 10.17. ESI-MS (m/z): 321.1 $[M+H]^+$.

Synthesis of 6-((1E,3E,5E)-6-(4-(dimethylamino)phenyl) hexa-1,3,5-trien-1-yl)-2-methylimidazo[1,2-a]pyrazin-3 (7H)-one (ADLumin-2). ADLumin-2 was prepared by the same method as ADLumin-1. Red solid, 12% yield. 1-H NMR (500 MHz, $CD_3OD$): δ 8.83 (s, 1H), 8.18 (s, 1H), 7.61 (s, 4H), 7.29 (dd, J=14.8, 8.9 Hz, 1H), 6.99 (dd, J=14.8, 8.6 Hz), 6.71-6.55 (m, 4H), 3.23 (s, 6H), 2.40 (s, 3H). $^{13}C$ NMR (125 MHz, $CD_3OD$): δ 142.87, 140.75, 137.76, 135.39, 134.79, 134.59, 133.27, 132.46, 129.73, 129.40, 128.57, 125.65, 122.10, 113.43, 47.15, 10.66. ESI-MS (m/z): 347.3 $[M+H]^+$.

4) Synthesis of N-(5-((1E,3E)-4-(4-(dimethylamino)phenyl)buta-1,3-dien-1-yl)pyrazin-2-yl)acetamide (ADLumin-3). To a solution of ADLumin-1 (5 mg, 0.015 mmol) in DMSO (4 mL) was bubbled oxygen for 12 h. The mixture was diluted with EtOAc (15 mL) and washed with water and brine, dried over $Na_2SO_4$ and evaporated. The resulting residue was purified by flash silica chromatography (silica gel, eluent: Hexane/EtOAc=2/1) to obtain ADLumin-3 as a yellow solid (8 mg, 85%). $^1H$ NMR (500 MHz, DMSO-$d_6$): δ 10.75 (s, 1H), 9.23 (s, 1H), 8.42 (s, 1H), 7.42-7.36 (m, 3H), 6.90 (dd, J=15.4, 10.9 Hz, 1H), 6.77-6.64 (m, 4H), 2.94 (s, 6H), 2.12 (s, 3H). $^{13}C$ NMR (125 MHz, DMSO-$d_6$): δ 169.22, 150.23, 146.53, 146.31, 140.55, 135.95, 135.47, 133.85, 127.85, 125.27, 124.57, 123.92, 112.15, 39.85, 23.64. ESI-MS (m/z): 309.1 $[M+H]^+$.

Spectral Characterization and Validation of the Turn-on Feature

Figure 1D:
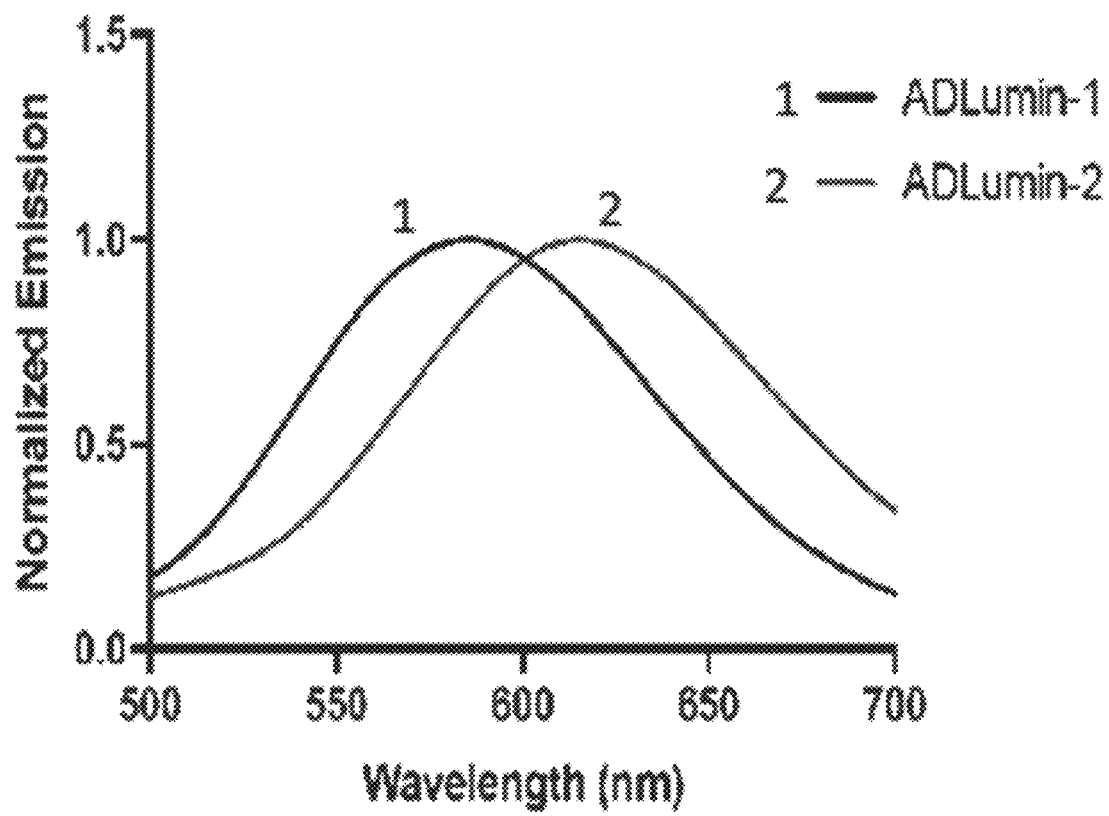
FIG. 1D contains fluorescence emission spectra of ADLumin-1 and ADLumin-2 in DMSO.

Fluorescence spectral studies: Normally, all chemiluminescent molecules are fluorescent. The excitation and emission spectra of ADLumin-X were recorded and the emission peak of ADLumin-1 was around 590 nm (FIG. 1D) in DMSO, which is considerably longer than most of the commercially available chemiluminescence probes. The emission of ADLumin-2 is longer than that of ADLumin-1, due to its additional double-bond. (the emission peak of ADLumin-2 was 20 nm longer). However, the quantum yield (QY) of ADLumin-2 was significantly decreased $\Phi_{ADLumin-1}/\Phi_{ADLumin-2}=1.5$). Based on this fact, ADLumin-1 was used throughout this example, due to its high QY.

Figure 2A:
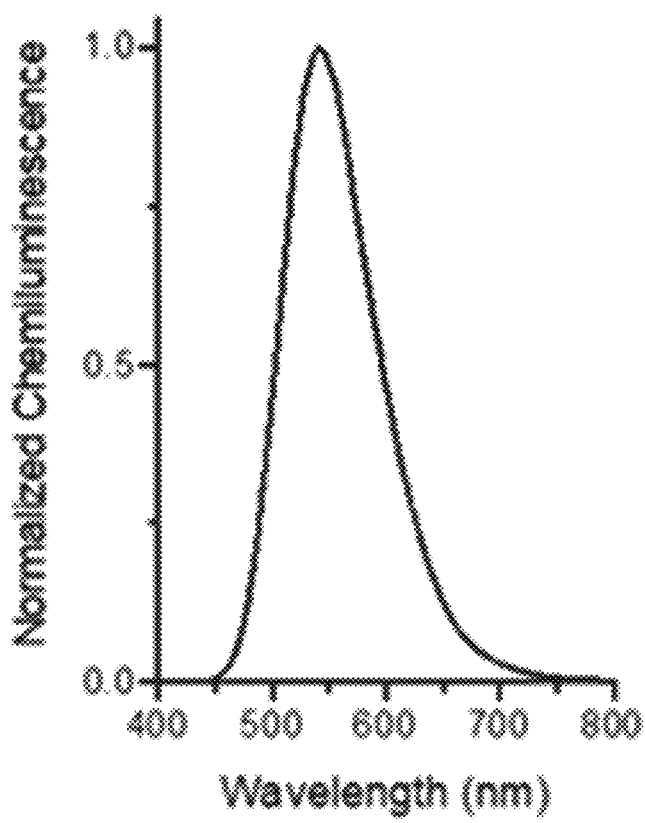
FIG. 2A contains chemiluminescence spectrum of ADLumin-1 in DMSO.
Figure 2B:
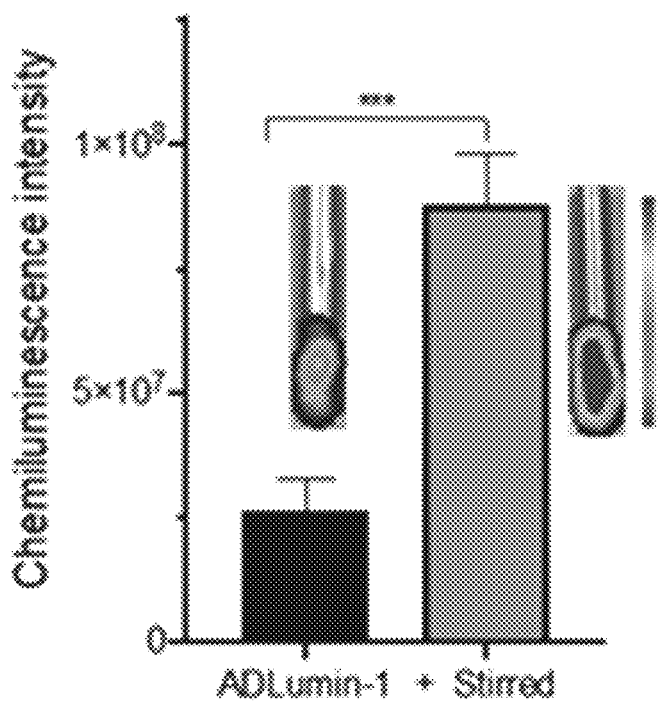
FIG. 2B contains chemiluminescence intensity quantitative analysis of ADLumin-1 in DMSO solutions before and after stirring. Representative images were insert.
Figure 2C:
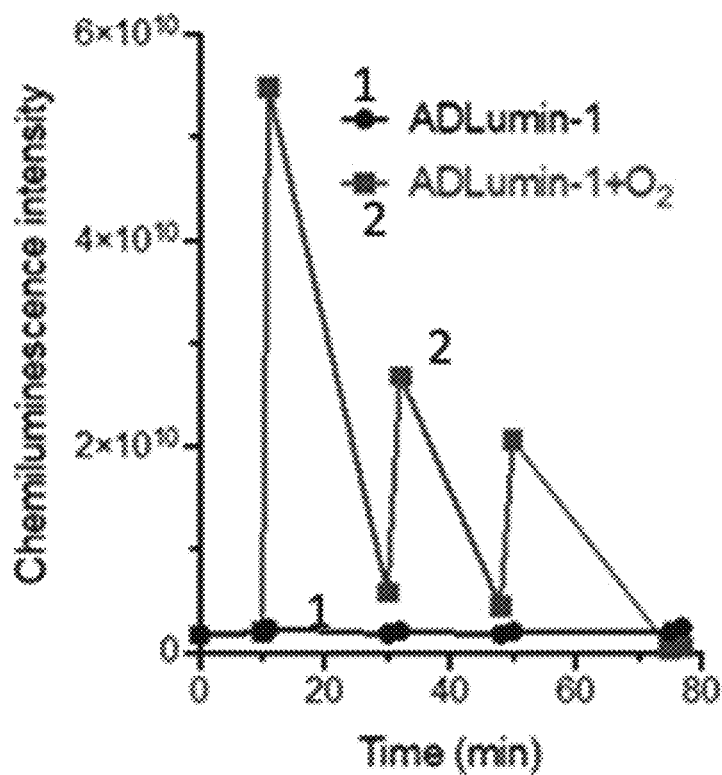
FIG. 2C contains chemiluminescence intensity quantification of ADLumin-1 with (red) or without (black) bubbled oxygen.
Figure 2D:
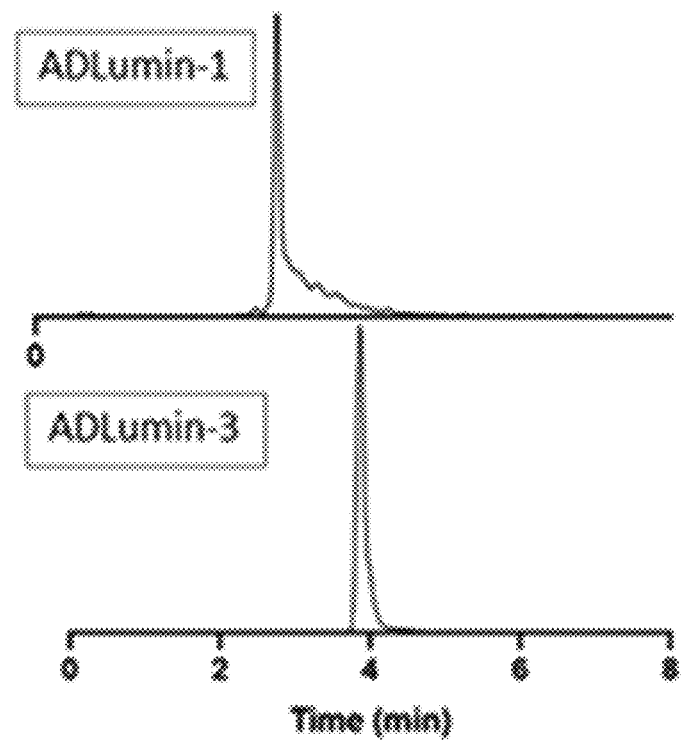
FIG. 2D contains LC-MS spectra of ADLumin-1 and ADLumin-3 (the oxidation product). Note: ADLumin-1 (t=3.05 min), ADLumin-3 (t=3.85 min).

Chemiluminescence spectral studies: ADLumin-1 is stable in PBS buffer and organic solvents, including acetonitrile, dichloromethane and methanol. However, interestingly, in the presence of 10% DMSO, ADLumin-1 is luminescent, and the emission peak was around 540 nm (FIG. 2a). Without being bound by any theory, it is believed that the luminescence was due to the auto-oxidation of ADLumin-1. Although the mechanism of chemiluminescence of IPO derivatives has been studied, the mechanism of auto-oxidation has been rarely explored. In the course of the experiments, ADLumin-1 emitted very strong luminescence in pure DMSO (FIG. 2b). Unexpectedly, if the ADLumin-1 DMSO solution was stirred, even stronger luminescence can be detected (3.4-fold in FIG. 2b). Without being bound by any theory, it is believed that the luminescence was related to oxygen levels in DMSO. To validate, $O_2$ was intermittently bubbled in the DMSO solution 5 seconds for several rounds, and the intensities were dramatically increased (27-fold) after first bubbling. However, the increasing-fold decreased with cycles (FIG. 2c). LC-MS indicated that ADLumin-1 was converted into a new compound, termed as ADLumin-3 (FIG. 2d), whose structure was further confirmed by $^1H$-NMR, $^{13}C$-NMR, HR-MS. Since no ROS were added into the DMSO solution, it is reasonable to infer that the auto-oxidation of ADLumin-1 was oxygen-level dependent. It is worthy to note that green fluorescent protein and luciferase/luciferin also dependent on oxygen for their proper imaging functions.

Figure 2E:
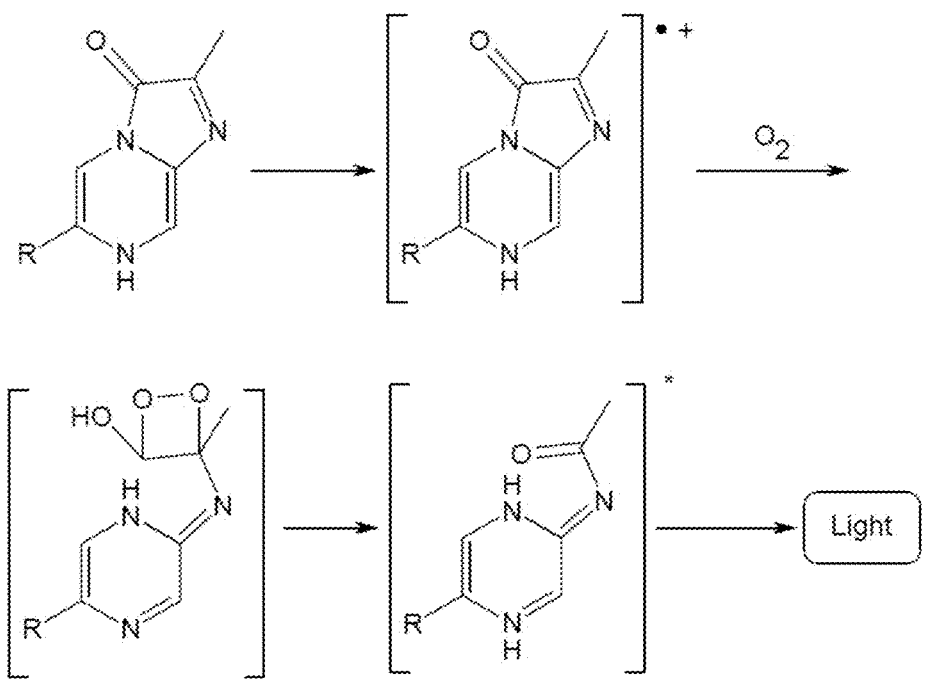
FIG. 2E contains proposed oxygen-depended mechanism of ADLumin-1 for chemiluminescence generation.

Responses of ADLumin-1 towards different ROS species was also investigated, the intensity increasing was considerably low, compared to the increasing in the presence of $O_2$ bubbling, again suggesting that the auto-oxidation is the primary cause of chemiluminescence of ADLumin-1. A tentative mechanism for the auto-oxidation was proposed in FIG. 2e. Briefly, in DMSO solution or 10% DMSO PBS buffer, a trace-amount of radicals initiate conversion of ADLumin-1 into ADLumin-1$^{-\bullet}$, which is a doublet state. The doublet state was further converted to triplet state via intersystem conversion or the doublet could spin-cross with triplet. Since $O_2$ is triplet state, which can be added to the double-bond to form the complex that further decomposes into ADLumin-3 and release photons (light).

Figure 2F:
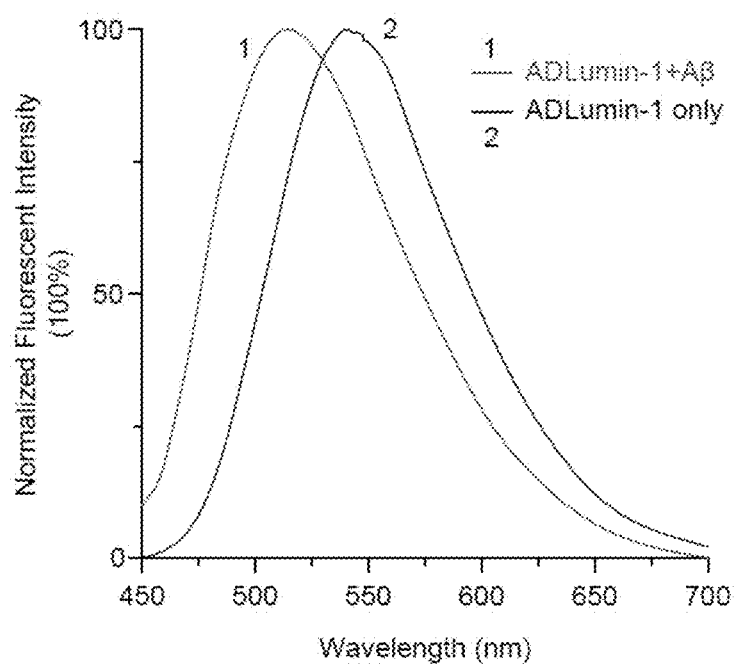
FIG. 2F contains fluorescence spectra of ADLumin-1 before and after mixing with Aβ40 aggregates.
Figure 2G:
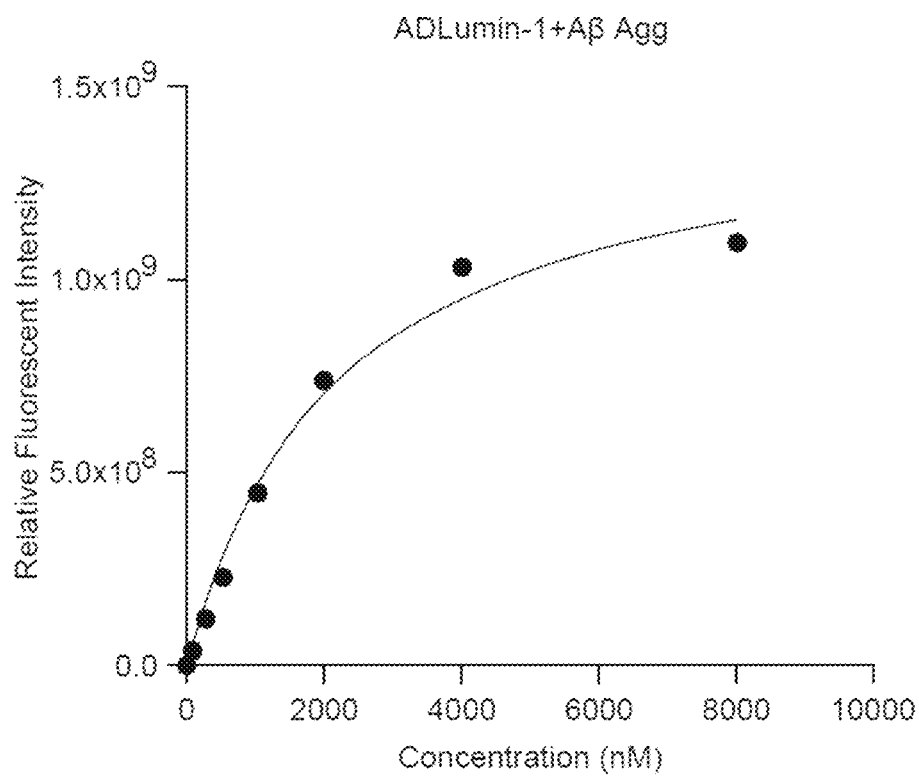
FIG. 2G contains binding affinity assay between Aβ40 aggregates and ADLumin-1. The fluorescence of ADLumin-1 (250 nM) at 515 nm was measured with increasing concentration of Aβ40 aggregates from 0 to 8 μM. Binding constant Kd was derived from the fitted curve.
Figure 3A:
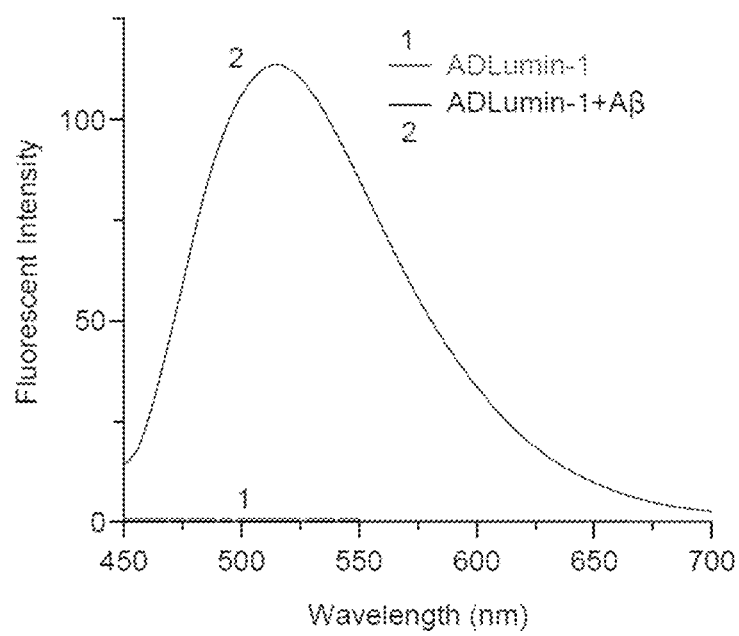
FIG. 3A contains fluorescence spectra of ADLumin-1 alone (red) and with Aβ40 aggregates (black).

Spectral studies with Aβs: To investigate whether ADLumin-1 can bind to Aβs, the fluorescence spectra was recorded before and after the addition of Aβ40 aggregates. ADLumin-1 was a smart fluorescence probe, evident by 100-fold fluorescence intensity increasing upon mixing with Aβs (FIG. 3a). Moreover, there was a significant blue-shift of emission of the probe with Aβs (FIG. 2F), suggesting the probe binds to the hydrophobic fragment of Aβs. $K_d$ was measured via concentration titration, and $K_d$=2.1 μM (FIG. 2G).

Figure 3B:
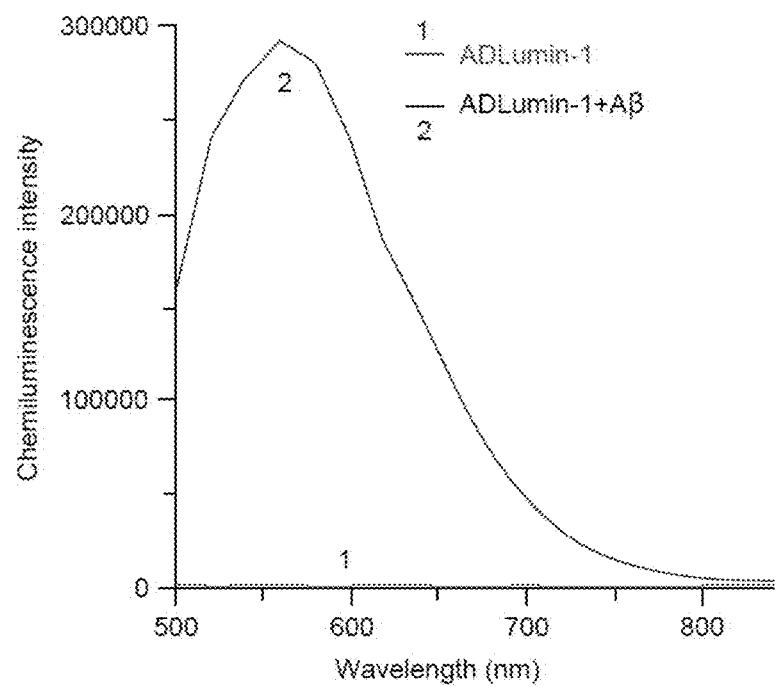
FIG. 3B contains chemiluminescence spectra of ADLumin-1 alone (red) and with Aβ40 aggregates (black).
Figure 3C:
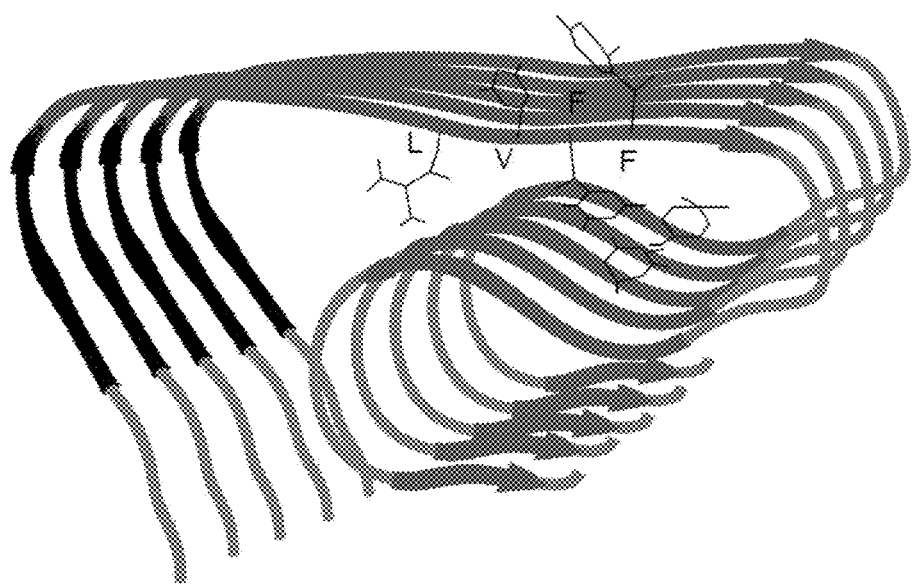
FIG. 3C shows molecule docking of ADLumin-1 (blue) with Aβ fibrils (PDB:5OQV).

To investigate whether there is significant chemiluminescence intensity increase upon incubation with Aβs, ADLumin-1 was tested in PBS buffer (with 2% DMSO). Similar to the fluorescence response, the chemiluminescence was dramatically turned-on, and the increase was about 216-fold at 540 nm (FIG. 3b). Molecule docking studies were conducted for ADLumin-1 with Aβ fibrils. The docking was based on the structure from cryo-EM of Aβ42 (PDB:5OQV), and the results suggested that ADLumin-1 preferred to bind to the hydrophobic groove formed by Phe19, Ala21, Val24, Asn27 and Ile31 (FIG. 3c). This hydrophobic binding is consistent with the blue-shift of fluorescence spectrum of ADLumin-1 in the presence of Aβs (FIG. 2F).

Figure 3D:
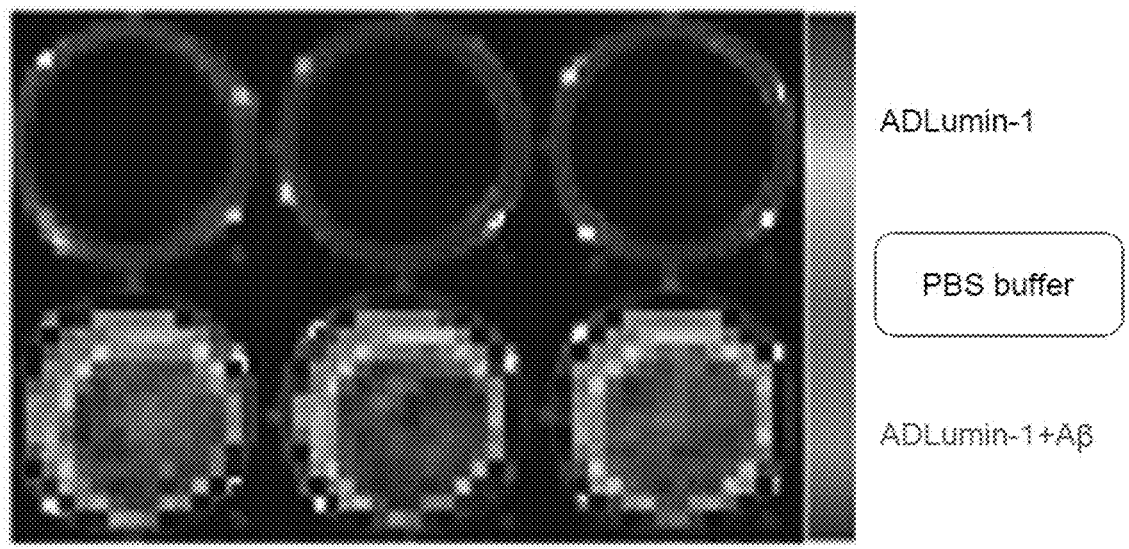
FIG. 3D contains in vitro chemiluminescence images of ADLumin-1 alone and with Aβ40 aggregates in PBS.
Figure 3E:
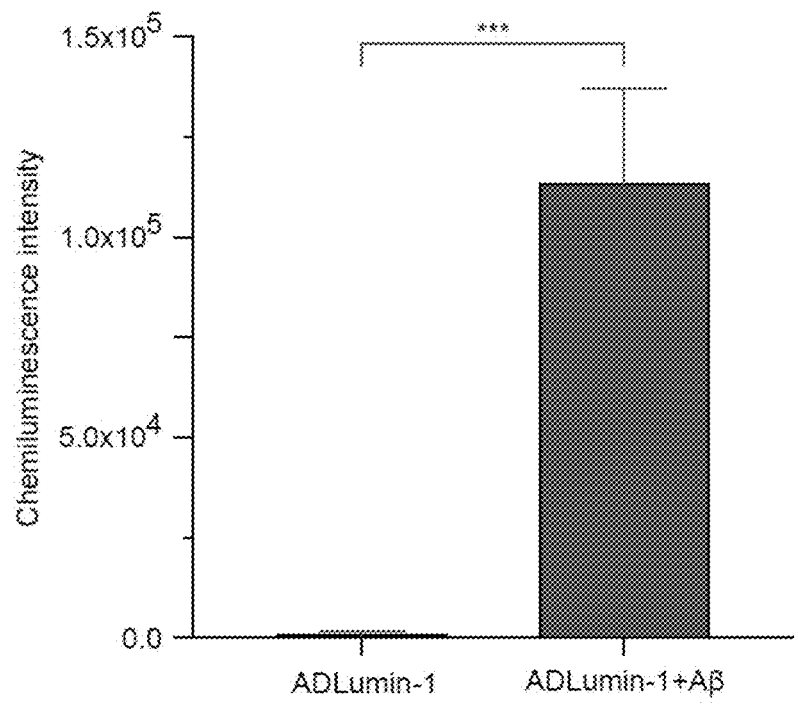
FIG. 3E shows quantification of chemiluminescence intensity in 3D (triplicated samples).

To investigate whether an IVIS imaging system could be used to detect the increase of chemiluminescence of ADLumin-1 with Aβs, experiments were performed with open filter setting on a 96-well plate. Indeed, the signal was 104-fold higher from the wells with Aβs than that from wells without Aβs (FIGS. 3d and 3e).

Figure 3F:
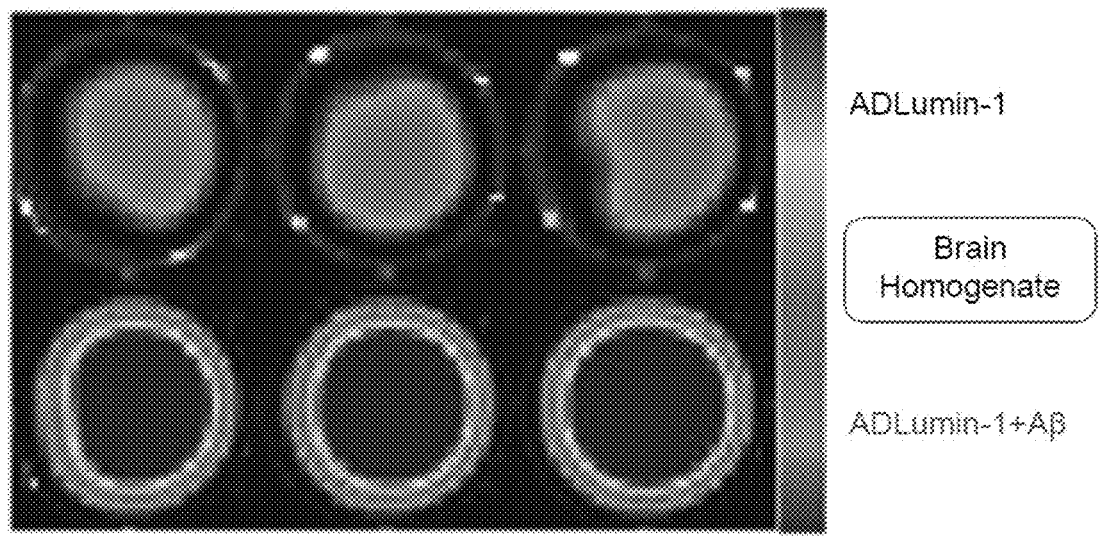
FIG. 3F contains in vitro chemiluminescence images of ADLumin-1 alone and with Aβ40 aggregates in brain homogenate.
Figure 3G:
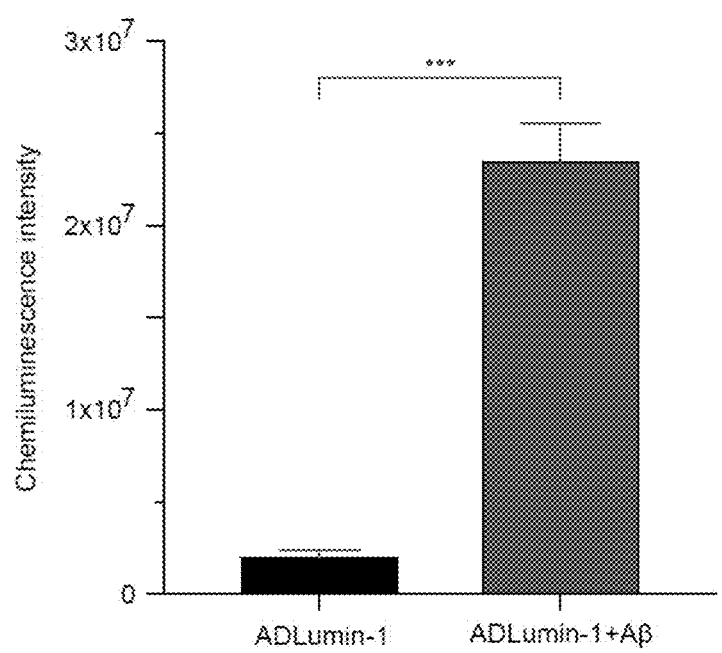
FIG. 3G shows quantification of chemiluminescence intensity in 3F (triplicated samples).
Figure 3H:
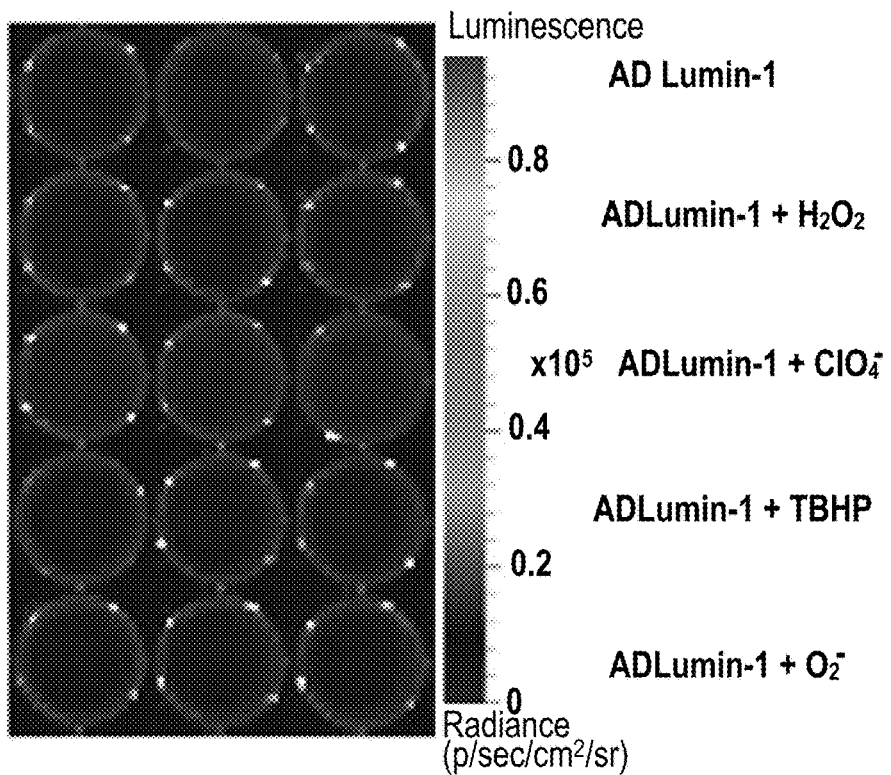
FIG. 3H shows chemiluminescence of ADLumin-1 after mixing with different ROS species (triplicated).
Figure 3I:
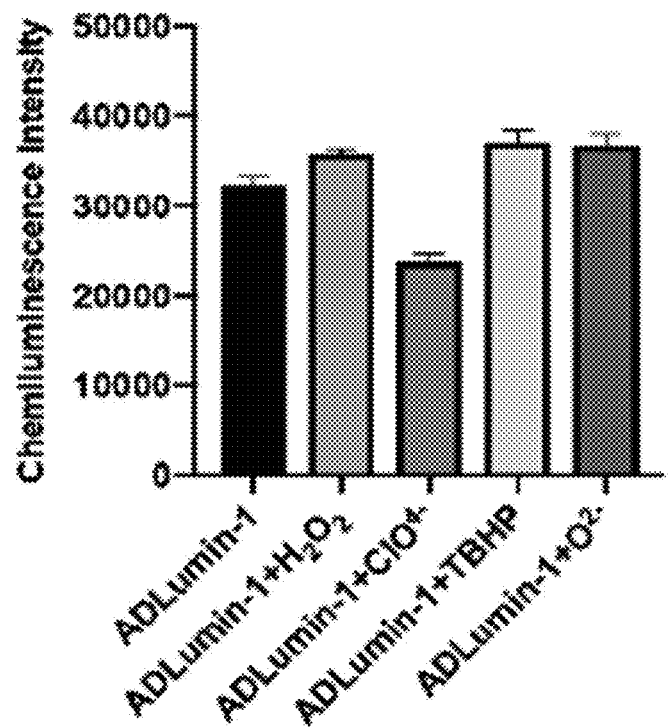
FIG. 3I shows quantitative analysis of the image in 3H. There were no significant changes of ADLumin-1 in the presences of the ROS species.
Figure 3J:
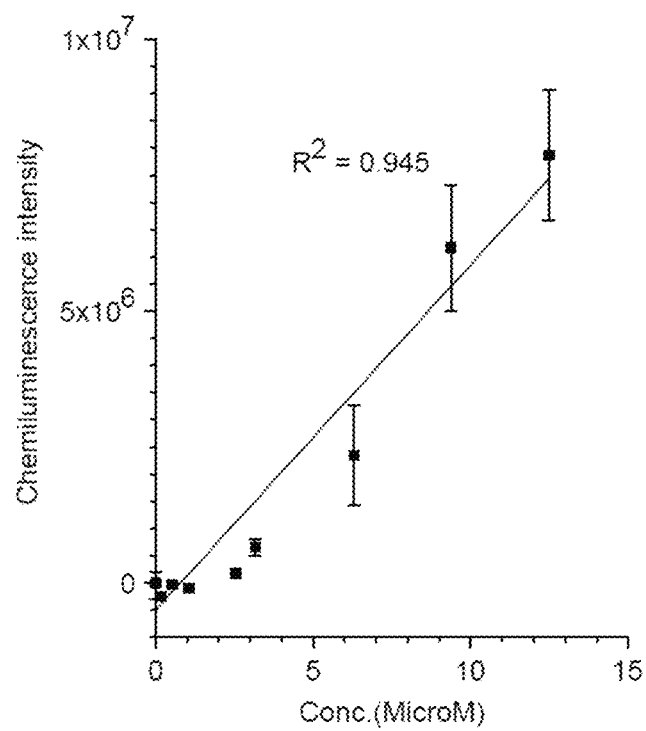
FIG. 3J shows the linear fitting of Aβ concentrations and the intensity of chemiluminescence in the presence of mouse brain homogenate.

To explore whether the smart chemiluminescence probe can be used in a real biological environment, ADLumin-1 was incubated with mouse brain homogenate in the presence and absence of Aβ aggregates (12.5 μM). Remarkably, ADLumin-1 provided much higher signal from the Aβ group, and difference was about 11.6-fold (FIGS. 3f and 3g). The intensity increasing was linear to Aβ concentrations in the range of 0-12.5 μM (FIG. 3J). Interestingly, MCLA, a commercially available chemiluminescence compound containing IPO moiety, showed significantly reduced signal with Aβs (FIGS. 4E and 4F).

Figure 4A:
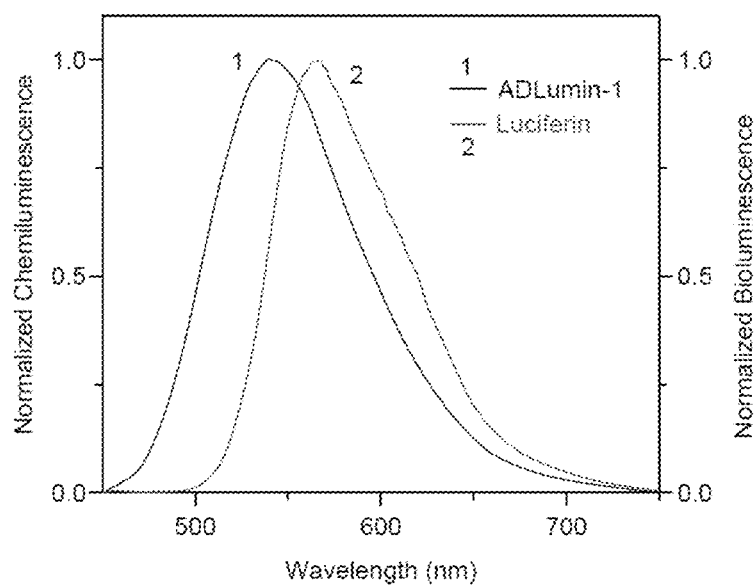
FIG. 4A contains chemiluminescence spectra of ADLumin-1 (black) and bioluminescence spectra of Luciferin (red).
Figure 4B:
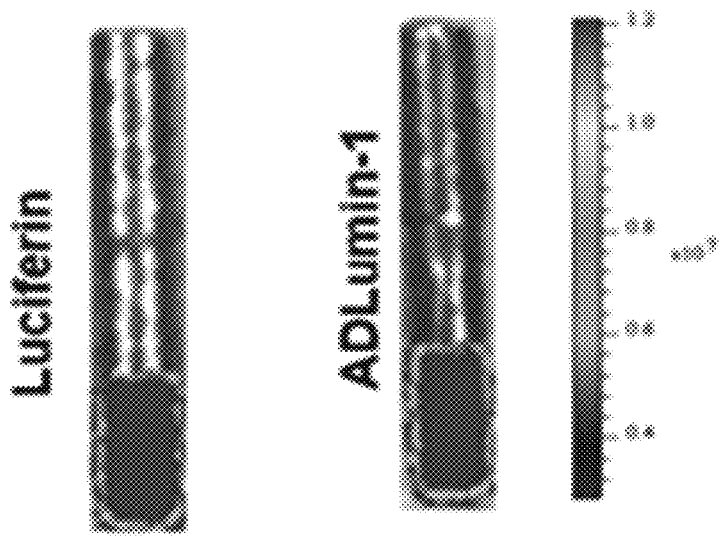
FIG. 4B shows light penetration study with Luciferin and ADLumin-1. A glass tube filled with a solution of firefly luciferin with luciferase or ADLumin-1 with similar intensities before putting under the abdomen of two nude mice.
Figure 4C:
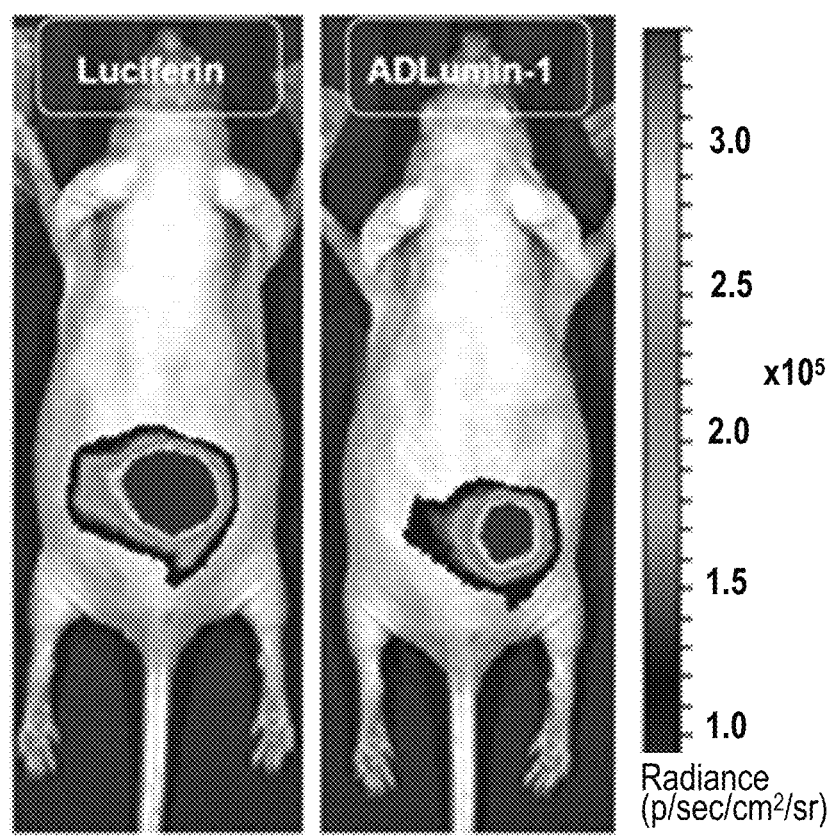
FIG. 4C contains images that were captured from the dorsal side with an IVIS imaging system after placing the tubes.
Figure 4D:
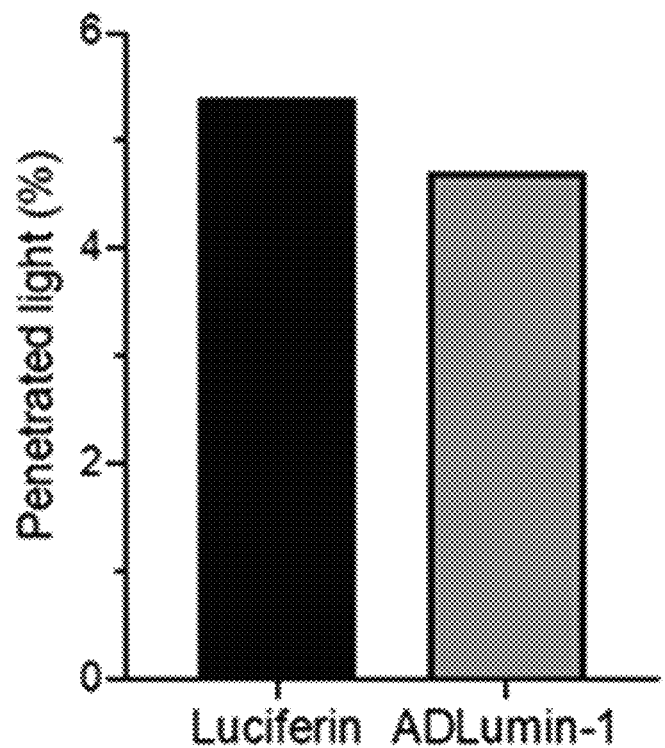
FIG. 4D shows nearly 5% light penetrated the whole body in both groups.
Figure 4E:
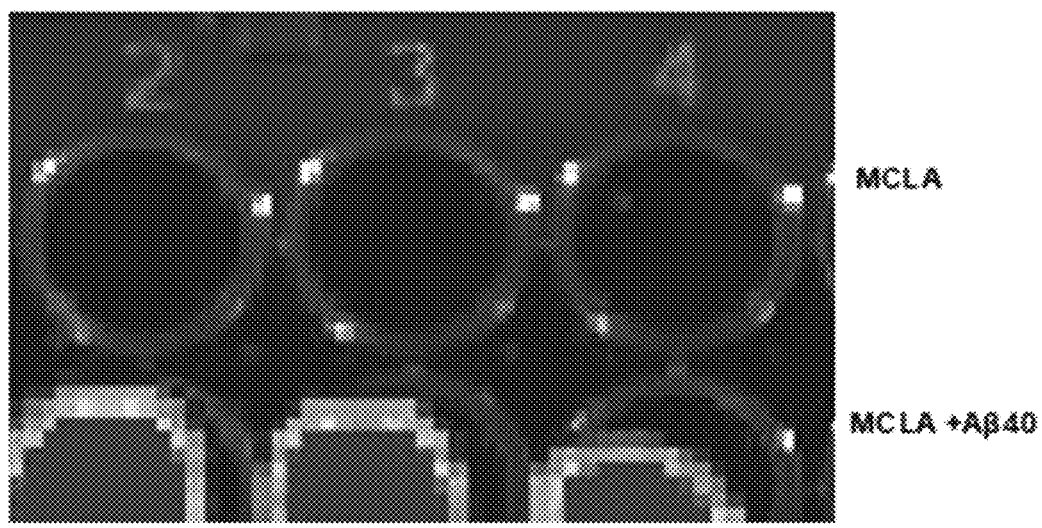
FIG. 4E contains in vitro chemiluminescence images of MCLA (12.5 µM) alone and in the presence of Aβ40 aggregates (12.5 µM) in PBS, pH 7.4.
Figure 4F:
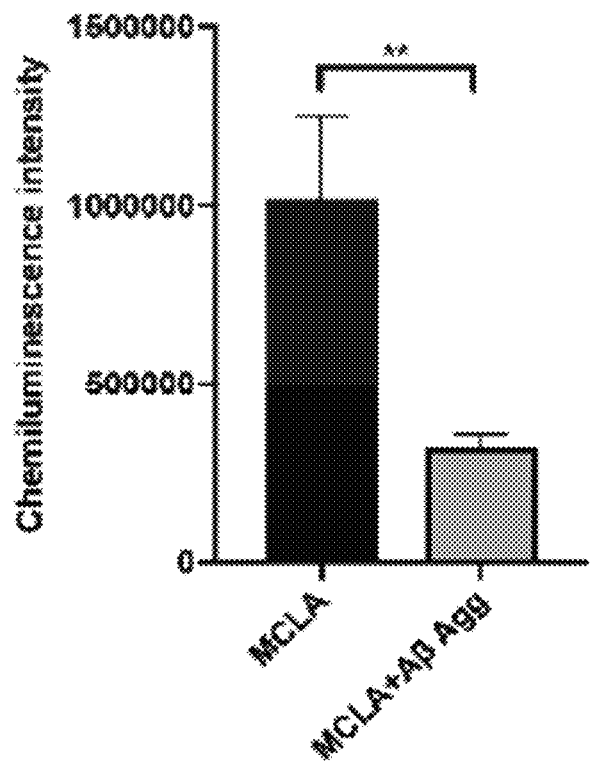
FIG. 4F shows chemiluminescence intensity quantification of image obtained in (E).

Wide FWHM (Full width at half-maximum) and mimic depth studies: the full width at half-maximum (FWHM) of ADLumin-1 was considerably large (94 nm, FIG. 4a). For a probe with a relatively short emission peak (540 nm), the larger FWHM is beneficial for in vivo studies. ADLumin-1 was compared to widely used firefly luciferin (peak at 570 nm, FWHM=83 nm), which has been proven to have excellent tissue penetration. A tube that had similar intensity of emitted light from ADLumin-1 or firefly luciferin (with luciferase) (FIG. 4b) was placed under the abdomen of a nude mice (the depth is about 1.5 cm) (FIG. 4c), and then signals were collected with an IVIS imaging system, which captured the signals from the dorsal side. ADLumin-1 provided comparable signals to firefly luciferin (FIGS. 4c and 4d). There was about 5% of the light that penetrated through the whole body for both ADLumin-1 and luciferin (FIG. 4d). The data indicated that the larger FWHM of ADLumin-1, whose emission is shorter than that of firefly luciferin, could be beneficial for in vivo imaging.

Figure 5A:
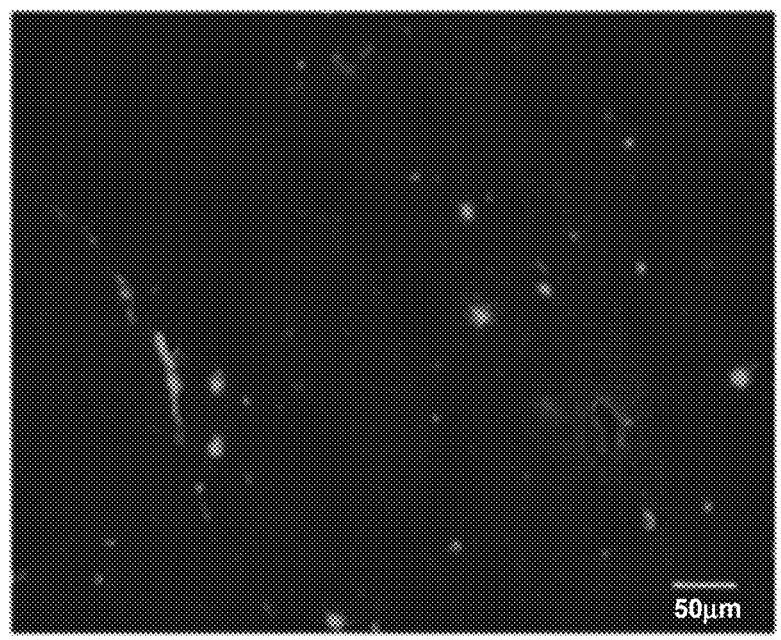
FIG. 5A shows in vitro and in vivo plaques staining with ADLumin-1. Representative image of a 24-mo-old APP/PS1 mouse brain slice with ADLumin-1 staining.
Figure 5B:
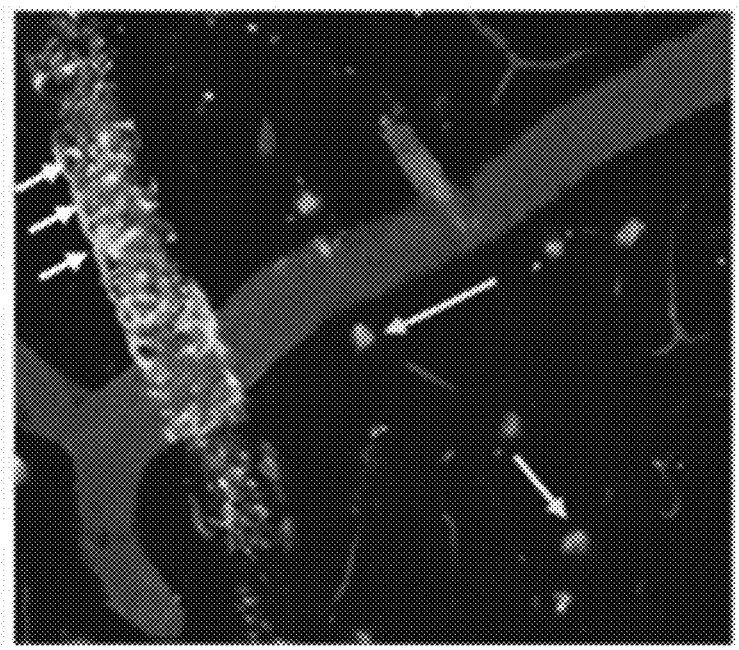
FIG. 5B contains two-photon microscopic image with ADLumin-1 in a 15-mo-old SXFAD. The yellow arrows indicate plaques. The white arrows indicate CAA labelings.
Figure 5C:
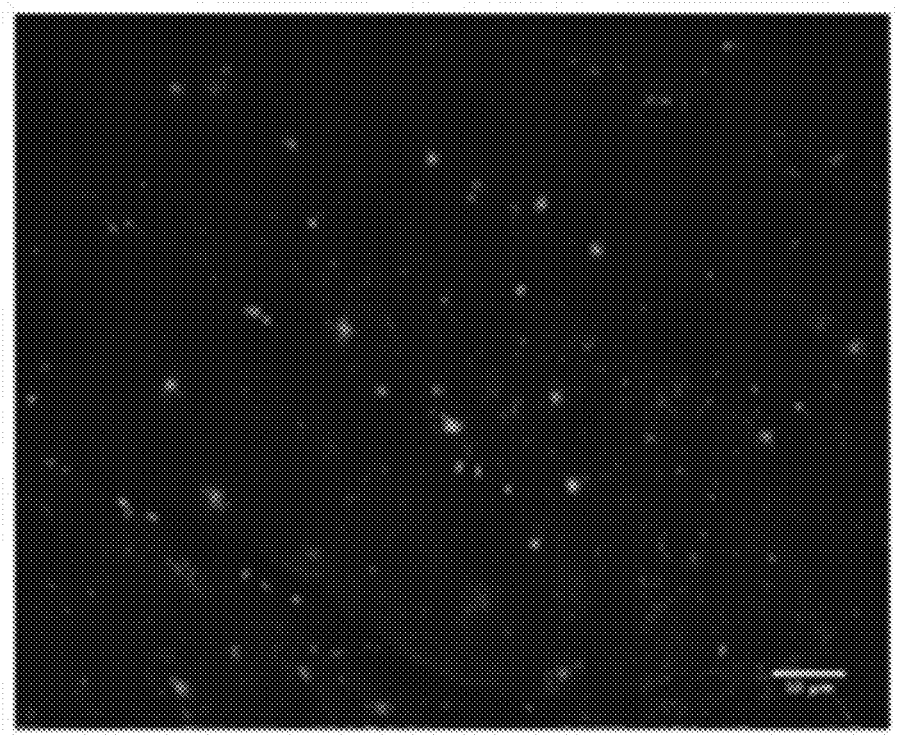
FIG. 5C shows ex vivo histology of a mouse brain slice obtained after the two-photon imaging with ADLumin-1.
Figure 5D:
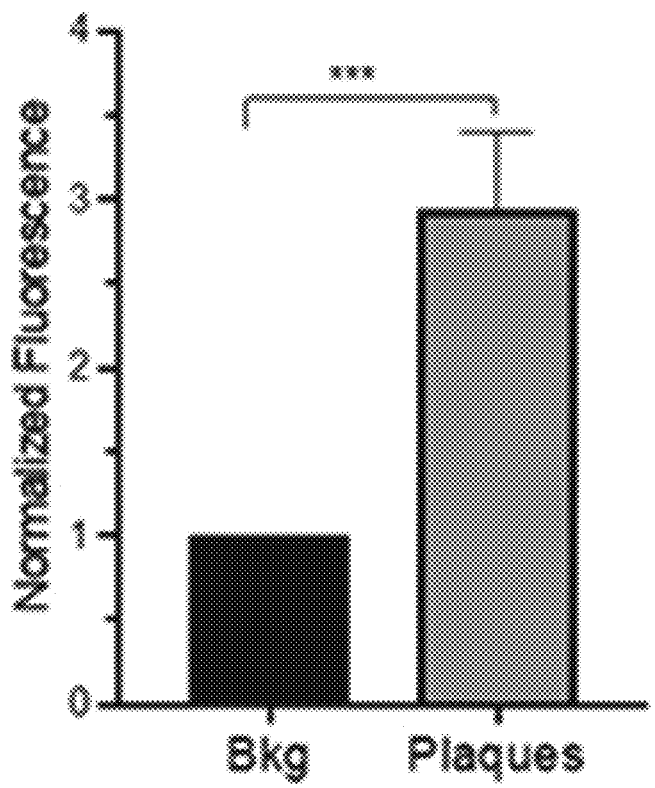
FIG. 5D contains quantitative analysis of SNR of plaques of in vitro slice. Six ROIs were averaged.
Figure 5E:
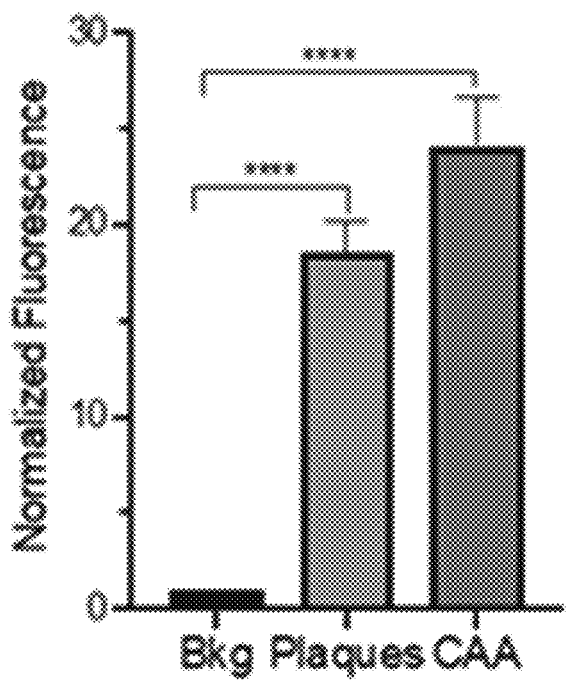
FIG. 5E contains quantitative analysis of SNR of plaques of in vivo plaques and CAAs FIG. 5F contains quantitative analysis of SNR of plaques of ex vivo plaques.
Figure 5F:
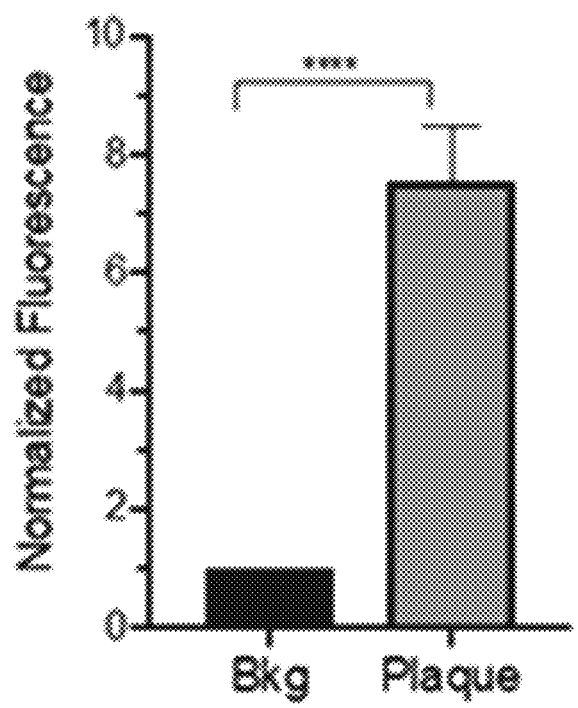
FIG. 5G contains quantitative analysis of two photon images for plotting the dynamic curves of ADLumin-1 for plaques FIG. 5H contains quantitative analysis of two photon images for plotting the dynamic curves of ADLumin-1 for CAAs. The intensity before injection was normalized to 1.0.
FIG. 5I contains brain slide imaging with ADLumin-3 (the oxidation product of ADLumin-1).
FIG. 5J contains quantitative analysis of SNR of plaques in (I). Six ROIs were averaged.
Figure 5G:
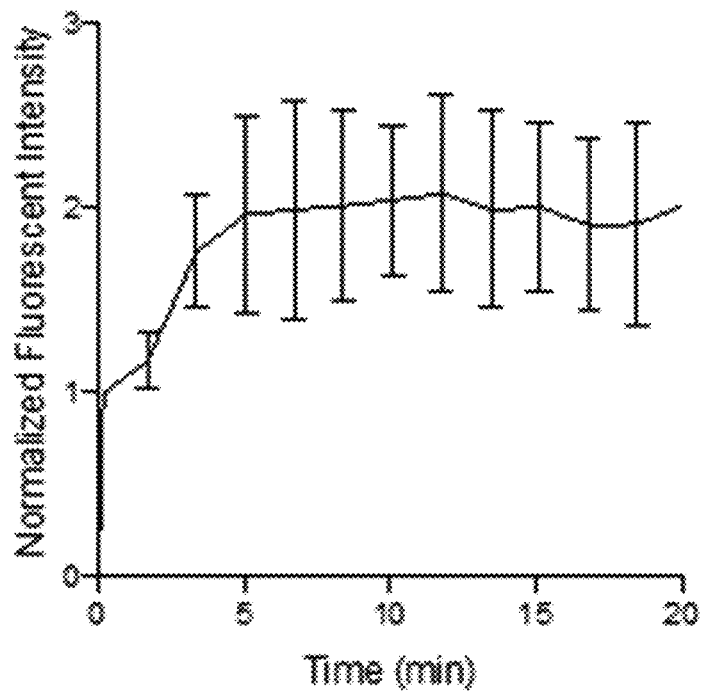
Figure 5H:
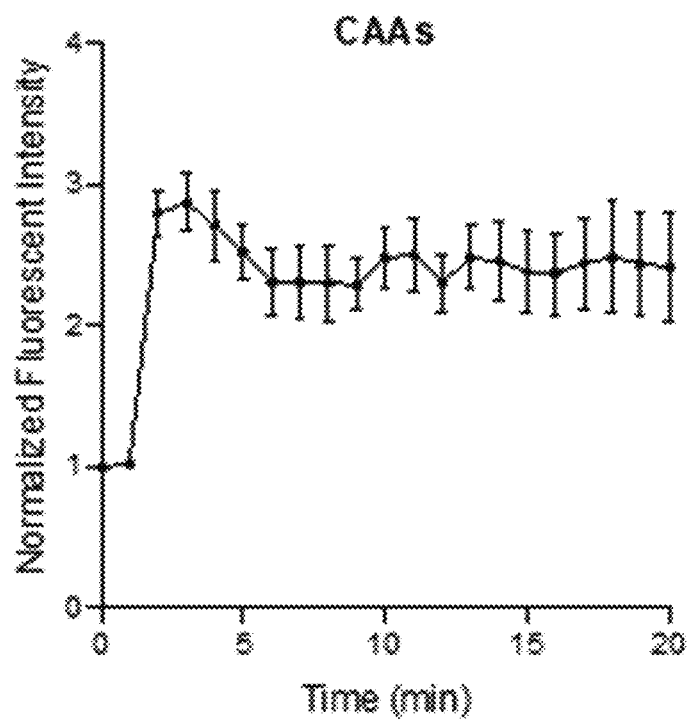
Figure 5I:
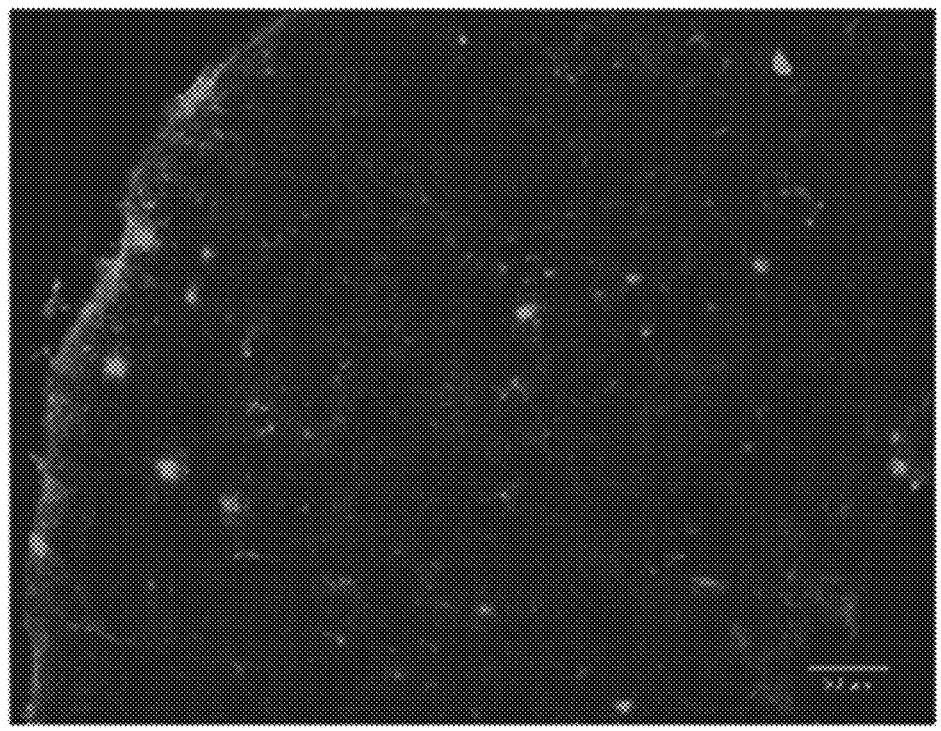
Figure 5J:
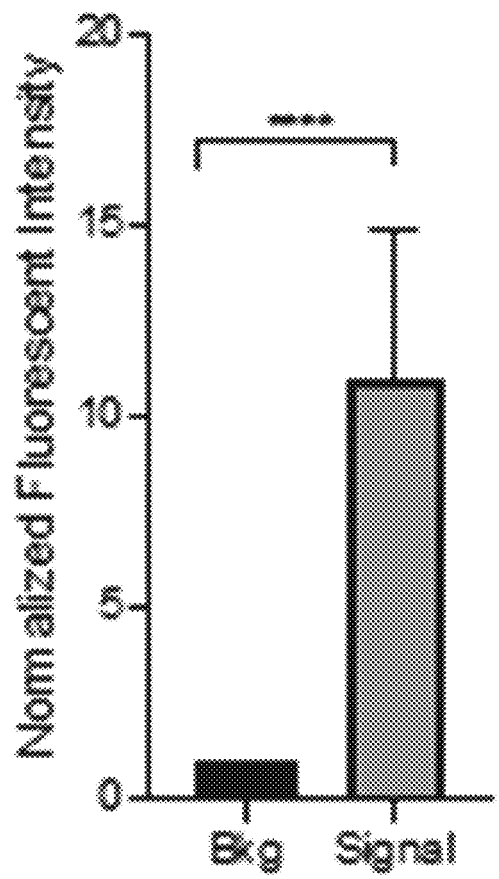

In Vivo Imaging with ADLumin-1 Two photon microscopic imaging with ADLumin-1: ADLumin-1 can stain Aβ plaques in vivo. In this regard, a 5×FAD mouse brain slice was first incubated with ADLumin-1. ADLumin-1 provided excellent contrast for the plaques. The signal to noise ratio (SNR) was 2.93 (FIGS. 5a and 5d). To investigate whether ADLumin-1 is capable of labeling Aβ plaques in vivo, two-photon imaging was done with a 5×FAD mouse, a widely used AD model. ADLumin-1 could quickly cross brain blood barrier (BBB), and provided excellent contrast for cerebral amyloid angiopathy (CAA) on the blood vessels and Aβ plaques (FIG. 5c). The SNR of plaques and CAAs were about 17.0 and 26.0 respectively (FIG. 5e). The time-course imaging results revealed that the intensity in CAA reached the peak within 1 minute, while it was 5 minutes for the plaques. ADLumin-1 penetrates BBB and stays in the brain (FIG. 5G-I), and it is an excellent two-photon imaging probe for Aβs in vivo.

Figure 6A:
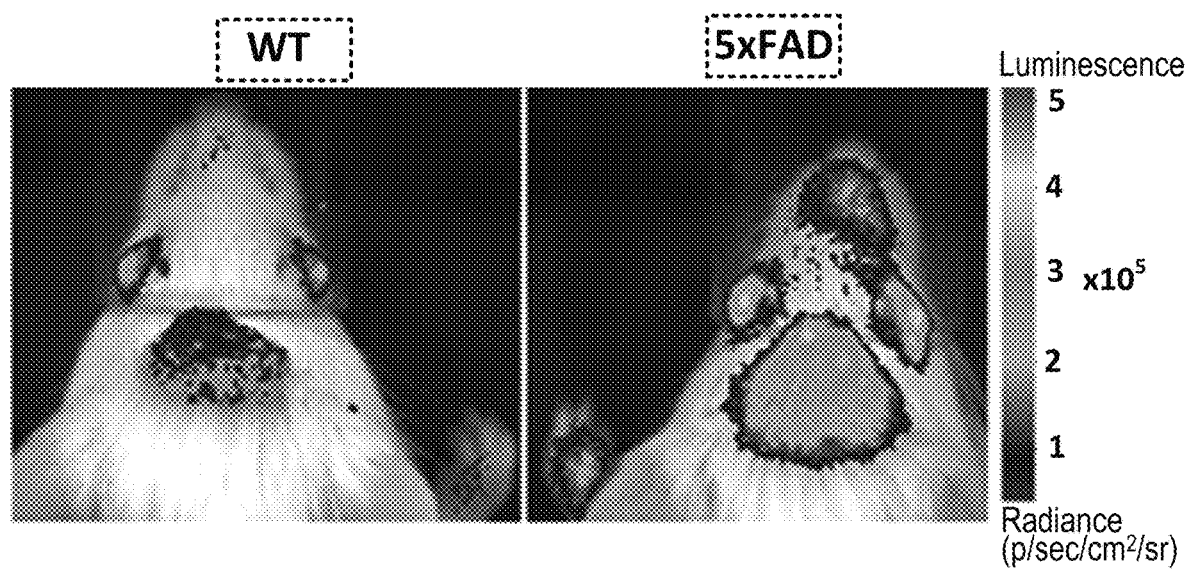
FIG. 6A contains in vivo chemiluminescence imaging with ADLumin-1. In vivo brain imaging of WT and SXFAD mice with i.v. injection of ADLumin-1.

Ex vivo imaging study: To further confirm that ADLumin-1 is indeed able to stain the plaques, the mouse was sacrificed, and brain sectioned into 20-micron thick slices for histology studies. The plaques in the brain slides were considerably bright (FIGS. 5c and 5f), confirming that ADLumin-1 could label the plaques in vivo. In vivo chemiluminescence imaging: ADLumin-1 can be used to detect Aβs in vivo with a non-invasive imaging setup. IVIS imaging system was used to conduct image acquisition. 4-month old 5×FAD mice (n=4) and age-matched wild type (WT) were used, a solution of 100 μL (1 mg/ml) was injected intravenously. Images were captured at 15-, and 30-minutes after the injection with open filter setting. Although the emission peak of ADLumin-1 is relatively shorter in comparison of other NIRF dyes for brain imaging, considerably strong signals were observed from the brain area, and the differences between 5×FAD and WT were 1.7-fold and 1.8-fold at 15- and 30-minutes respectively (FIG. 6a). To further confirm the signals originated from brain, imaging was conducted with multiple filters from 500 nm to 840 nm (FIG. 6E). The highest signals were from 640 nm filter, and the difference with 640 nm was 1.7-fold, which is similar to the open filter setting. The majority of the signals are from brains (640 nm), but not from shallow locations such as skin.

Figure 6B:
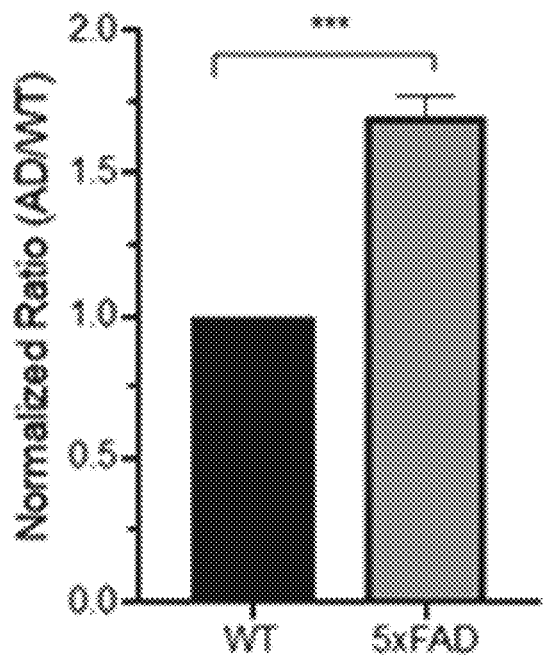
FIG. 6B contains quantitative analysis of the images in 6A.
Figure 6C:
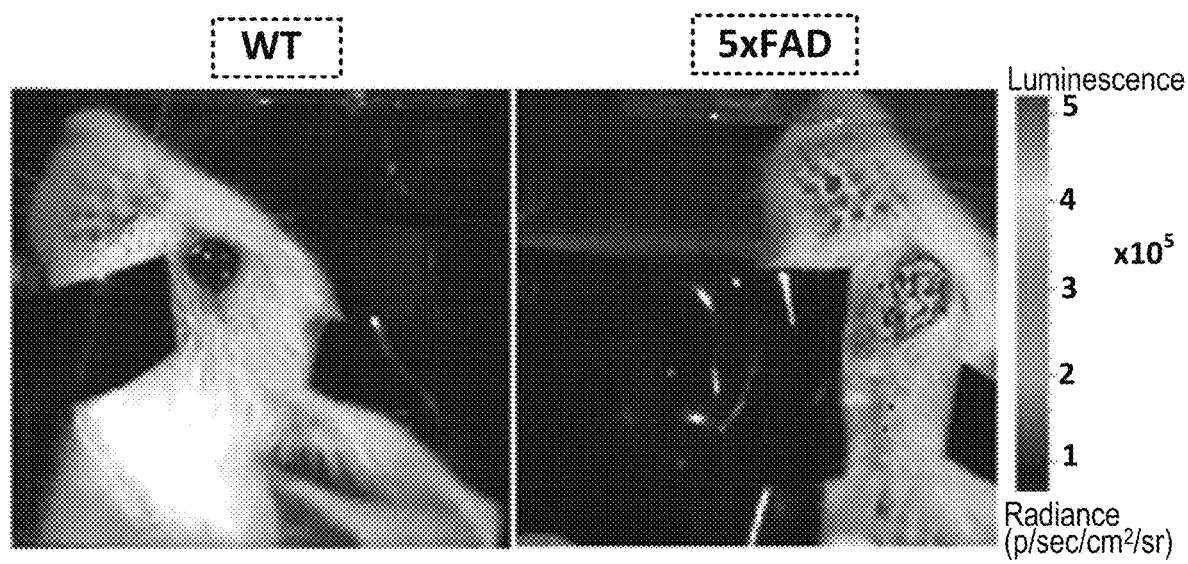
FIG. 6C contains representative images of eyes in WT and 5×FAD mice after iv injection with ADLumin-1.
Figure 6D:
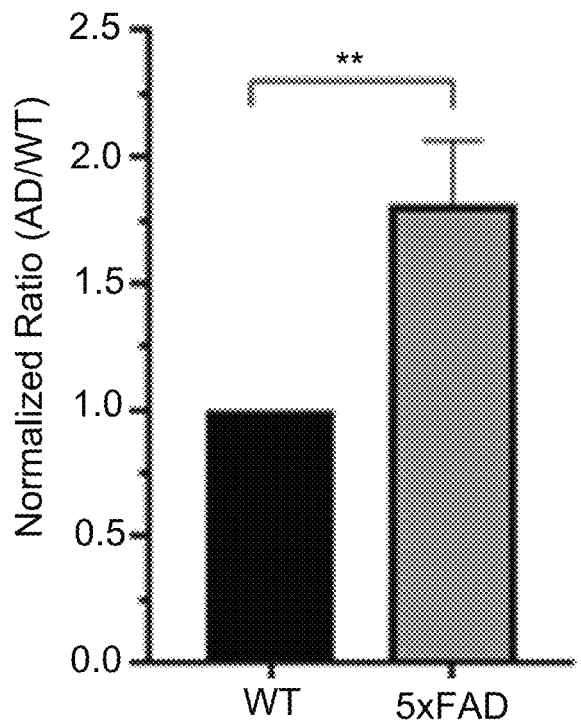
FIG. 6D contains quantitative analysis of the imaging in 6C (n=4).
Figure 6E:
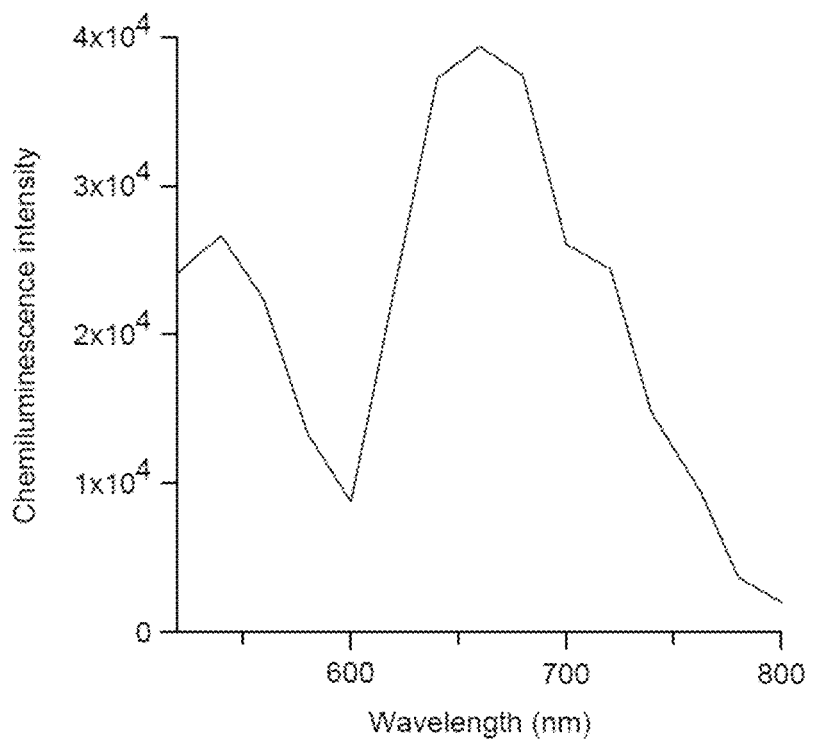
FIG. 6E contains in vivo chemiluminescence spectrum of ADLumin-1 from the brain area of a WT mouse.
Figure 6F:
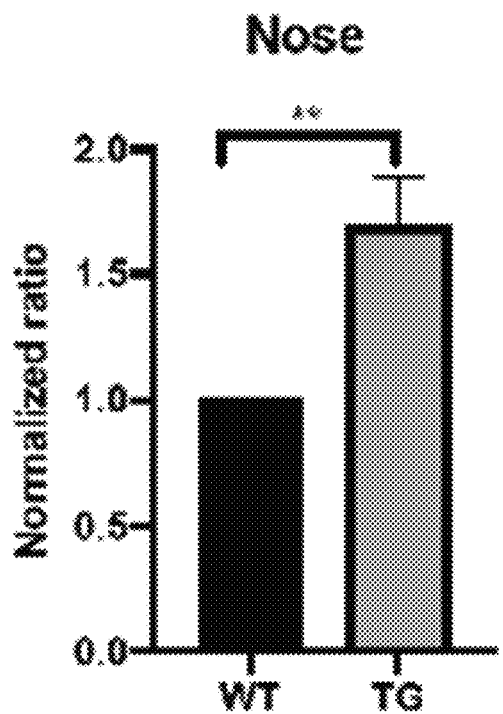
FIG. 6F contains quantitative analysis of nose images from in vivo imaging with ADLumin-1 for 5×FAD and WT.

The chemiluminescence signals from eyes were higher (1.6-fold) in the 5×FAD group than that in WT group (FIGS. 6b and 6c). NIRF probe CRANAD-X (X=-2, -3, -30, -58, and -102) could detect the Aβ content in eyes. The signals from noses were also stronger in the 5×FAD group (1.7-fold, FIG. 6F).

Dual-Amplification of Signal Via Chemiluminescence Resonance Energy Transfer (DAS-CRET)

Hypothesis of DAS-CRET: ADLumin-1 is a smart chemiluminescence probe for Aβs as confirmed via testing in pure solutions, brain homogenate and in vivo brain and eye imaging, its emission peak was still relatively short. CRET could be used to shift the detectable emission into the near infrared (NIR) window. CRET does not need external excitation and has no interference from the cross-excitation of the acceptor. More importantly, better penetration could be achieved, due to the longer emission of the acceptor. The requirements for CRET are similar to FRET, which requires that the donor and acceptor are conjugated through a linker or proteins engineered in close proximity (normally <10 nm). The closer proximity of the donor-acceptor and more spectral overlap of donor emission and acceptor excitation, the higher the transfer efficiency.

Figure 7A:
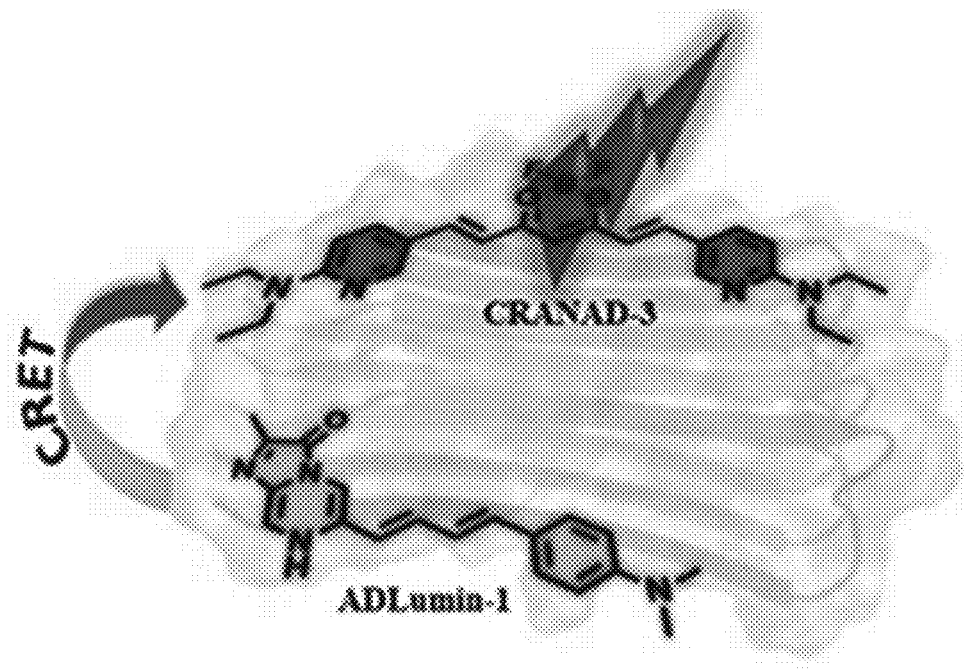
FIG. 7A contains proposed CRET model between ADLumin-1 and CRANAD-3 with Aβ40 fibrils. Two non-conjugated molecules upon binding to fibrils to bring the ADLumin-1 (Donor) close enough to the CRANAD-3 (Acceptor) to initiate CRET.

Non-conjugated FRET was feasible in solutions with two small molecules that both have binding capacity to Aβ species, because the pair has a high probability of randomly incorporating themselves into the beta-sheets of Aβs within 10 nm proximity to generate a viable FRET signal. This technology was not very efficient and nearly impossible to apply in vivo, its short excitation and cross-excitation of the acceptor makes its complex and hard to tease out the FRET effect. Most of CRET pairs have no signal amplification (turn-on) for neither donor nor acceptor upon target binding. Dual-amplification of signal-CRET (DAS-CRET) is feasible if both the donor and acceptor can bind to the target and amplify (turn-on) their luminescence signals (FIG. 7a). The non-conjugated pair of ADLumin-1 and CRANAD-3, a smart NIRF probe for Aβs, was used to demonstrate that DAS-CRET is achievable with Aβs in solutions, in brain homogenates and in vivo whole brain imaging. As shown in Example 2, strategy can also be extended to detect other misfolding-prone proteins.

Figure 6G:
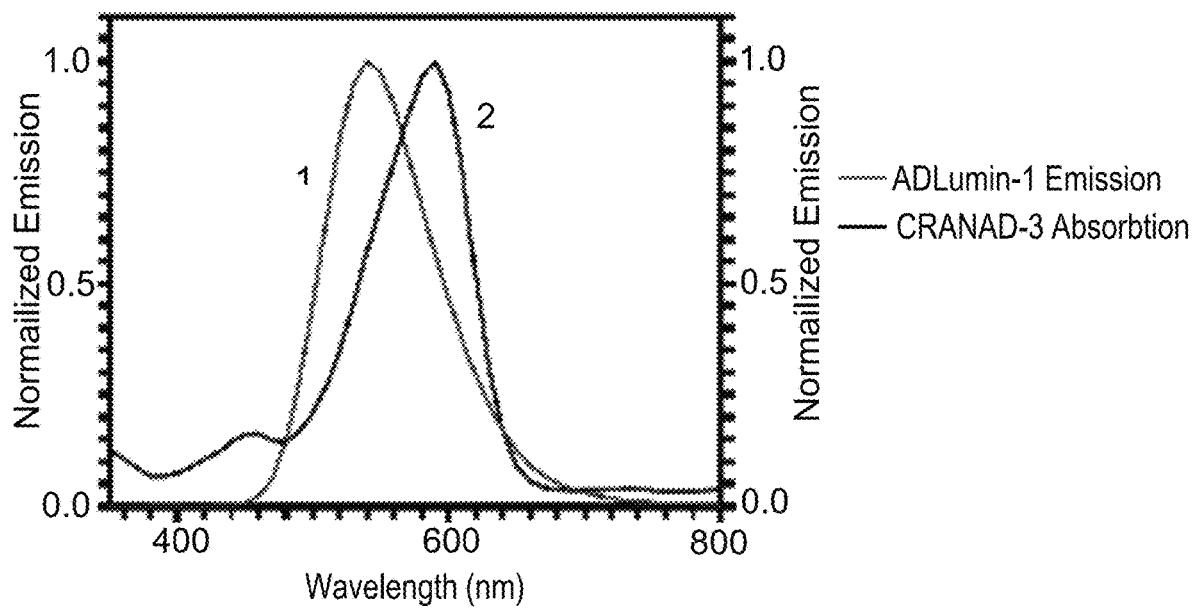
FIG. 6G shows spectral overlap of the ADLumin-1 chemiluminescence emission with the CRANAD-3 absorption.
Figure 7B:
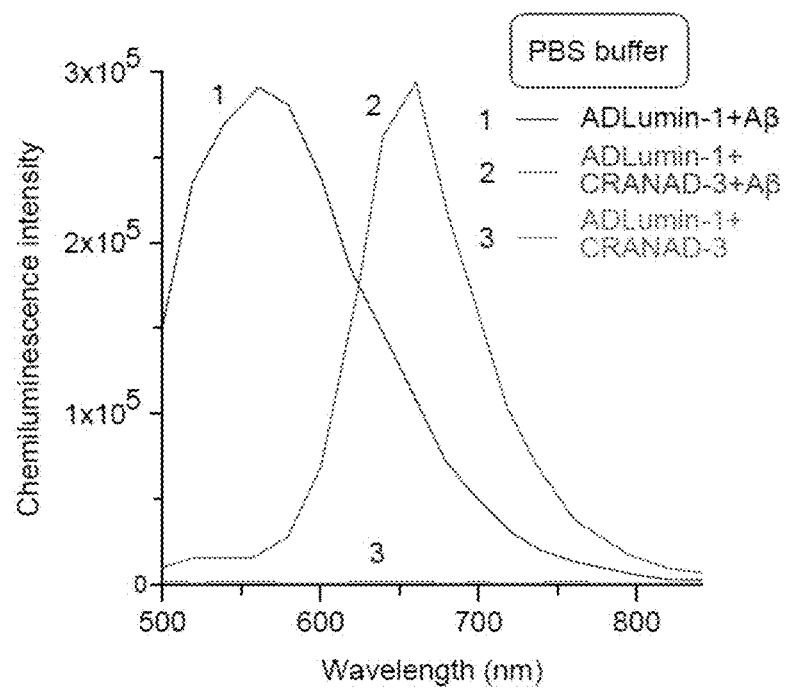
FIG. 7B contains spectrum of the CRET pair with Aβ40 fibrils in PBS (red line), and the peak was consistent with the emission of CRANAD-3 in the presence of Aβ40 fibrils. Chemiluminescence spectrum of ADLumin-1 with Aβ40 fibrils (black line); and spectrum of the mixture of ADLumin-1 and CRANAD-3 without Aβ40 fibrils (pink line). The FRETing efficiency was very high, evident by the low intensity at 500-560 nm range.

Validation of DAS-CRET in PBS buffer: DAS-CRET was possible in PBS solutions. CRANAD-3 is a turn-on NIRF probe for Aβs in vitro and in vivo. ADLumin-1, CRANAD-3 and Aβ aggregates were incubated in PBS buffer, and CRET between ADLumin-1 and CRANAD-3 was very obvious in the presence of Aβs, while there is no observable CRET in the absence of aggregates (FIG. 7b). Remarkably, the CRET was not only FRETing into longer emission, but it also significantly amplified the signals. Compared to the CRET pair without Aβs, the signal was about a 133-fold increasing with the presence of Aβs at 660 nm (FIG. 7b). This large amplification is due to dual signal amplification that arose from turn-on effects from both ADLumin-1 and CRANAD-3 in the presence of Aβs. This phenomenon is unprecedented for CRET. This highly efficient CRET is also likely due to the very close proximity of the pair when they randomly inserted into beta-sheets of Aβ aggregates, which consist of numerous fibrils that contain numerous parallel or anti-parallel arranged beta-sheets. In addition, the well-overlapped spectra of ADLumin-1 emission and CRANAD-3 excitation also contributed to the highly efficient CRET (FIG. 6G).

Figure 7C:
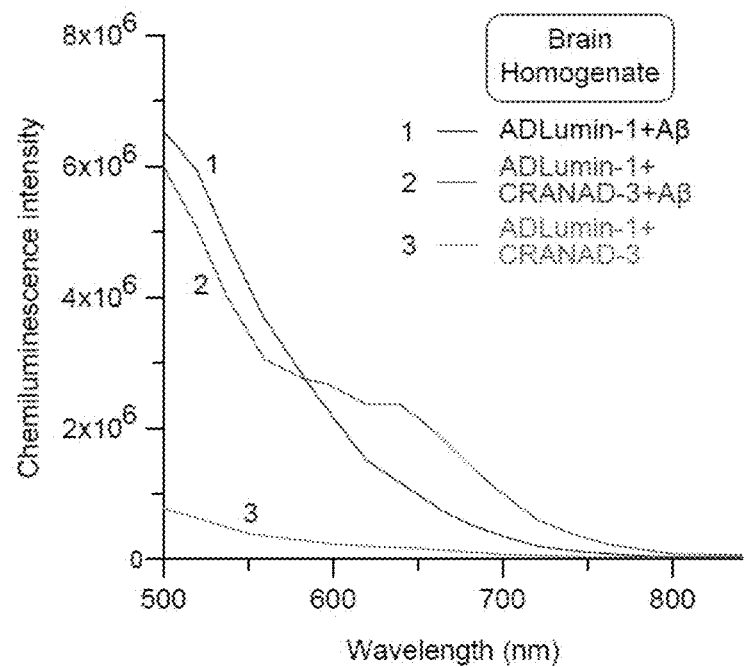
FIG. 7C contains spectrum of the CRET pair in brain homogenate (red line), evident by a decrease in ADLumin-1 emission (black line) and increase in CRANAD-3 emission.

DAS-CRET in brain homogenates: Similar experiments were conducted with mouse brain homogenate. Indeed, an apparent CRET signal was observed at 660 nm (FIG. 7c), which is corresponding to the emission of CRANAD-3. The CRET signal was increased 11.4-fold if Aβs were added to the homogenate. Remarkably, the signals from DAS-CRET was 2.38-fold higher than that from the non-CRET group (without CRANAD-3) at 660 nm, showing that DAS-CRET is achievable in real biologically relevant environment.

Figure 7D:
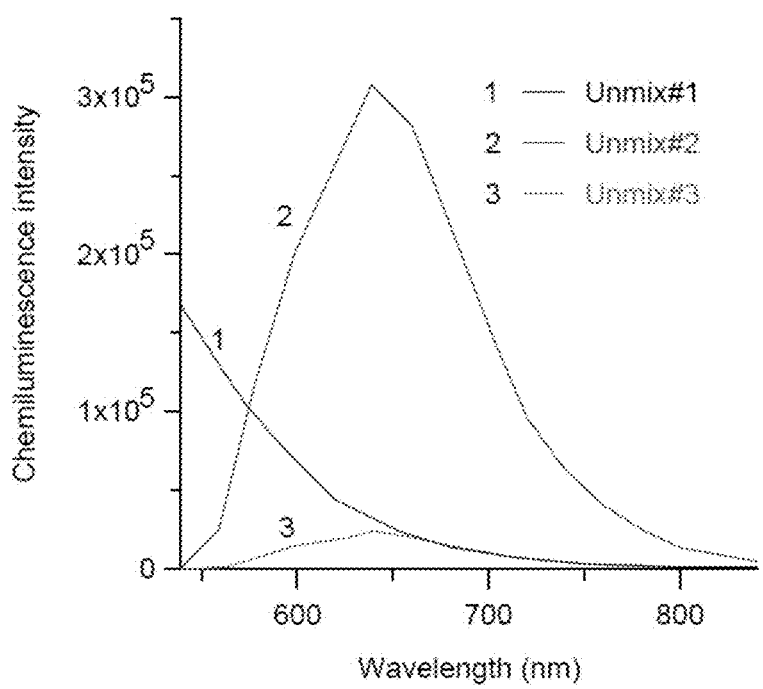
FIG. 7D contains spectral unmixing of DAS-CRET to separate the contribution from ADLumin-1 only (Unmixed #1), and CRET (Unmixed #2) and CRANAD-3 only (Unmixed #3).
Figure 7E:
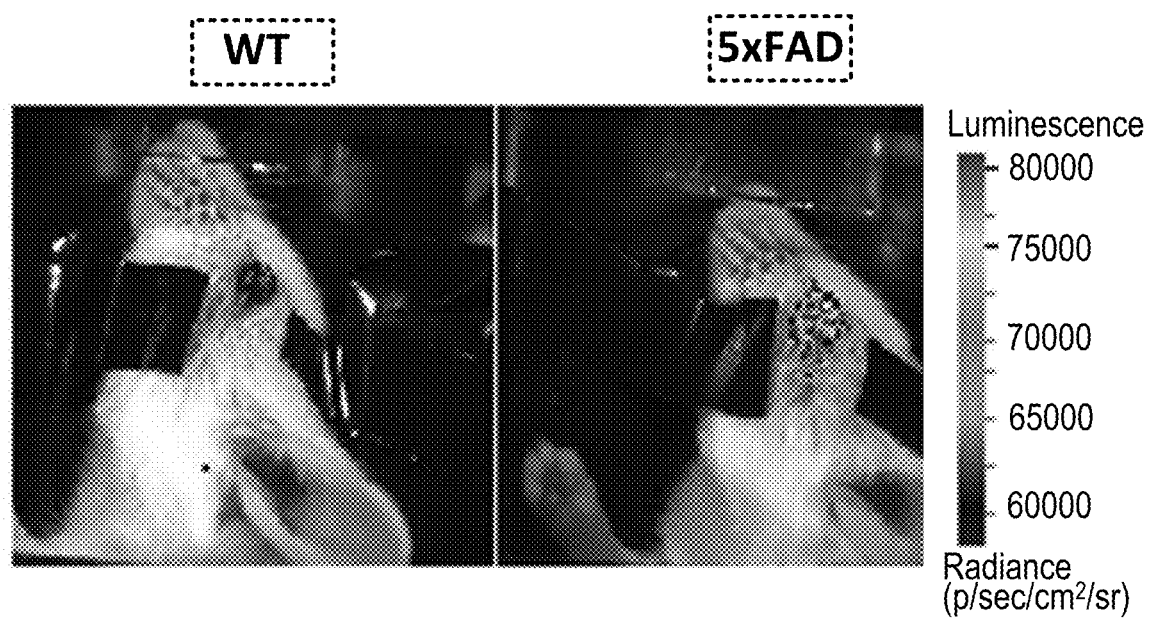
FIG. 7E contains in vivo chemiluminescence eye imaging of WT and SXFAD mice with mixture of ADLumin-1 and CRANAD-3.
Figure 7F:
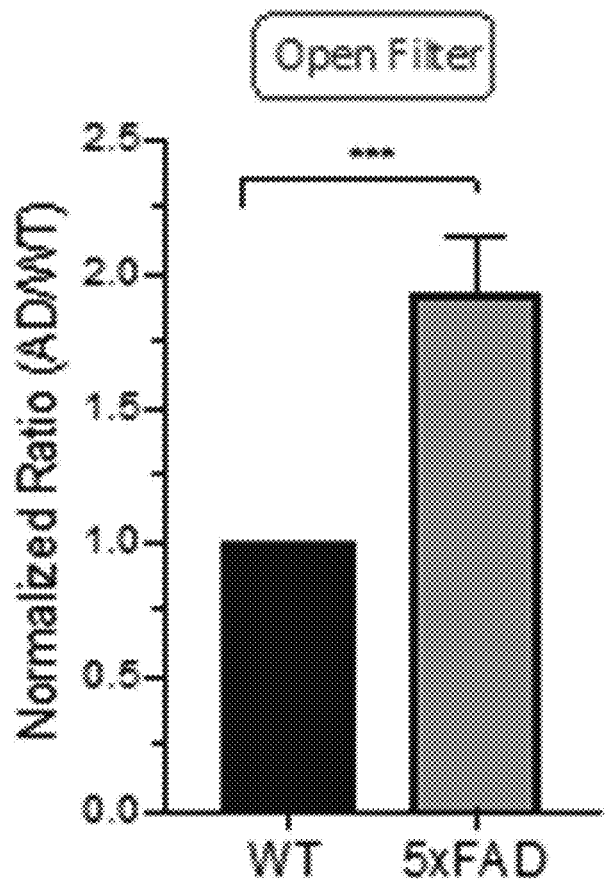
FIG. 7F contains quantitative analysis of the images obtained in (E) with the setting of open filter (n=3).
Figure 7G:
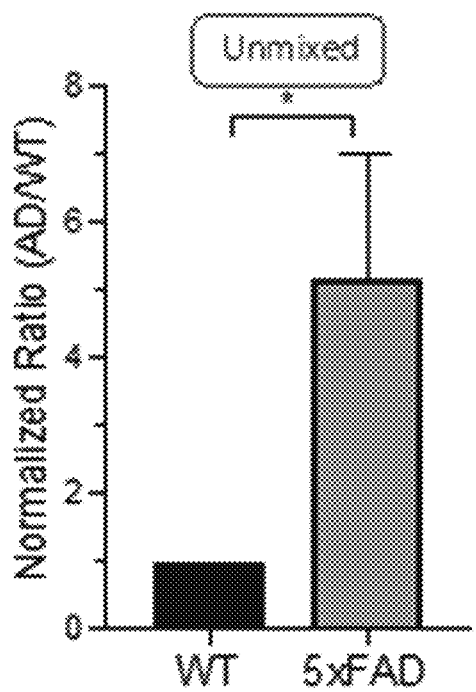
FIG. 7G contains quantitative analysis of the images obtained in (E) with spectral unmixing (n=3).

To accurately analyze the signal amplification, FRET is always coupled with spectral unmixing technique to separate the signal contributions from the donor and the acceptor. Although spectral unmixing has been rarely explored for CRET, spectral unmixing is feasible for DAS-CRET. Indeed, the detection sensitivity could be further increased via spectral unmixing. In FIG. 7d, it is very clear that the unmixed spectrum (red line) is similar to the emission of CRANAD-3 after unmixing. Remarkably, the difference between CRET and non-CRET could reach 31-fold at 660 nm in the brain-like environment.

In Vivo DAS-CRET Imaging

Figure 8A:
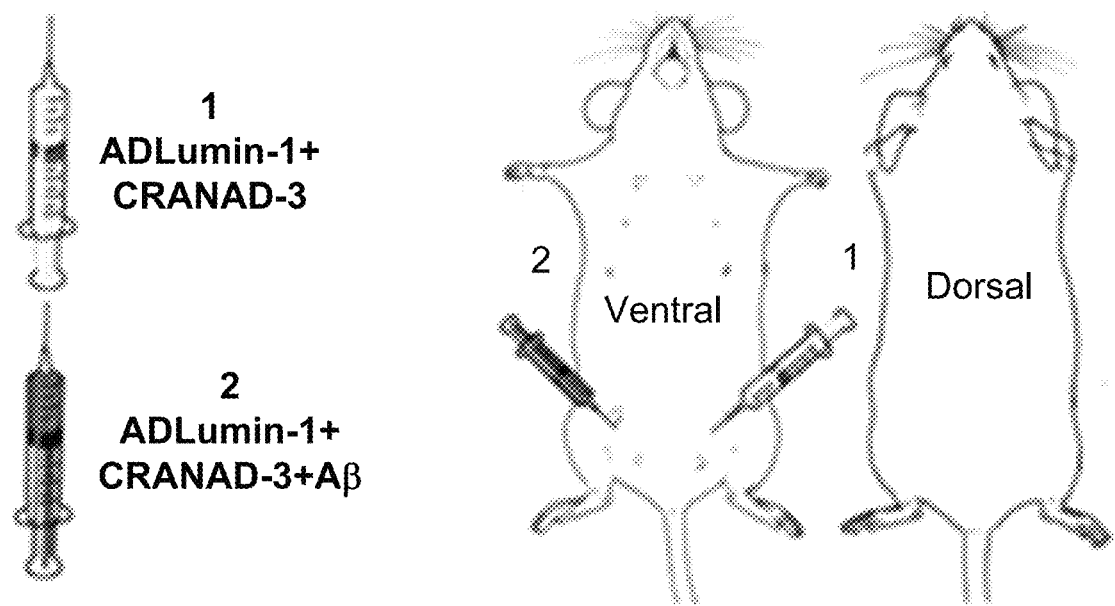
FIG. 8A shows observation of CRET under in vivo mimic conditions. A mixture of ADLumin-1 and CRANAD-3 with and without Aβ40 aggregates were injected subcutaneously into the inner thighs of live anesthetized a female nude mouse.
Figure 8B:
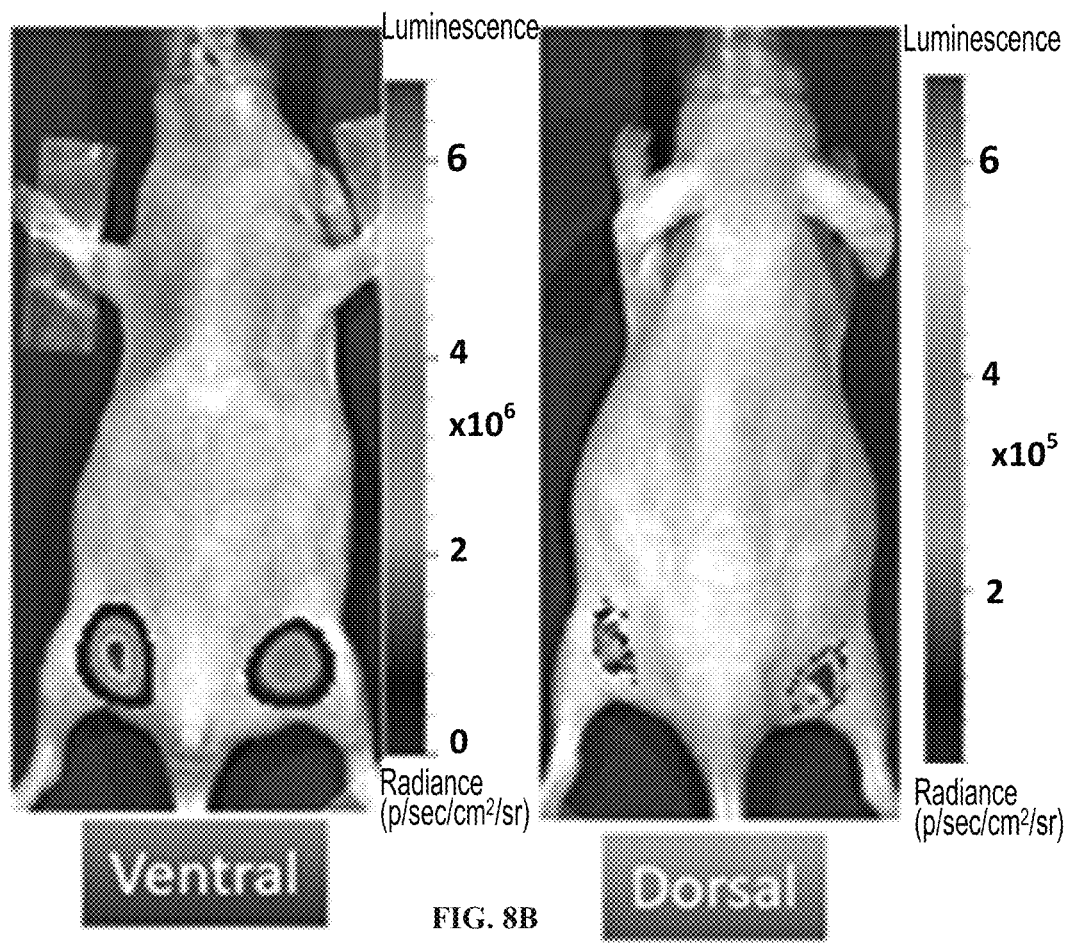
FIG. 8B shows the mouse was imaged from both the ventral and dorsal sides with open filter.
Figure 8C:
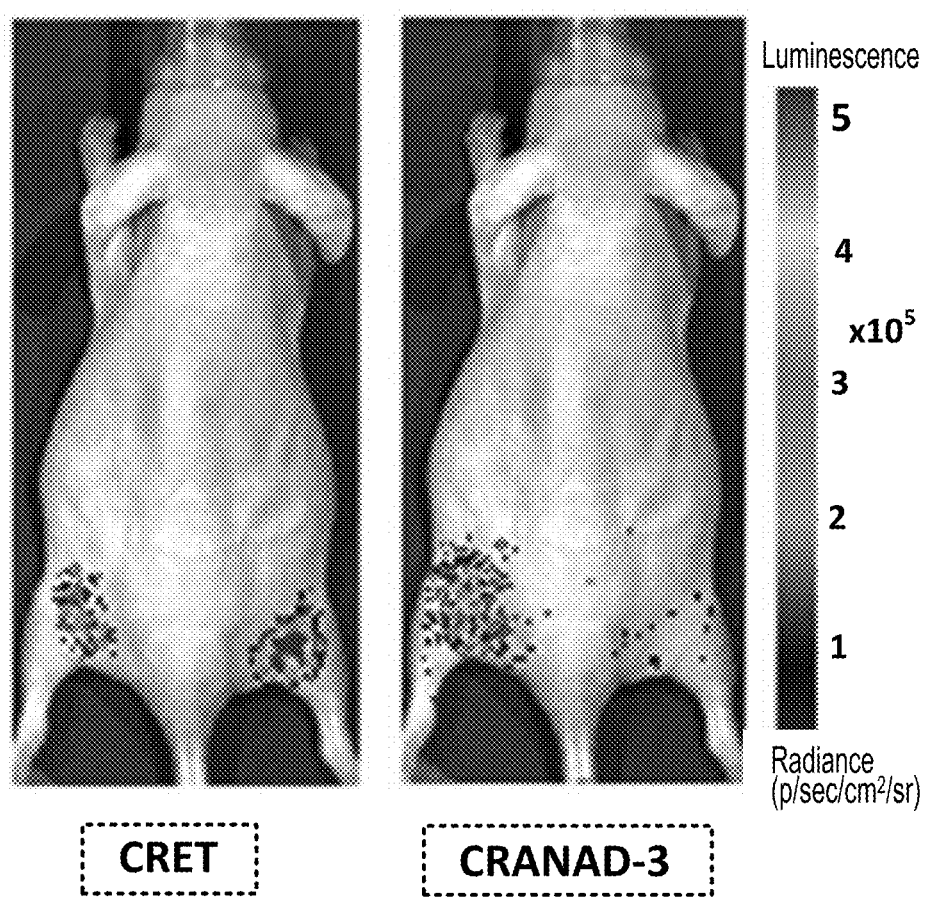
FIG. 8C shows spectral unmixing was also conducted with sequence imaging at 15 min post injection.
Figure 8D:
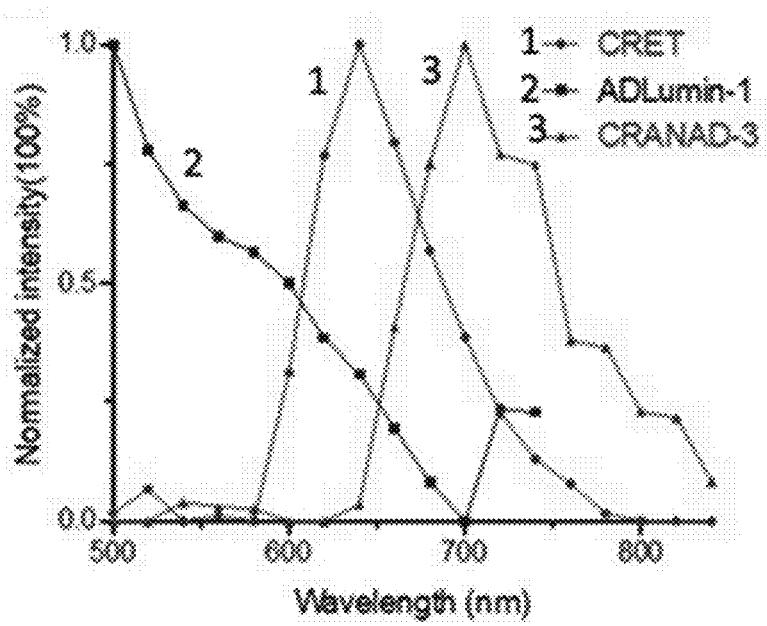
FIG. 8D shows spectra of the unmixed contributors, ADLumin-1 (black), CRET (red) and CRANAD-3 only (purple).
Figure 8E:
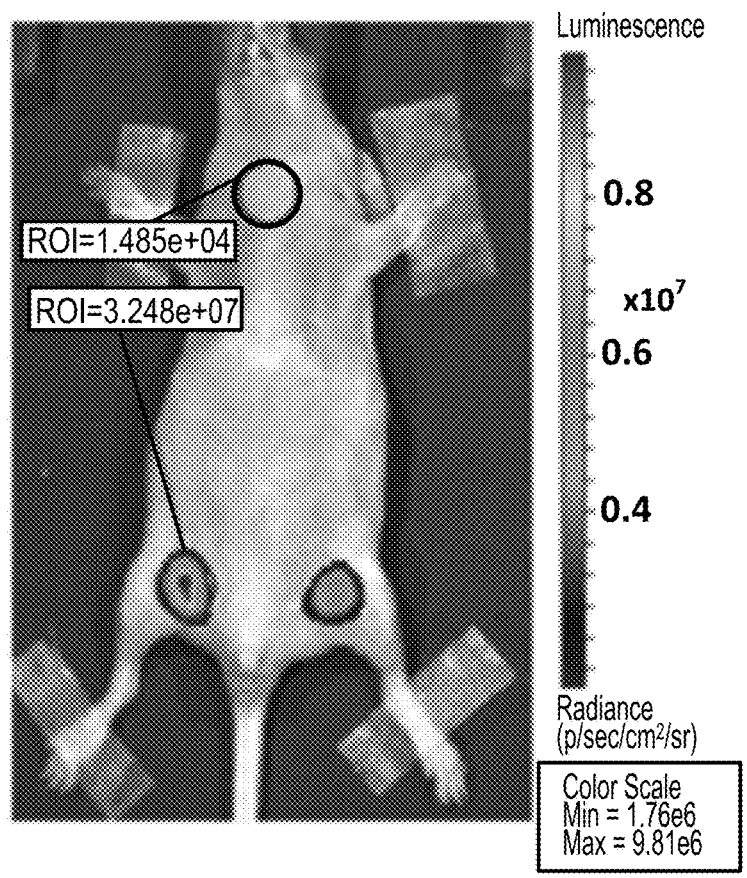
FIG. 8E shoes ADLumin-1 proves a very high SNR (>2000). SNR=ROI1/ROI2=2189.

Mimic in vivo DAS-CRET imaging: to explore whether the CRET pair can be used in alive animals, in vivo environment was mimicked via subcutaneously injecting the mixture of the CRET pair with and without Aβs into a nude mouse at the ventral hind limb (FIG. 8a). With open filter setting, the signal from the Aβs site (left) was 1.34-fold higher than that from the control site (right) (FIG. 8b), suggesting that the non-conjugated CRET pair can be used in vivo. To investigate whether the CRET pair can be used for deep locations, the above mouse was flipped to acquire images from the dorsal side (the thickness from the injection site to the dorsal surface is about 1.2 cm). As expected, signals could be detected. Remarkably, the difference between Aβ group and control group could be easily observed (1.21-fold), indicating the pair can be used for imaging at deep locations (FIG. 8b). To further achieve more accurate information about the efficiency of CRET in vivo, spectral unmixing imaging were conducted with 18-filters to collect signal from 500 nm to 840 nm. The unmixed spectra are closely resembling to the spectra of ADLumin-1, CRANAD-3 with Aβ binding and free CRANAD-3 respectively (FIG. 8c, d). After spectral unmixing, the difference reached 1.60-fold. In vivo DAS-CRET was feasible and spectral unmixing imaging was applicable for in vivo imaging, and larger margin of differences can be achieved via spectral unmixing.

Figure 9A:
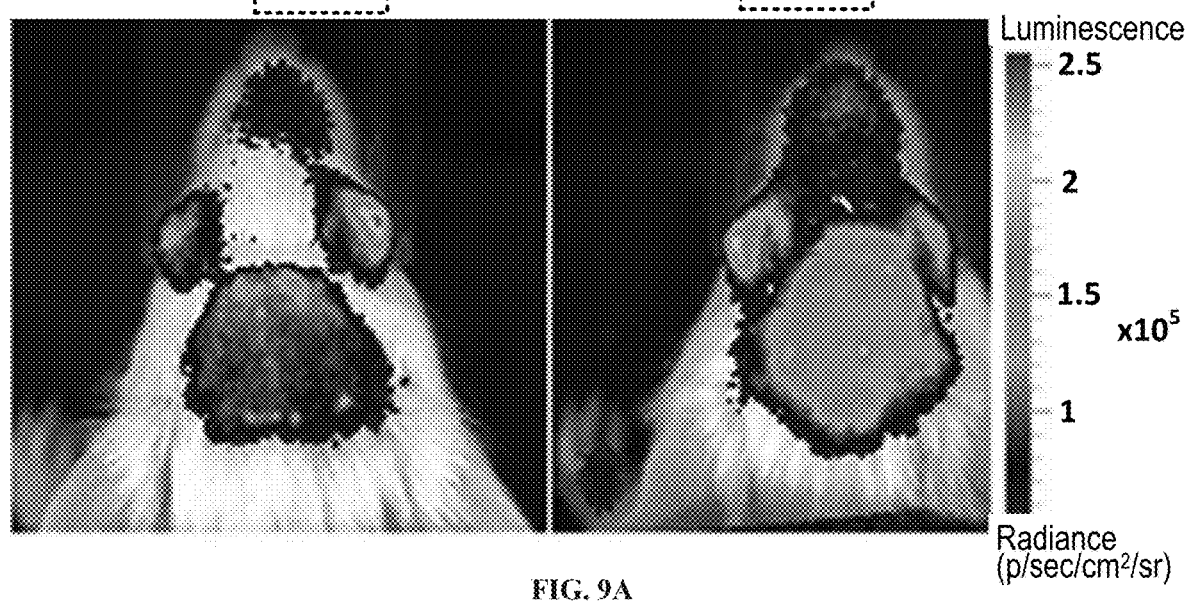
FIG. 9A contains in vivo DAS-CRET imaging. In vivo brain imaging of WT and SXFAD mice with mixture of ADLumin-1 and CRANAD-3.
Figure 9B:
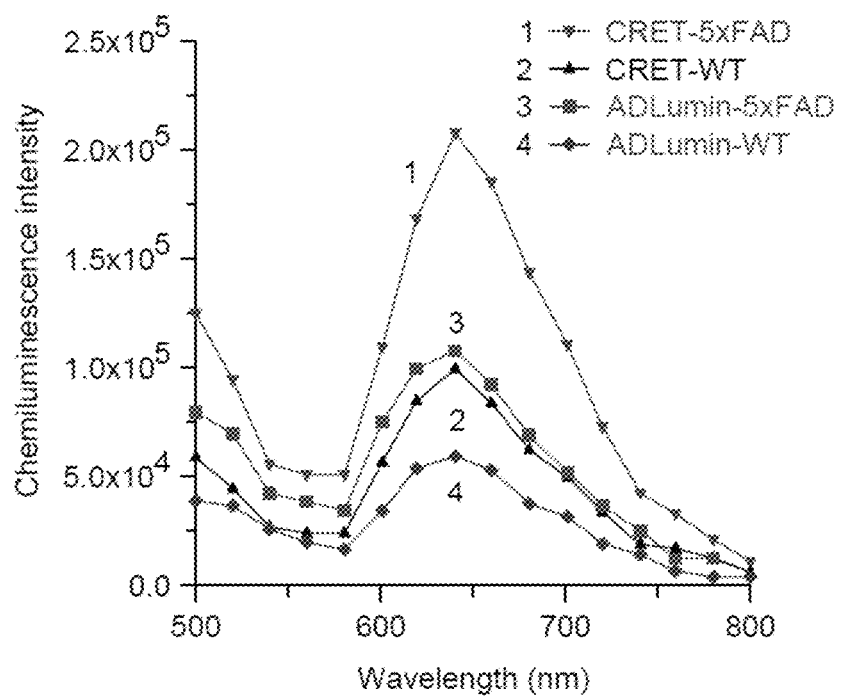
FIG. 9B contains in vivo emission spectra of CRET pair (red line-5×FAD) and control (black line-WT), and ADLumin-1 (pink line-5×FAD) and control (blue line-WT).
Figure 9C:
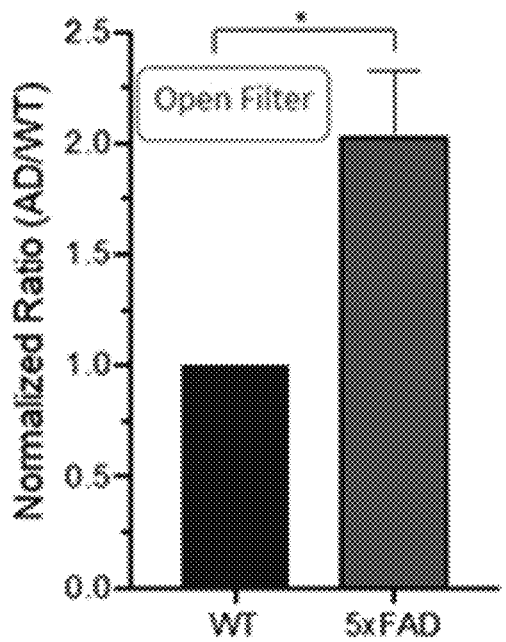
FIG. 9C contains quantitative analysis of the images obtained in (A) with CRET pair (n=3) with the setting of open filter.
Figure 9D:
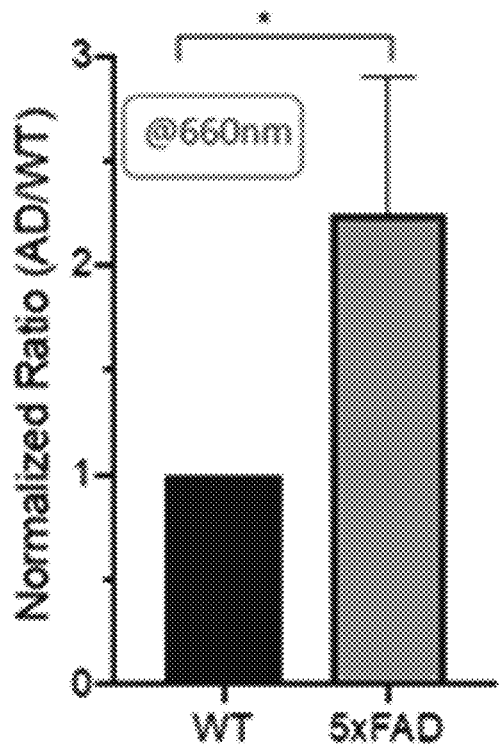
FIG. 9D contains quantitative analysis of the images obtained in (A) with CRET pair (n=3) at 660 nm.
Figure 9E:
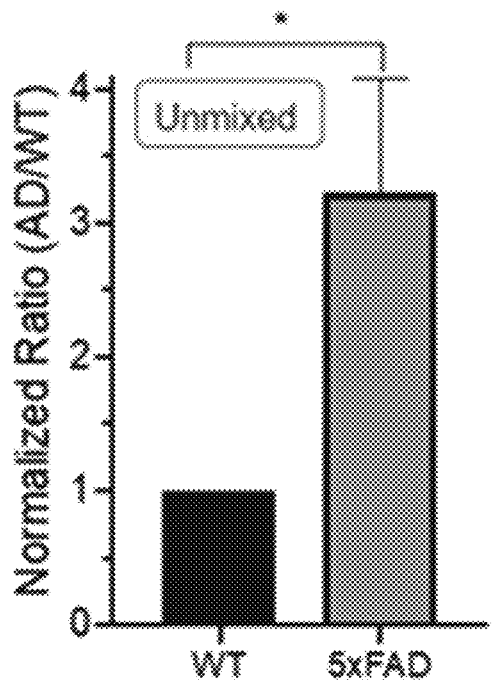
FIG. 9E contains quantitative analysis of the images obtained in (A) with CRET pair (n=3) after spectral unmixing.

In vivo DAS-CRET whole brain imaging: To validate the feasibility of CRET in vivo brain imaging, solution containing both ADLumin-1 and CRANAD-3 was iv injected, and images were collected with open filter and 18 filters from 500 nm to 840 nm. With the open filter setting, 2.04-fold differences were observed between the 5×FAD group and the WT group at 15 minutes after the injection (FIGS. 9a and 9c). With the 660 nm filter, the AD group showed 2.25-fold higher signal than the control WT group (FIG. 9d). Moreover, the CRET pair provided higher luminescence signals at 660 nm than that ADLumin-1 alone in both AD and WT groups, and the increasing was 2.10- and 1.66-fold respectively (FIG. 9b). The margin between AD and WT was significantly increased after spectral unmixing, and it reached 3.22-fold from the CRET pair (FIG. 9e).

Figure 7H:
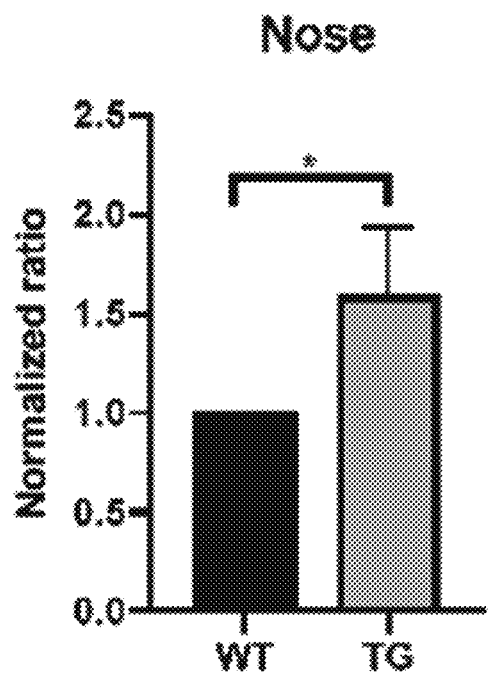
FIG. 7H contains quantitative analysis of nose images obtained in (E) with the CRET pair.

NIRF ocular imaging could be used to differentiate AD and WT mice and monitor therapeutic effect on Aβ-lowering with treatment. In this regard, ocular CRET imaging was performed and provided a considerably large margin of 2.11-fold between 5×FAD and WT mice (FIG. 7E-H). This large margin indicated that ocular CRET could be a very useful tool for monitoring the changes in Aβ concentrations. Interestingly, the nose signal was higher from the AD group than that from the WT group with ADLumin-1 alone or with DAS-CRET (FIG. 7H).

Discussion of Example 1

ADLumin-1 is a smart chemiluminescence probe for APs in vitro and in vivo. DAS-CRET was feasible via a non-conjugated "dual-turn-on" CRET pair with the combination of a smart chemiluminescence probe and a smart NIRF probe. As shown in Example 2, the strategy for probe designing and CRET method can be extended to other misfolding proteins such as tau, alpha-synucleins, TDP-43, amylin, fibrinogen, prion, fused in sarcoma (FUS) protein, SOD and transthyretin. These proteins contain hydrophobic beta-sheets for binding of specific small molecule probes of this disclosure to turn-on luminescence, and the close proximity of abundant beta-sheets to randomly positioning the paired non-conjugated probes for CRET occurrence. Not all amyloid proteins exist in brains, some misfolded protein deposits can be found in the skin and other places. Considering that relatively deep penetration in the mimicked imaging (FIG. 8), CRET strategy is applicable for this purpose.

Several surprising results were discovered. Although ADLumin-1 has moderately short chemiluminescence emission peak, it was an astonishment that ADLumin-1 provided acceptable tissue penetration (5-7% light penetration for whole body of a mouse (FIG. 4c-d and FIG. 8) and could be used for in vivo mouse brain imaging. This is probably due to its high SNR (>2000) (FIG. 8E) and its large FWHM. In addition, the larger FWHM could also provide larger spectral overlap between the donor and the acceptor for CRET.

ADLumin-1 was much more sensitive to $O_2$ (27-fold change), and the responses were very quick (within seconds), compared to conventional imaging agents. Compared to the responses to $O_2$, the enhancement of ADLumin-1 signal to ROS is relatively small. The auto-oxidation of ADLumin-1 is related to $O_2$ levels, and this oxidation can be utilized for in vivo imaging. Hence, ADLumin-1 and other probes of this example could be used as $O_2$ sensors in samples, organs, or tissues.

The experimental results successfully demonstrated that it was feasible use CRET to image AD pathology in vivo, as the non-conjugation of the pair of agents is an advantage to avoid high molecular weight for probe designing.

Signal amplification is always beneficial for imaging. The chemiluminescence of ADLumin-1 can be amplified (turn-on) by Aβ species. The emission of ADLumin-1 could be pushed into the NIR window via CRET. Images showed impressive signal to noise ratio (SNR). This is likely due to no excitation leakage and auto fluorescence. Since it is difficult to have deep penetration from short chemiluminescence, the signal detected at 640 nm is primarily from CRET. In addition, spectral unmixing can significantly improve the detection sensitivity both in vitro and in vivo for CRET imaging.

NIRF probes, such as CRANAD-X, could be used to image Aβ contents in eyes of AD mice. Consistent with this, higher luminescence could be observed from the eyes of AD mice via ADLumin-1 alone or via DAS-CRET.

Normally, to analyze the Aβ contents from brain tissue homogenate or CSF, certain processes are needed after homogenization. The post-homogenization processes include extraction with SDS, TBS and/or formic acid, and centrifugation to separate supernatants and pellets, which are necessary for ELISA analysis, the most used method for reporting Aβ concentrations. It is well-known that these steps are strongly contribute to the poor reproducibility of ELISA. In this report, in vitro experimental results showed that ADLumin-1 could detect the presence of Aβ species in brain homogenate, showing that ADLumin-1 can be used for reporting Aβ concentrations without any processing.

In summary, compounds of this example, such as ADLumin-1, are smart chemiluminescence probes for Aβs in vitro and in vivo, and DAS-CRET is feasible for detecting Aβ contents in the NIR window. Considering the tissue penetration of DAS-CRET, it is possible to use this method for brain studies on large animals such as marmosets. In addition, the Aβ contents in eyes could be detected.

Example 2—Detection of Beta-Sheet Aggregation and Prion-Like Propagation of Misfolded Proteins in Serum Blood is the fountain to longitudinally support proper functions of living beings, and the health status of blood is tightly associated with the overall well-being. Serum is the major liquid and solute component of blood, and its quality is often used as important parameters to reflect the status of healthiness, for example, the activities of aspartate aminotransferase and alanine aminotransferase are biomarkers for liver dysfunction. In serum, the concentrations of many proteins are used as biomarkers for numerous diseases. The experimental results presented in this example show that the levels of conformation abnormality, such as misfolded beta-sheet, of proteins can be used as biomarkers of various diseases.

Numerous methods have been used for detecting beta-sheet contents in solutions and in vivo. For in vitro solution tests, circular dichroism (CD) spectrum, Fourier transfer infrared (FT-IR) spectrum and Raman spectrum are the most used methods for measuring and confirming the existence of beta-sheets. Moreover, fluorescence spectra of Thioflavin T (ThioT) are often used to reflect the concentrations of beta-sheet aggregates in vitro and in histological slides. Recently, several reports demonstrated that protein-misfolding cyclic amplification (PMCA) and real-time quaking-induced conversion (RT-QuIc) assay could be used to amplify detection signal in biofluids and tissue samples. However, the procedures of these methods take multiple-steps and are tedious.

For in vivo studies, near infrared fluorescence (NIRF) imaging and chemiluminescence imaging have been used to detect the levels of misfoldons, such as Aβ plaques, tau tangles, and alpha-synuclein. However, these methods have limited capacity to detect misfoldons in serum.

Example 1 describes chemiluminescence probes. These probes can bind to a hydrophobic pocket formed by Phe19, Ala21, Val24, and Ile31 in a beta-sheet of a protein. Hence, these probes are generic ligands for various misfoldon aggregates that contain, e.g., the typical hydrophobic pocket formed by Ala, Val, Ile, Leu, and/or Phe (e.g., at least three of these amino acids).

The experimental data provided in this example show that the probes of this disclosure, such as ADLumin-1, robustly respond (e.g., bind) to various misfoldons, including at least five most studied misfoldons. Compared to ThioT, chemiluminescence of ADLumin-1 is much more sensitive for the detection of misfoldons in solutions and in sera. Due to the high sensitivity of ADLumin-1 for beta-sheet structures, a >50-fold difference in chemiluminescence resulting from the probe between sera from health controls and AD patients was observed. This is significant, because this large difference allows to efficiently diagnose AD patients by detecting Aβ misfoldons in their serum.

Furthermore, experimental results of this example show that misfoldons can induce prion-like propagation in serum, and this propagation can be detected using the reagents and methods of this disclosure. The results also show that the prion-like propagation can be attributed to misfolding of several important serum proteins, including Immunoglobulin G ("IgG") and transthyretin. Notably, the disease serum, such as AD serum, can induce prion-like propagation in healthy serum. Lastly, the results show that Aβ antibody can partially block prion-like propagation induced by Aβ aggregates in serum.

Figure 10A:
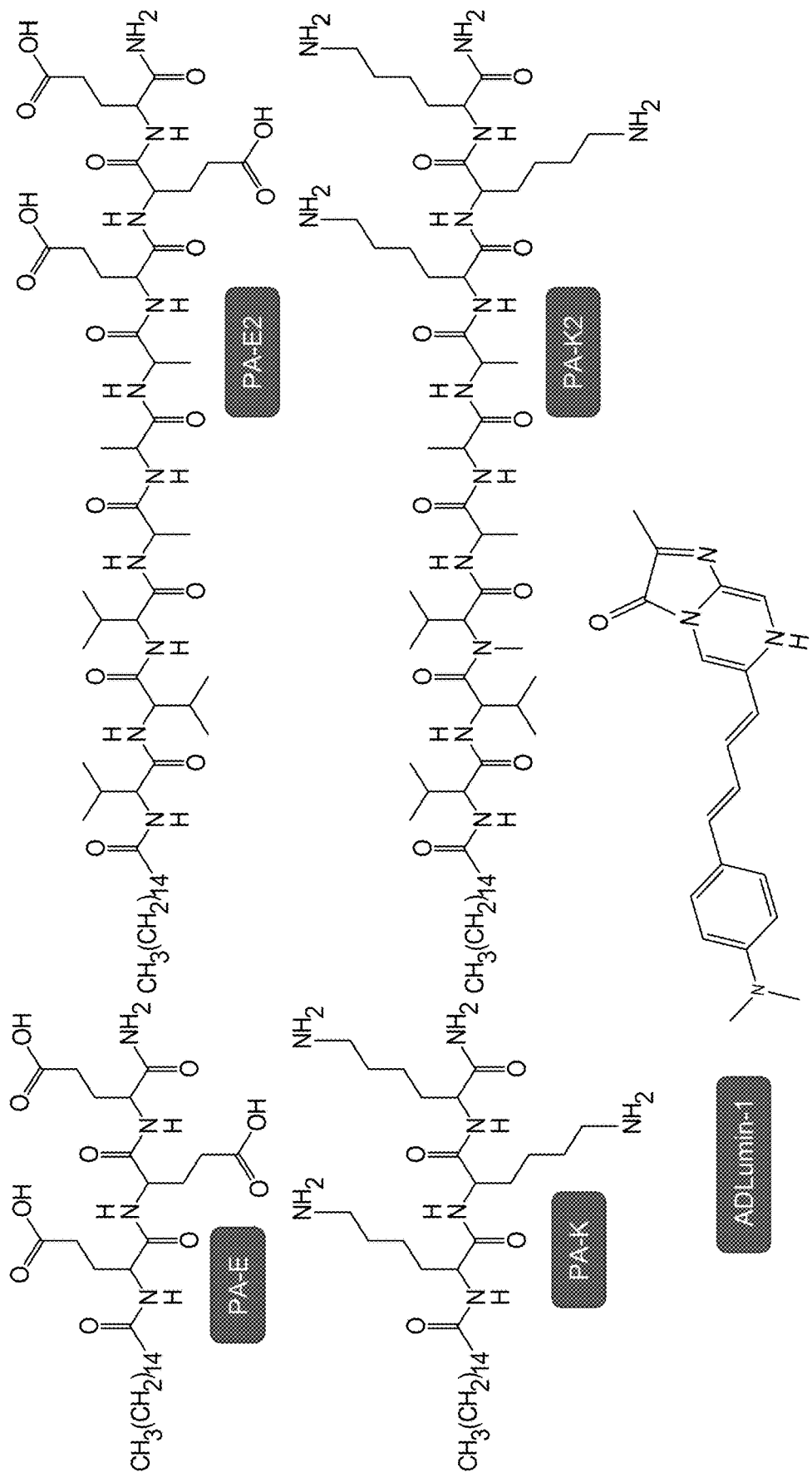
FIG. 10A shows that ADLumin-1 is a highly sensitive chemiluminescence probe for detecting beta-sheet aggregates. Chemical structures of PA-K/K2, PA-E/E2 and ADLumin-1.

Chemiluminescence detection of model beta-sheet aggregates: To investigate whether ADLumin-1 is specific to beta-sheet aggregates, four model peptides PA-E, PA-E2, PA-K and PA-K2 (FIG. 10a) were used. All of them are peptide amphiphiles (PA) and it is well-documented that they could self-assemble to form aggregates under various conditions. PA-E and PA-K, which do not have amino acids for beta-sheet formation, primarily rely on electrostatic interaction to form aggregates, whereas PA-E2 and PA-K2, which contain typical amino acids (three Valine and three Alanine) for beta-sheet formation, produce beta-sheet aggregates via van de Waals interaction and hydrogen bonding.

The four peptides were incubated in PBS buffer (pH 7.4) for 4 days, and TEM images showed that aggregates formed. To further confirm that the conformation of PA-K2 is primarily beta-sheet structure, while PA-K has a low degree of beta-sheet structure, FT-IR recording was performed. FT-IR data showed that PA-K2 had a very strong peak at 1630 nm, while PA-K had a weak peak. In addition, the circular dichroism (CD) spectra was measured, and the results indicated that PA-K2 was primarily beta-sheets.

Figure 10B:
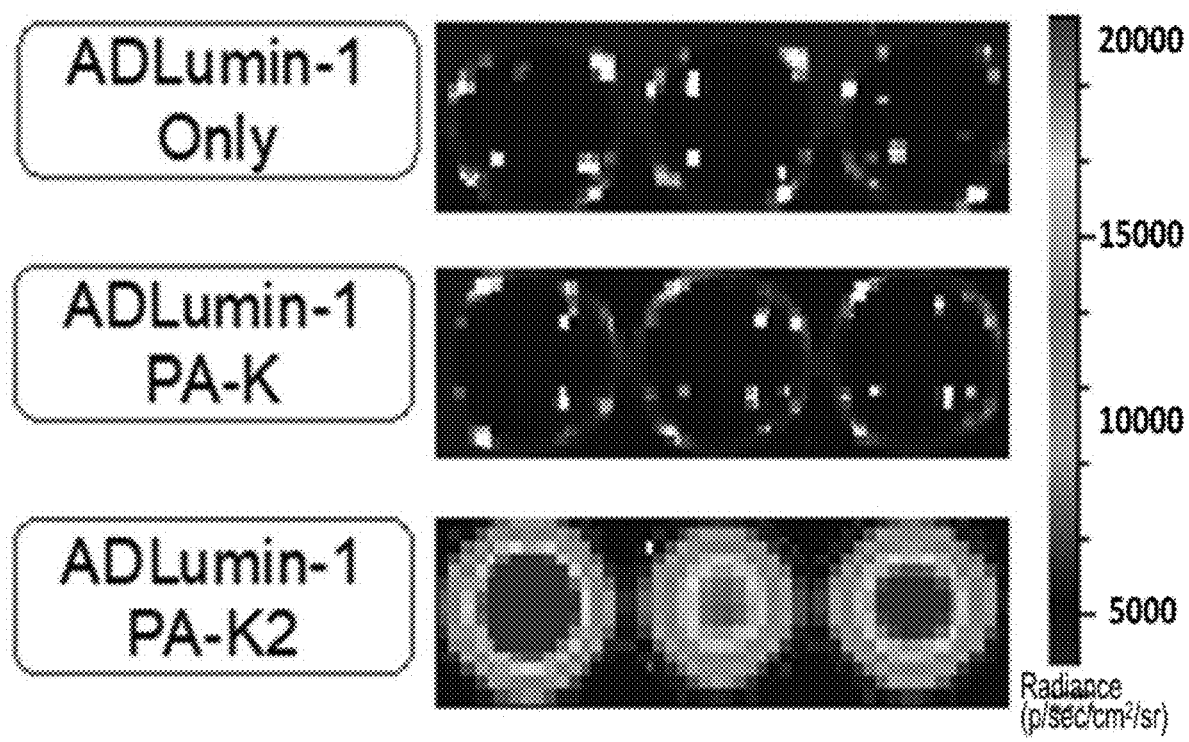
FIG. 10B contains representative images of PA-K and PA-K2 in the presence of ADLumin-1.
Figure 10C:
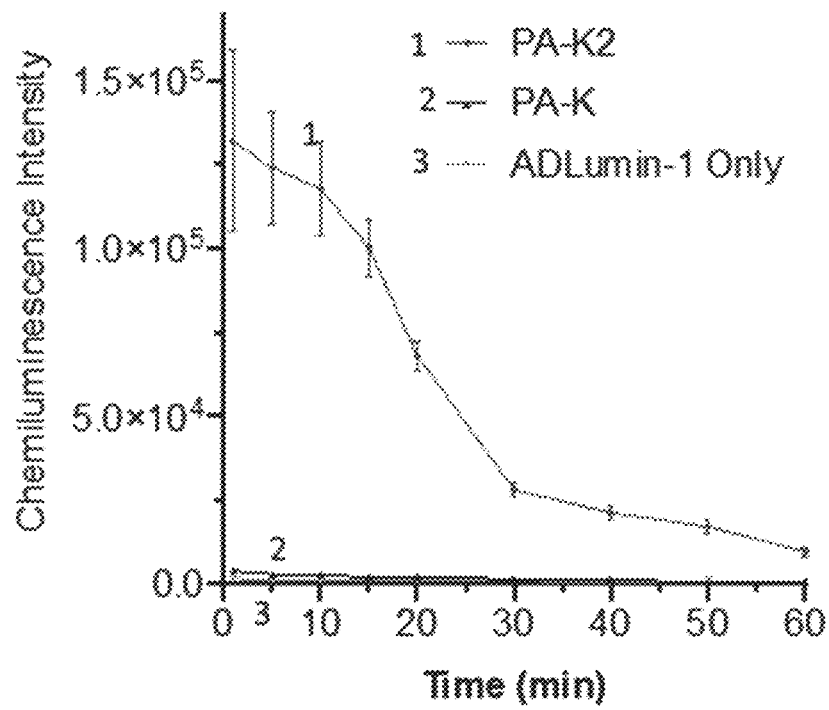
FIG. 10C contains time-course of chemiluminescence of ADLumin-1 with PA-K/K2.
Figure 10D:
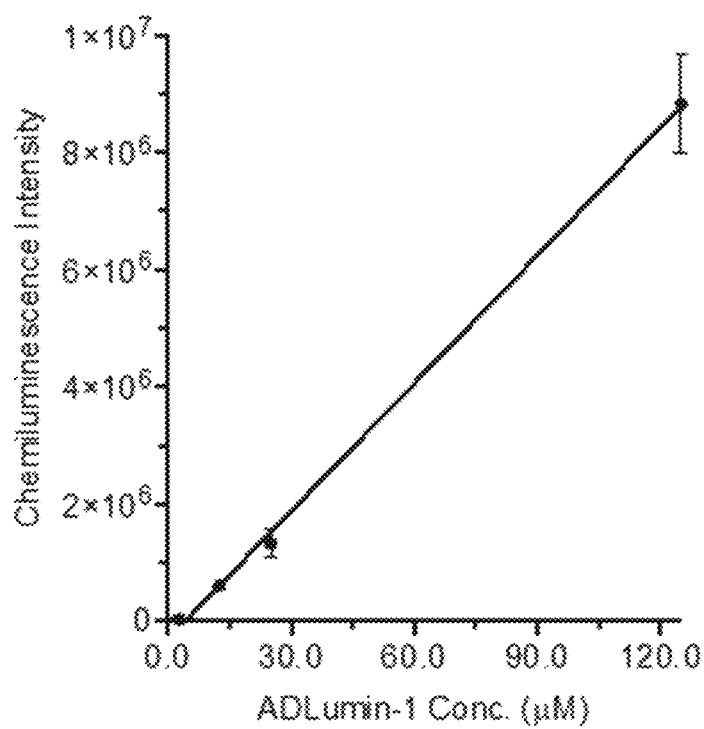
FIG. 10D contains ADLumin-1 concentration-dependence curve.
Figure 10E:
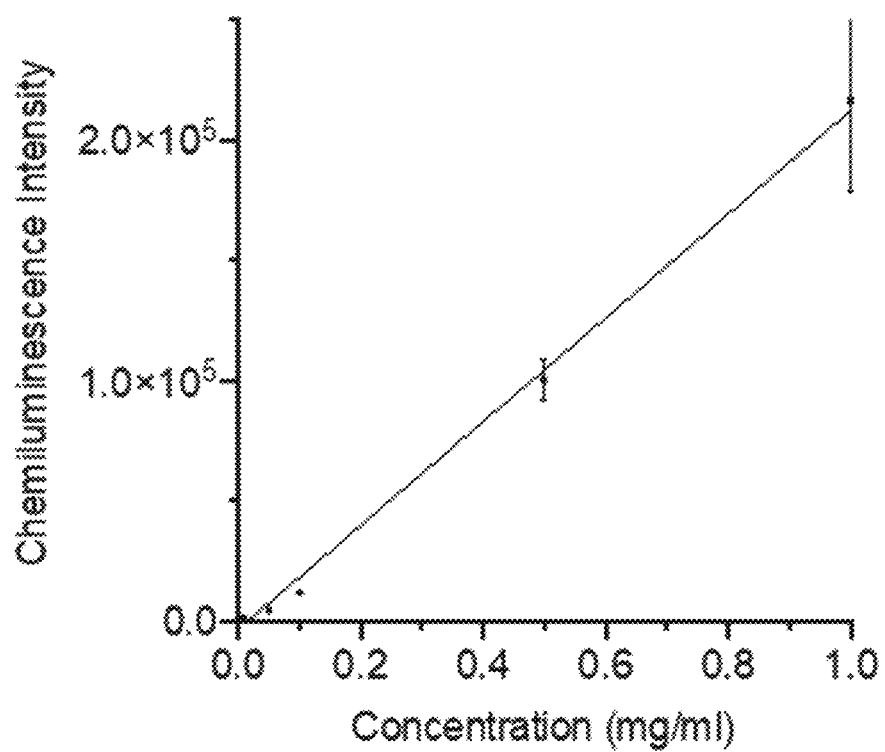
FIG. 10E shows PA-K2 concentration-dependency.

To detect the aggregates, ADLumin-1 (2.5 µM from a DMSO stock solution) was incubated with PA-K and PA-K2 (0.5 mg/ml) in PBS buffer. Compared with ADLumin-1 only in PBS, the chemiluminescence signal was dramatically increased in the PA-K2 group (101-fold), while there was a slight increase with PA-K group (2.49-fold) (FIG. 10b,c). Remarkably, the intensity ratio of PA-K2/PA-K was about 47.5-fold, showing that ADLumin-1 has excellent specificity towards beta-sheet aggregates. Similarly, the chemiluminescence intensity of PA-E2 group was 4.39-fold higher than PA-E group. Collectively, these results show that ADLumin-1 has excellent selectivity for beta-sheet aggregates over electrostatic aggregates. In addition, ADLumin-1 provided a linear response from 0.001-0.1 mg/ml with 0.5 mg/ml PA-K2 (FIG. 10d), and the intensities of both PA-K2 and PA-E2 were concentration dependent (from 0.001-1.0 mg/ml) (FIG. 10e).

Figure 10F:
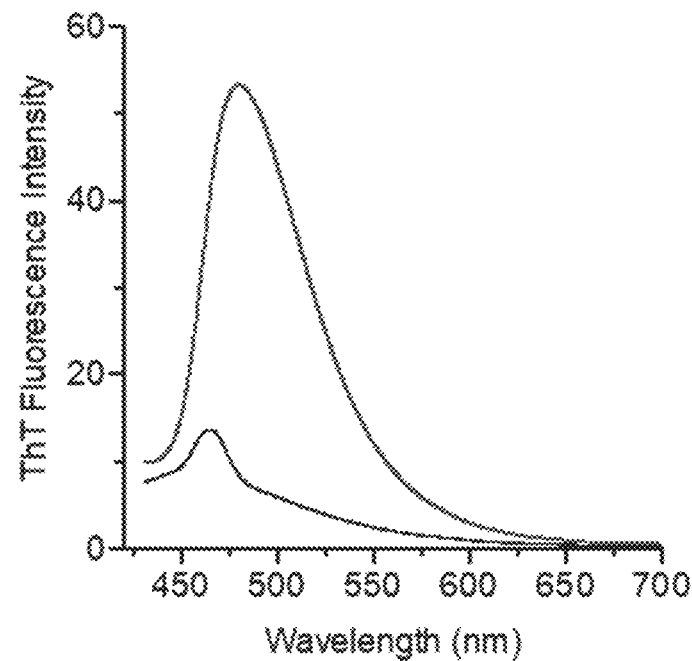
FIG. 10F contains fluorescence spectra of ThT for PA-K and PA-K2.
Figure 10G:
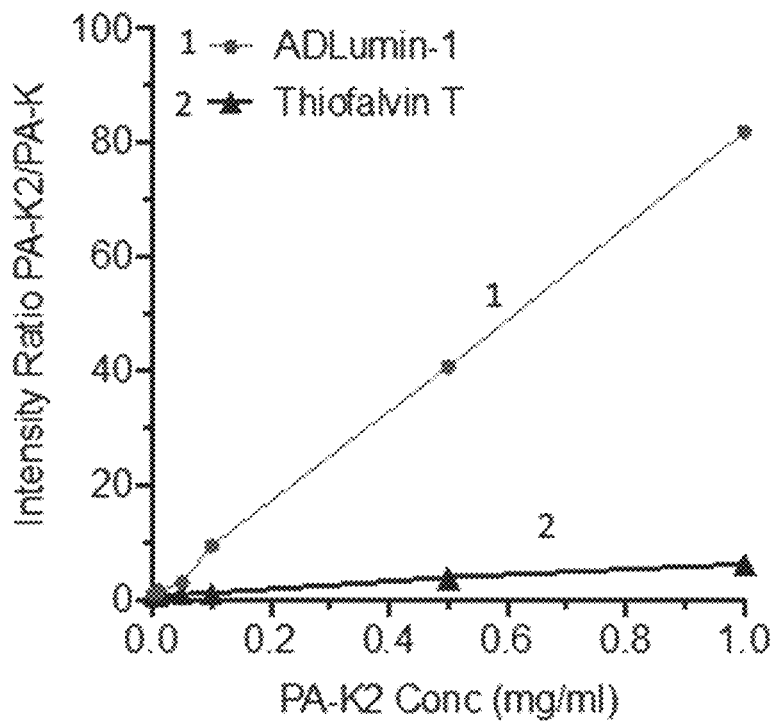
FIG. 10G contains sensitivity comparison of ADLumin-1 and ThT in the presence of PA-K2.

Thioflavin T (ThT) is the most used fluorescent probe to report the concentrations of beta-sheet aggregates. ThT (0.01 mg/ml) was able to differentiate PA-K and PA-K2, and the difference between them was about 4.01-fold (FIG. 10f), which is, however, 11.8-fold lower than the difference provided by ADLumin-1. In addition, ADLumin-1 could differentiate PA-K and PA-K2 at much lower peptide concentration (0.001 mg/ml), while ThT could only detect the difference at 0.1 mg/ml peptide concentration (FIG. 10g), indicating that the low limit of detection (LOD) of ADLumin-1 was 100-fold lower than that of ThT. Taken together, all of the data suggests that ADLumin-1 has much higher sensitivity for detecting beta-sheet aggregates. Other methods, such as FT-IR spectrum and CD spectrum, are also used to quantify the concentration of beta-sheets. However, these methods are not as sensitive as ThT.

Figure 11A:
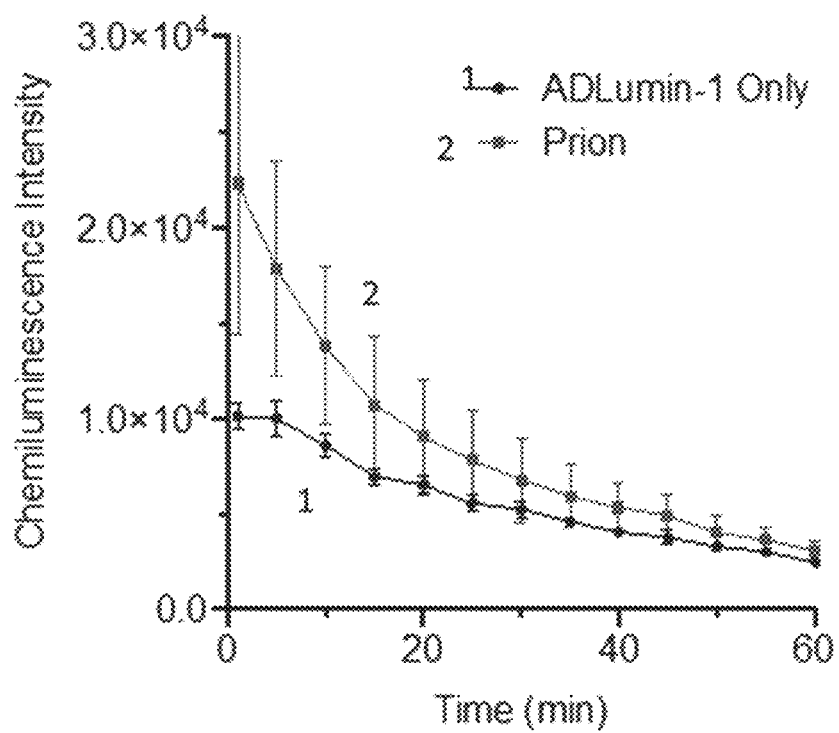
FIG. 11A contains the time courses of ADLumin-1 with misfoldon prion protein.
Figure 11B:
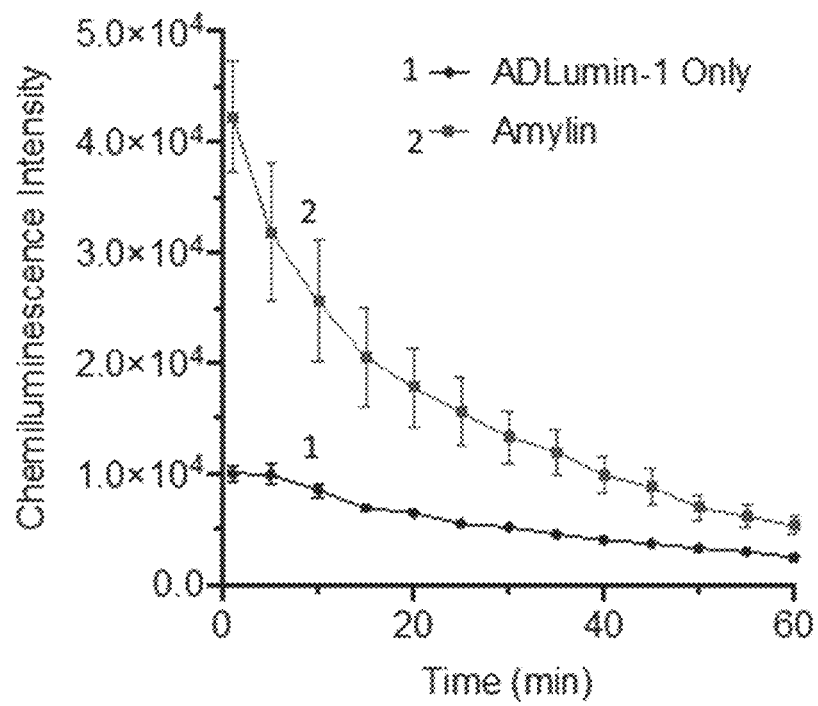
FIG. 11B contains the time courses of ADLumin-1 with misfoldon insulin protein.
Figure 11C:
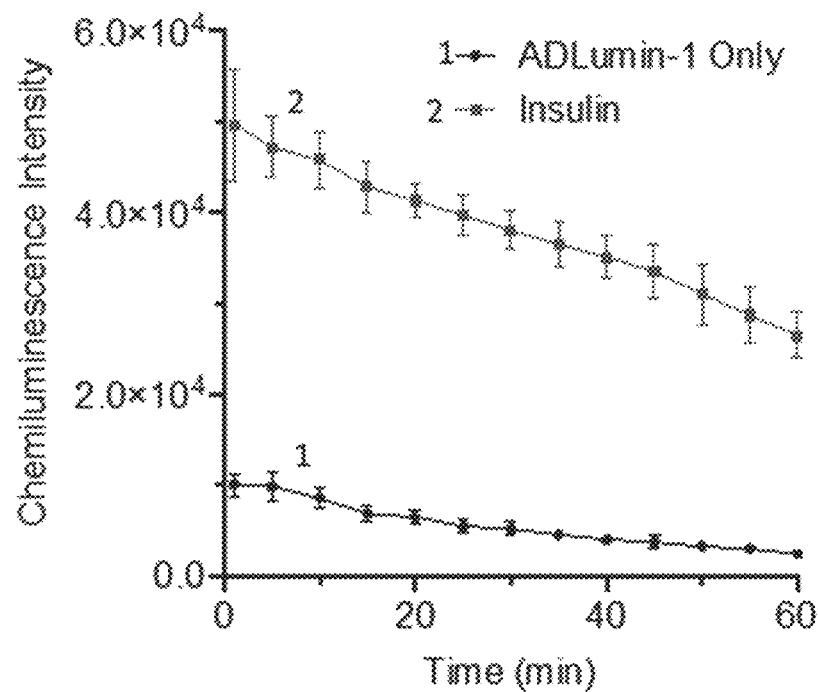
FIG. 11C contains the time courses of ADLumin-1 with misfoldon amylin protein.
Figure 11D:
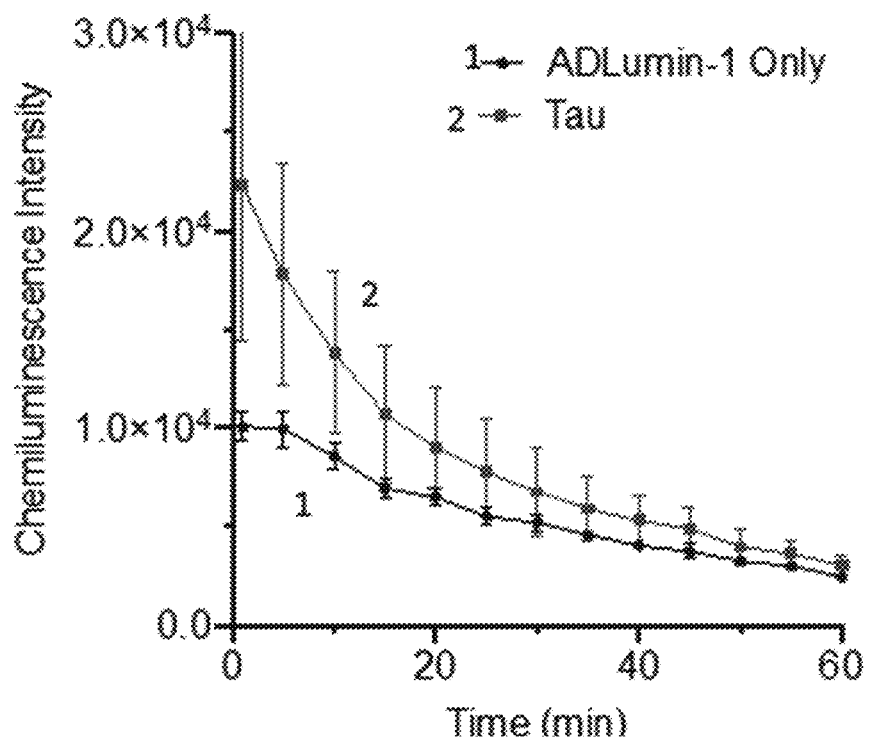
FIG. 11D contains the time courses of ADLumin-1 with misfoldon Tau protein.

ADLumin-1 is a generic chemiluminescence probe for various misfoldon aggregates: Numerous peptides and proteins are reportedly prone to aggregate via transferring from alpha-helix or random coils to misfolded beta-sheets. Such proteins include Aβ peptides, prion proteins, amylin peptides, insulin, alpha-synuclein, and tau proteins. Example 1 demonstrates that ADLumin-1 is robustly responsive to Aβ aggregates; ADLumin-1 has similar responses to other misfoldons. Molecular docking of ADLumin-1 with the Cryo-EM structures of prion, amylin, insulin, alpha-synuclein and tau proteins was performed. ADLumin-1 could insert into the hydrophobic tunnels that are formed by Ala, Val, Ile, Leu, Phe (FIG. 11a).

Aggregates of prion, amylin, insulin, synuclein and tau protein were prepared and their aggregation status were validated with ThT test. To investigate whether ADLumin-1 can sensitively detect the aggregates of these misfoldons, ADLumin-1 (2.5 μM) was mixed with the above aggregates (2.5 μM) in PBS buffer. Indeed, the chemiluminescence signal of ADLumin-1 could be considerably amplified in the presence of misfold aggregates (FIG. 11a-d). The largest differences for prion, insulin, amylin and Tau were 2.22-fold, 10.8-fold, 4.20-fold, and 7.02-fold respectively. This is consistent with ThT testing (FIG. 11a), which provided linear correlation. Interestingly, different misfoldons showed different decay profile. For example, insulin displayed very slower signal decay (T½>60 min), while prion had faster decay (T½=11.36 min). Taken together, results suggested that ADLumin-1 is a generic chemiluminescence probe for detecting various misfoldons.

Figure 12A:
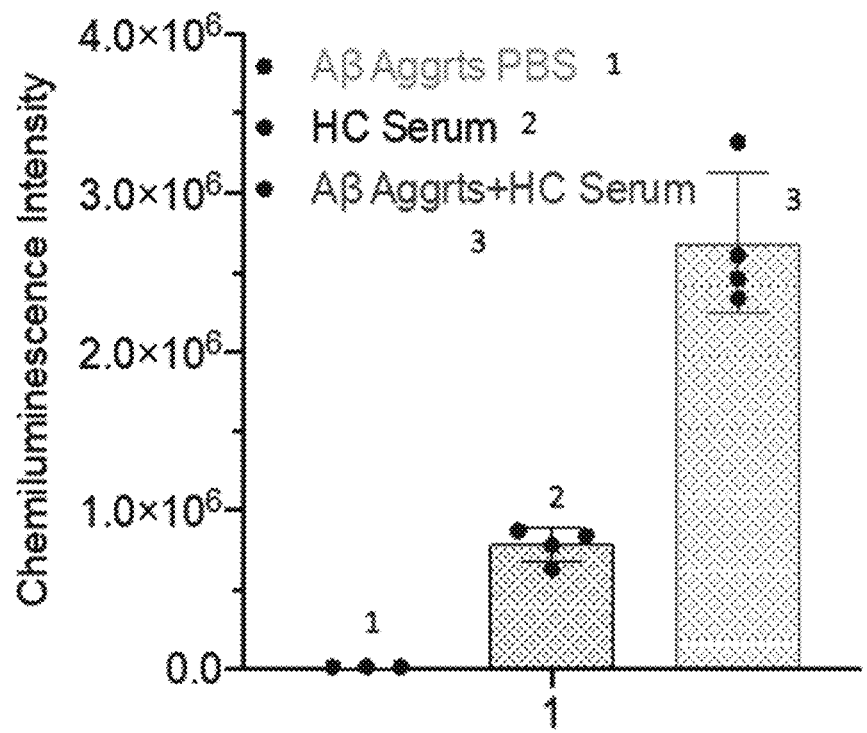
FIG. 12A shows discovery of prion-like propagation in serum of health control with ADLumin-1. Chemiluminescence intensity of ADLumin-1 with Aβ40 aggregates in PBS buffer, with healthy serum, and Aβ40 aggregates plus healthy serum.

Discovery of prion-like propagation in serum with misfoldons: All of aforementioned experiments were performed in PBS solutions, and ADLumin-1 was highly sensitive to detect the beta-sheets aggregates from model peptides and most common misfoldons. To investigate whether ADLumin-1 is able to detect beta-sheet aggregates in biological relevant environment, misfoldon aggregates with non-diluted human serum were incubated. First, ADLumin-1 provided much higher intensity for the Aβ40 aggregate (2.5 μM) group, and the ratio of the Aβ group and the control group was about 3.43-fold, -ADLumin-1 is able to detect beta-sheet aggregates in serum. However, more interestingly and surprisingly, the 3.43-fold difference was much higher than the summed intensity from serum (no Aβ aggregates) and Aβ aggregates (PBS buffer) (FIG. 12a,d), suggesting that Aβ aggregates induced formation of more beta-sheets that can be detected by ADLumin-1.

Figure 12B:
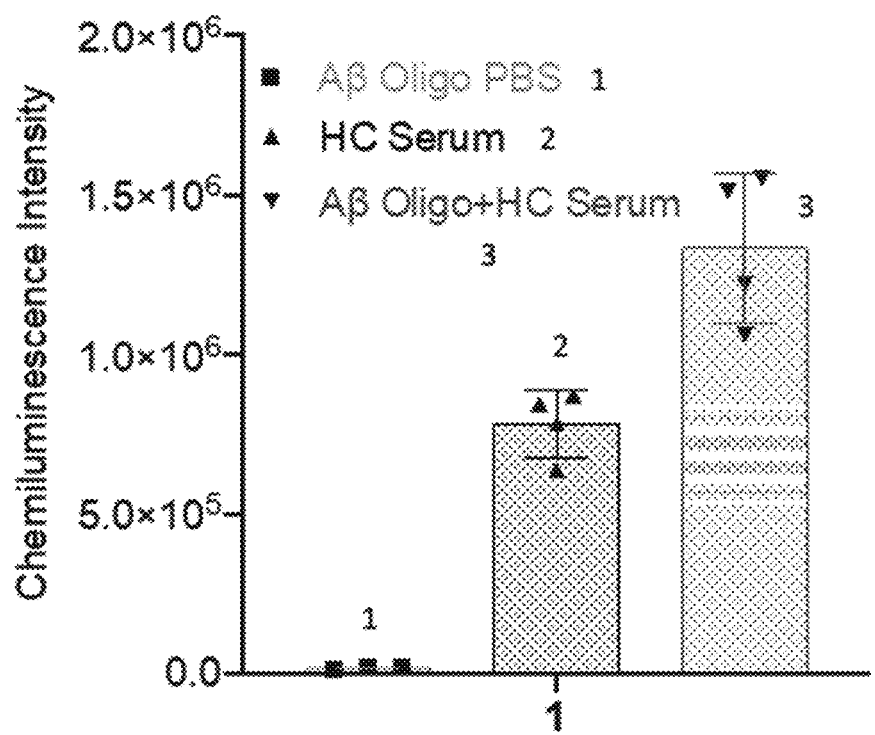
FIG. 12B shows chemiluminescence intensity of ADLumin-1 with Aβ40 oligomers or monomers in PBS buffer, with healthy serum, and Aβ40 oligomers (or monomers) plus healthy serum.
Figure 12C:
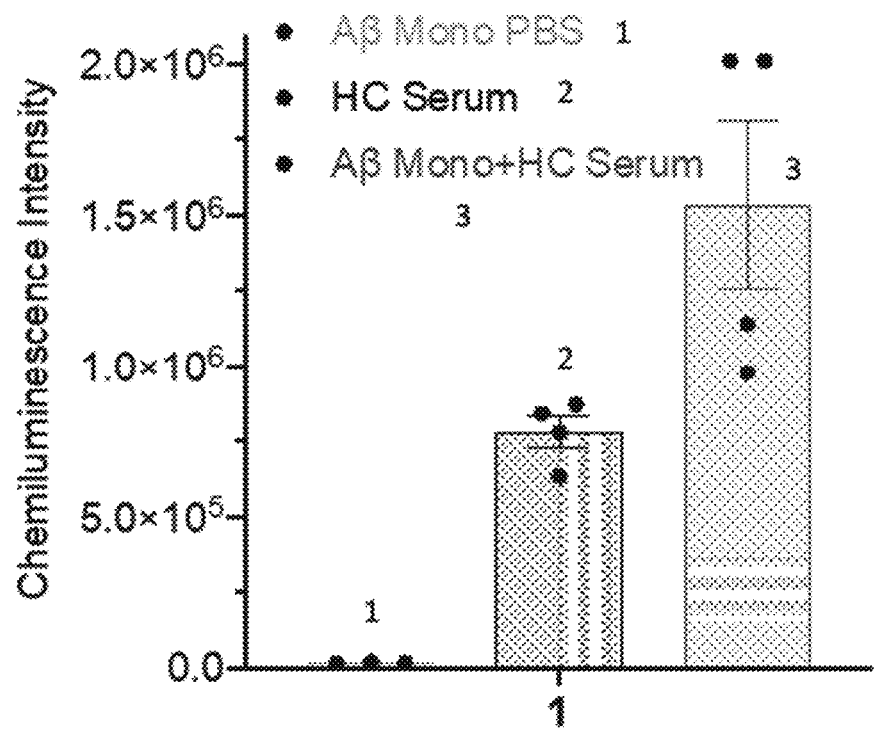
FIG. 12C shows chemiluminescence intensity of ADLumin-1 with Aβ40 monomers in PBS buffer, with healthy serum, and Aβ40 oligomers (or monomers) plus healthy serum.
Figure 12D:
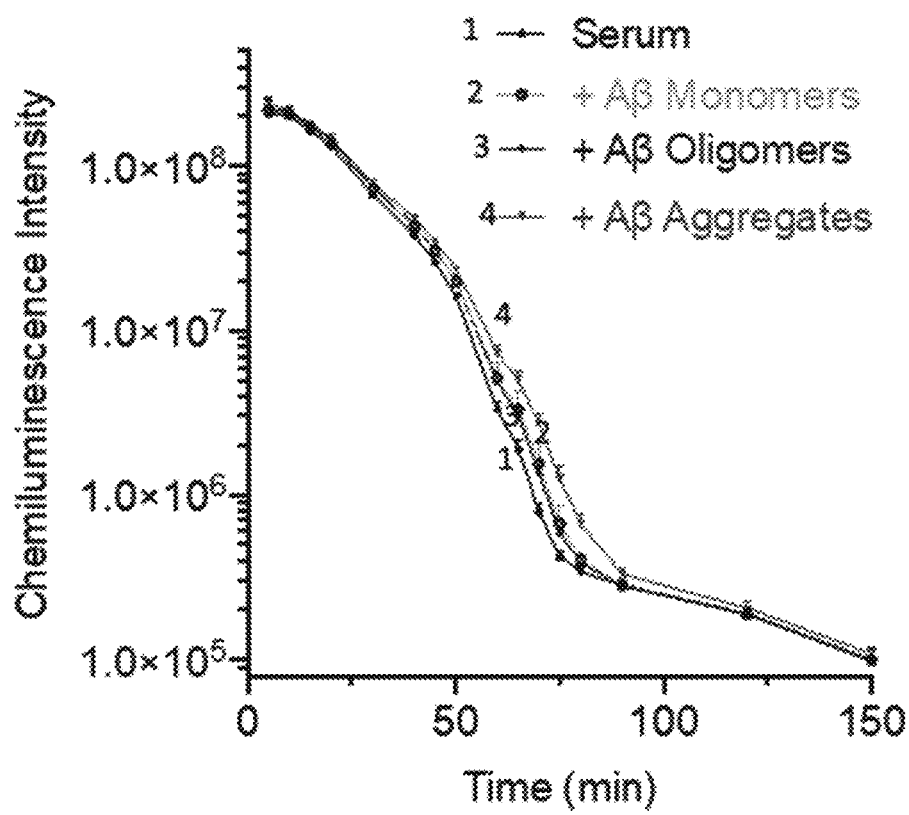
FIG. 12D shows time courses of ADLumin-1 intensities with Aβ40 species in healthy serum.

To further demonstrate that prion-like propagation can be observed in serum, Aβ monomers and oligomers were incubated with non-diluted human serum. Again, both Aβ monomers and oligomers could induce more beta-sheet formation, evident by the higher chemiluminescence intensities (1.96-fold and 1.71-fold respectively) from the Aβ groups than the control group (FIG. 12b,c,d).

Figure 12E:
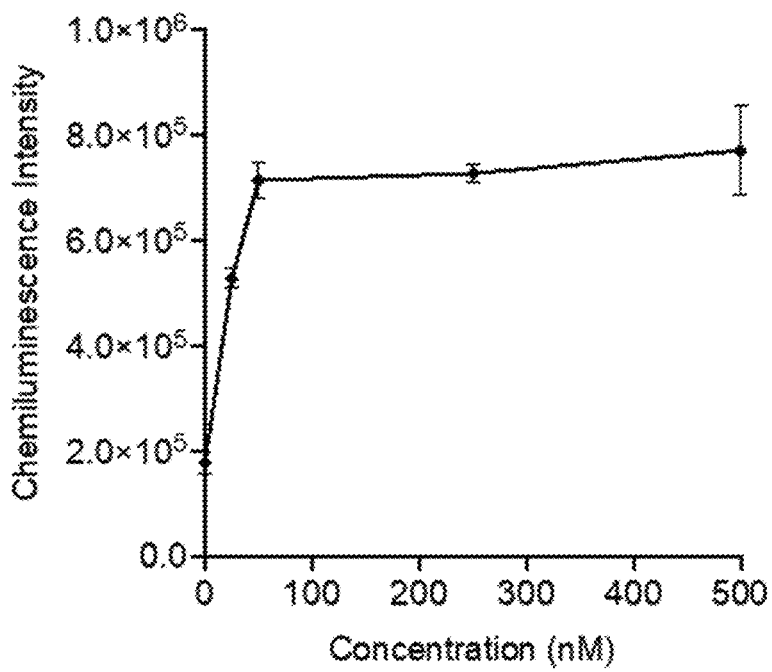
FIG. 12E shows chemiluminescence signals changes with different Aβ42 aggregates concentrations.
Figure 12F:
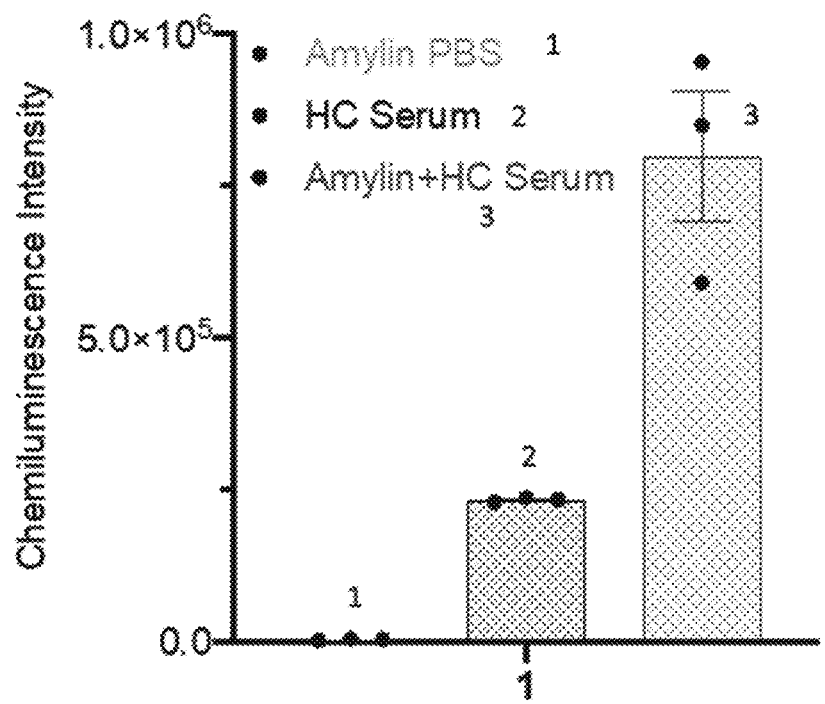
FIG. 12F shows chemiluminescence intensity of ADLumin-1 with Aβ40 amylin in PBS buffer, with healthy serum, and amylin plus healthy serum.

Aβ42 have similar capacity to induce prion-like propagation. To investigate whether Aβ induced prion-like propagation is concentration dependent, Aβ42 aggregates from 0.25 pM to 25 μM concentrations were incubated with healthy serum. Surprisingly, sub-picomolar Aβ42 could induce the prion-like propagation (FIG. 12e). The chemiluminescence signal reaches a plateau around 50 nM of Aβ42, and high concentration Aβ causes apparent signal decrease Similar experiments with alpha-synuclein, amylin, prion, tau and insulin showed that all of the misfoldons could provide higher chemiluminescence intensities than the control group (FIG. 12f). The difference from the synuclein group was 4.30-fold, while other misfoldons provided smaller differences.

For some misfoldons, ThT could provide slightly higher signal. However, the detected difference was much smaller than that by ADLumin-1.

Figure 13A:
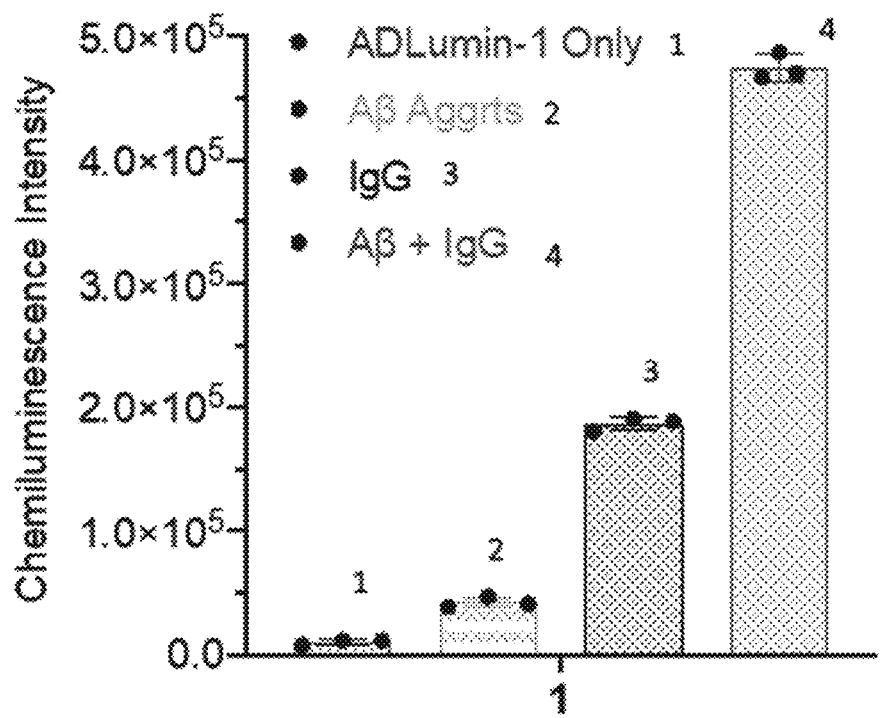
FIG. 13A shows that immunoglobulin G (IgG) could be converted into beta-sheet conformation by Aβ aggregates. Chemiluminescence intensity of ADLumin-1 with Aβ40 aggregates in PBS buffer, with IgG, and Aβ40 aggregates plus IgG after incubation for 2 hours.
Figure 13B:
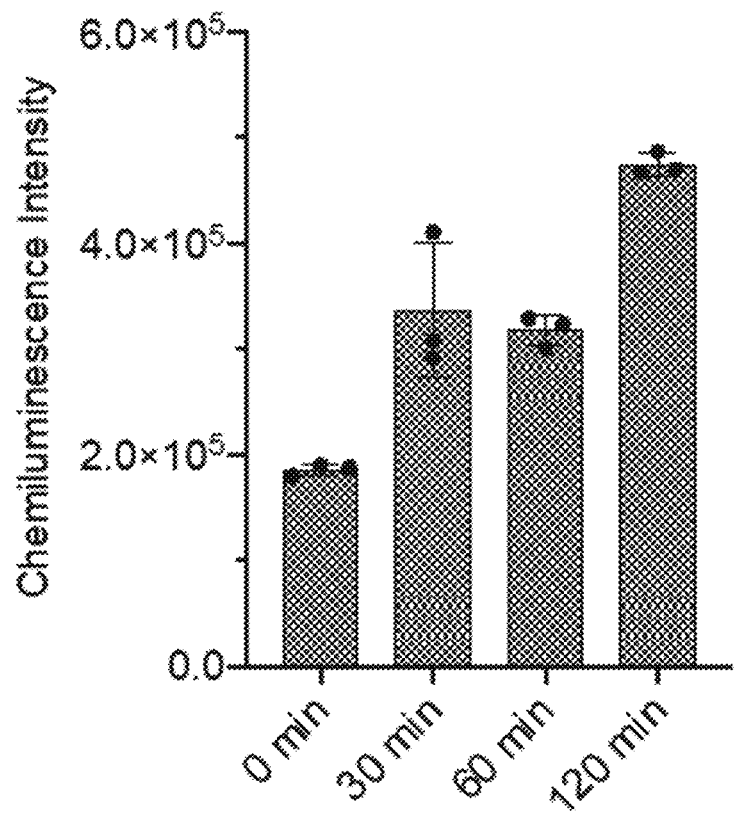
FIG. 13B shows chemiluminescence intensity of ADLumin-1 with Aβ40 aggregates plus IgG after different incubation time.
Figure 13C:
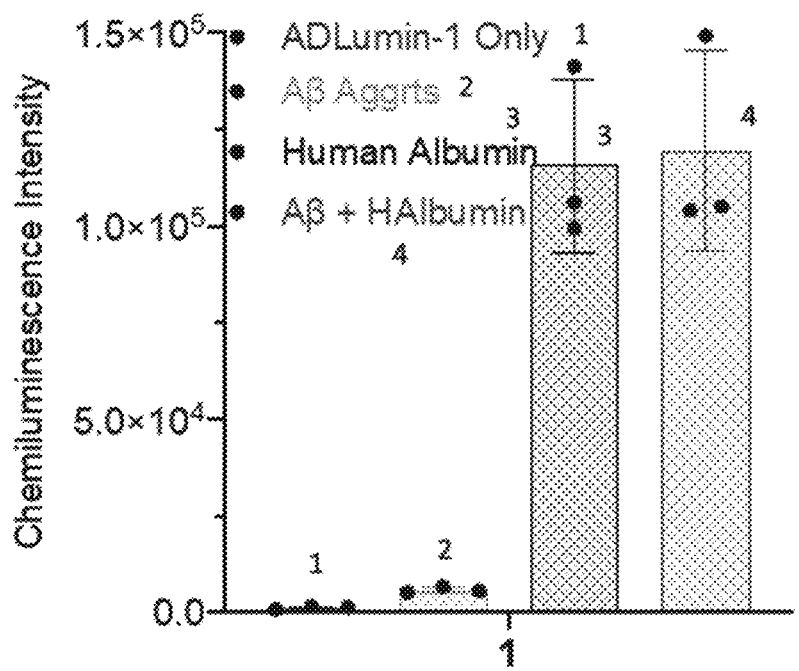
FIG. 13C shows chemiluminescence intensity of ADLumin-1 in PBS buffer, with Aβ40 aggregates in PBS buffer, human albumin, and Aβ40 aggregates plus human albumin.

Preliminary identification of converters of the prion-like propagation in serum: serum is a complicated biofluid that is consisted of many proteins/peptides and other non-protein molecules. It has been reported that many serum proteins have the potential to transform to beta-sheets and form aggregates. Immunoglobulin G (IgG), Transthyretin, Apolipoprotein A-I (APO)) are reportedly misfolding-prone. IgG is the second most abundant protein in serum, and reportedly IgG could be misfolded to form aggregates. Transthyretin is one of the most studied protein and its aggregation behavior was well-documented. To investigate whether Aβ aggregates can induce prion-like propagation with these selected proteins, Aβ aggregates were incubated with the proteins, and serum albumin was used as the control, which is not able to transform to beta-sheet aggregates. Indeed, the chemiluminescence intensity from the IgG/Aβ group was 1.81-, 1.71-, and 2.55-fold higher than the IgG group after incubation for 30-, 60- and 120-minutes (FIG. 13a,b). Similarly, compared to the control groups, higher intensity was observed from the Aβ/APO and Aβ/transthyretin groups. By contrast, Aβ aggregates could not induce misfolding of human serum albumin (FIG. 13c), evident by no significant differences between Aβ/albumin and albumin only group.

In sum, the prion-like propagation in serum was due to the misfolding some proteins in serum. It is worth mentioning that the prion-like propagation of IgG by Aβ may have some important implications, since IgG plays a crucial role for immune defense in the circulation system, and people with IgG deficiency are more likely to have infections. The misfolded IgG may not functionalize properly and may be considered as "deficiency."

Figure 14A:
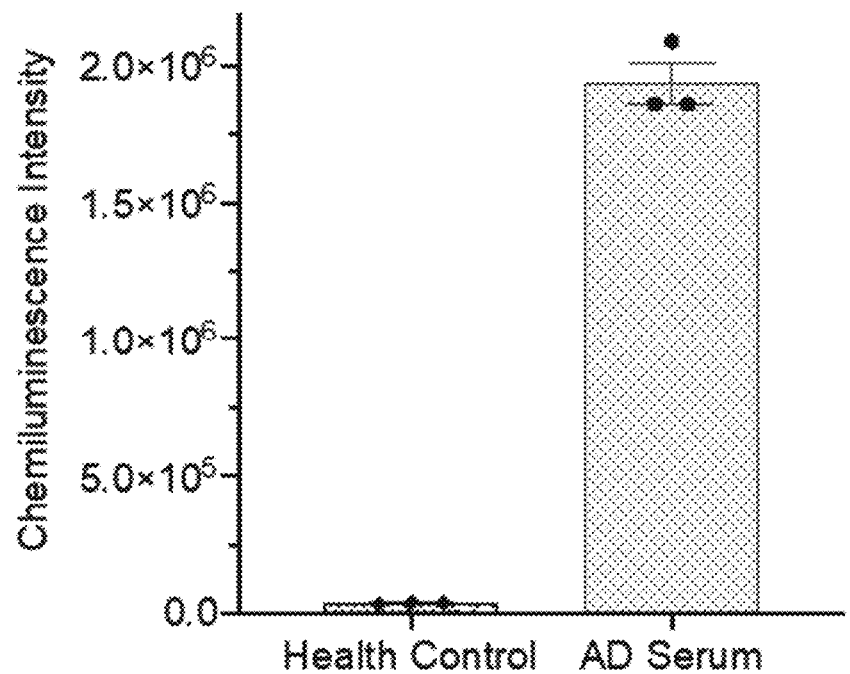
FIG. 14A shows that ADLumin-1 detected large signal differences between HC serum and disease sera. Chemiluminescence intensity of ADLumin-1 with serum from health control (HC) and AD patient.
Figure 14B:
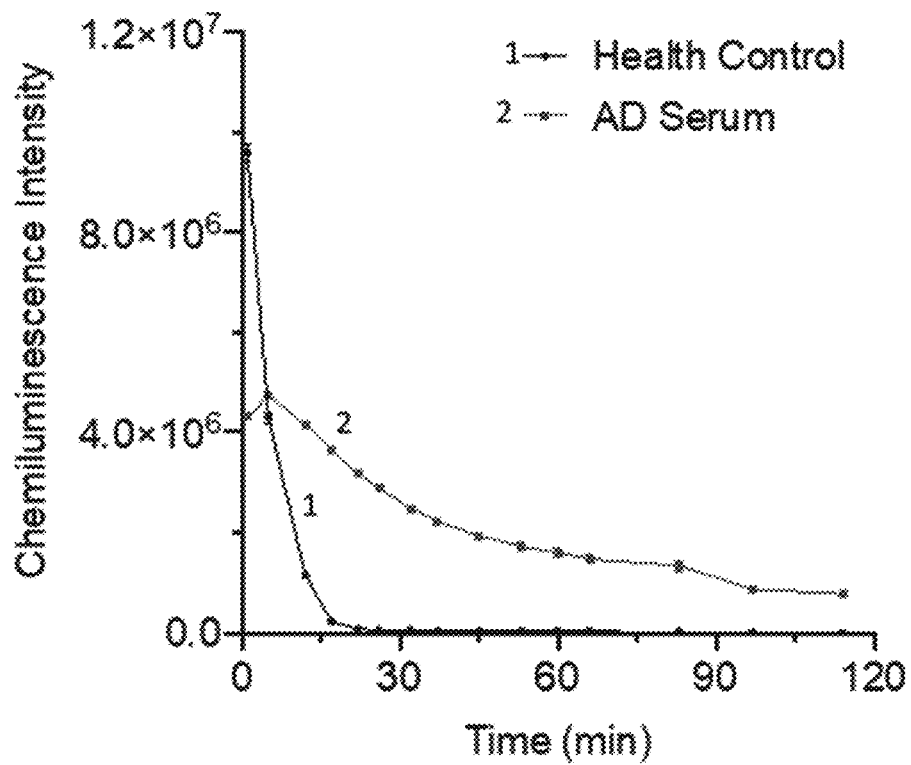
FIG. 14B shows time-course of intensity changes with AD and HC sera.

Chemiluminescence detection beta-sheet misfoldons in disease serum by ADLumin-1: serum of AD patient contains abundant beta-sheet misfoldons that can be detected by ADLumin-1. ADLumin-1 (2.5 μM) was added to 100 μl non-diluted serum of AD patients, and serum from health control (HC) was used as the control. Indeed, surprisingly 52.2-fold higher chemiluminescence signal was observed from the AD group, compared to the HC control group (FIG. 14a,b). Interestingly, the signal decay of AD serum was much slower than that of HC serum (FIG. 14b). This is remarkable, since this difference is phenomenally large and is very useful for blood quality evaluation.

Figure 14C:
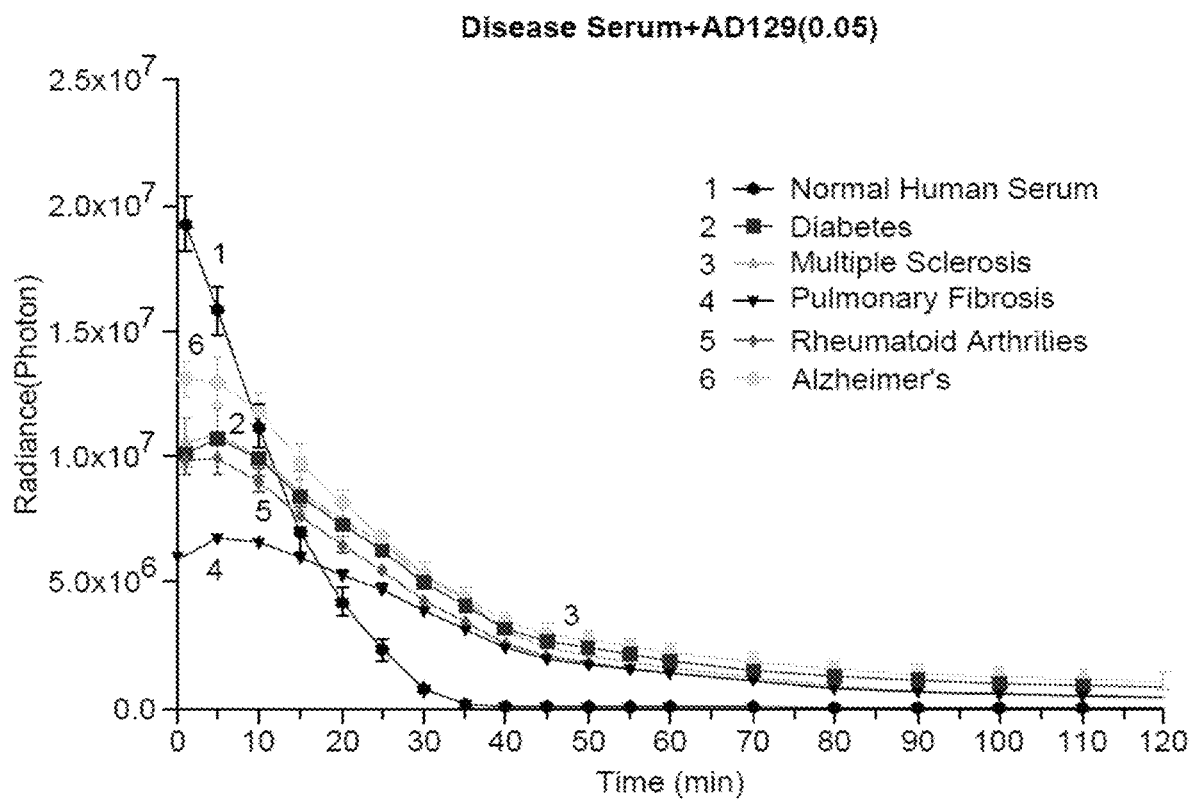
FIG. 14C shows time-course of intensity changes with sera from HC, diabetes, multiple-sclerosis, pulmonary fibrosis and rheumatoid arthritis.

Misfolded beta-sheets are associated with various diseases, including brain disorders (e.g., neurodegenerative disorders) and periphery diseases, particularly chronic diseases. The patient sera of chronic diseases also contains abundant beta-sheet misfoldons. In this regard, patient sera of multiple sclerosis, diabetes, rheumatoid arthritis and pulmonary fibrosis patients was used in this example. Indeed, the sera of all ill patients showed much higher chemiluminescence signals, compared to the HC control. 44.7-fold, 34.9-fold, 16.6-fold and 29.3-fold higher signals were observed for the sera of diabetes, multiple sclerosis, pulmonary fibrosis and rheumatoid arthritis respectively (FIG. 14c). Again, these large margins showed that ADLumin-1 is a highly sensitive chemiluminescence probe for misfoldons.

Experimental results indicated that the sera of chronic diseases include plenty of misfoldons that can be detected by the probes of this disclosure, such as ADLumin-1. Further, these misfoldons induce prion-like propagation.

Figure 15A:
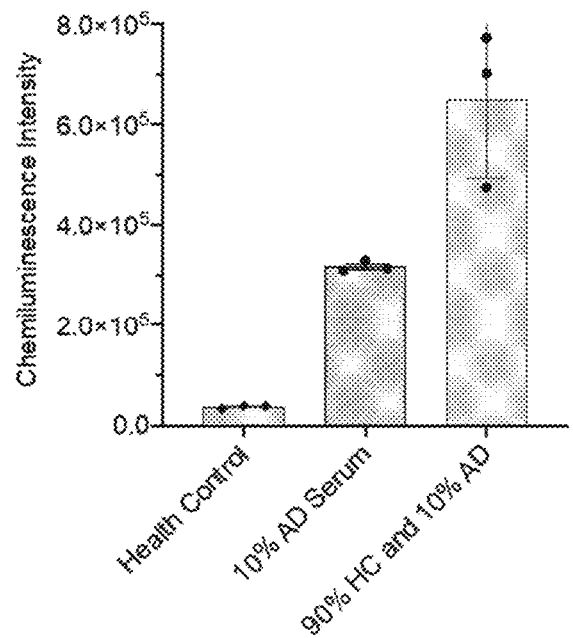
FIG. 15A shows that disease sera, such as AD serum, could induce prion-like propagation in HC serum. Chemiluminescence intensity of ADLumin-1 with 10% AD serum+90% HC serum, and 100% HC serum control.
Figure 15B:
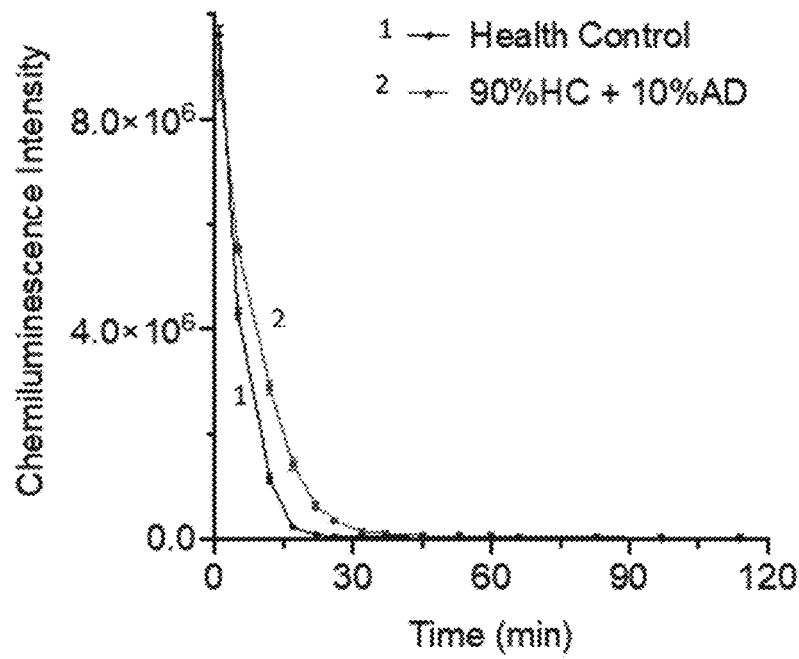
FIG. 15B shows time-course of intensity changes with 10% AD serum and 100% HC serum.
Figure 15C:
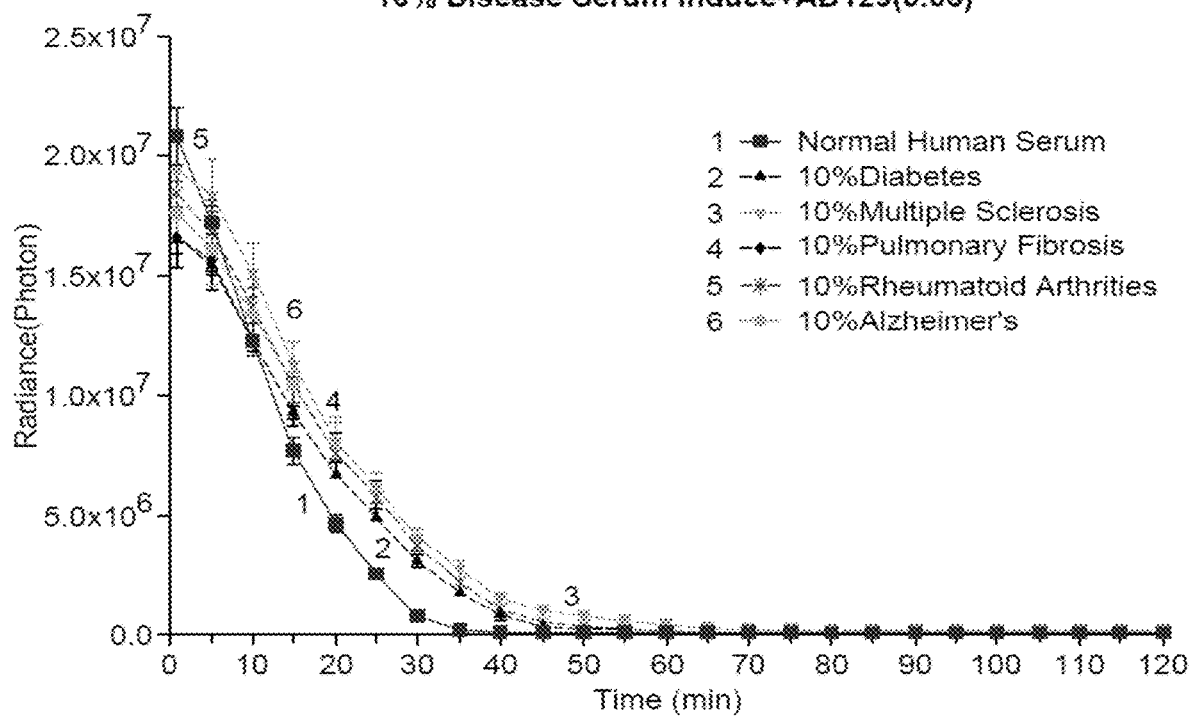
FIG. 15C shows time-course of intensity changes with sera from 100% HC serum, 90% HC serum+10% serum of diabetes, multiple-sclerosis, pulmonary fibrosis and rheumatoid arthritis respectively.

Disease serum induce prion-like propagation in healthy serum: Misfoldons in disease serum can induce prion-like propagation in healthy serum. 90% HC serum and 10% AD serum were co-incubated, and 100% HC serum was used as the control. Considerably higher chemiluminescence signals from the mixed group were observed than that from the 100% HC serum (FIG. 15a,b). The differences were 7.75-fold (FIG. 15a), and the total signal from the mixed group was 1.66-fold higher than the sum of 90% HC serum and 10% AD serum. Clearly, the decay was slower in 10% AD serum group, compared to the HC control group. Similarly, compared to HC serum, 3.34-fold, 7.24-fold, 4.60-fold, 6.64-fold higher signals were observed from the mixture of HC serum and serum of diabetes, multiple sclerosis, pulmonary fibrosis, and rheumatoid arthritis respectively (FIG. 15c). All of the higher signals from 10% disease serum groups indicated that disease sera could induce prion-like propagation that could be detected by ADLumin-1. FT-IR and Raman spectra were used to verify the increase of beta-sheets in the mixture group.

Aβ antibody partially prevent the prion-like propagation in healthy serum: Immunotherapy with anti-Aβ antibodies has been studied (e.g., solanezumab can slow down the cognitive impairment in a small sub-set of AD patients, anti-Aβ antibody Aducanumab has been reviewed for FDA approval, Aducanumab had excellent safety and significant efficacy in reducing cognitive and functional impairment).

Figure 16A:
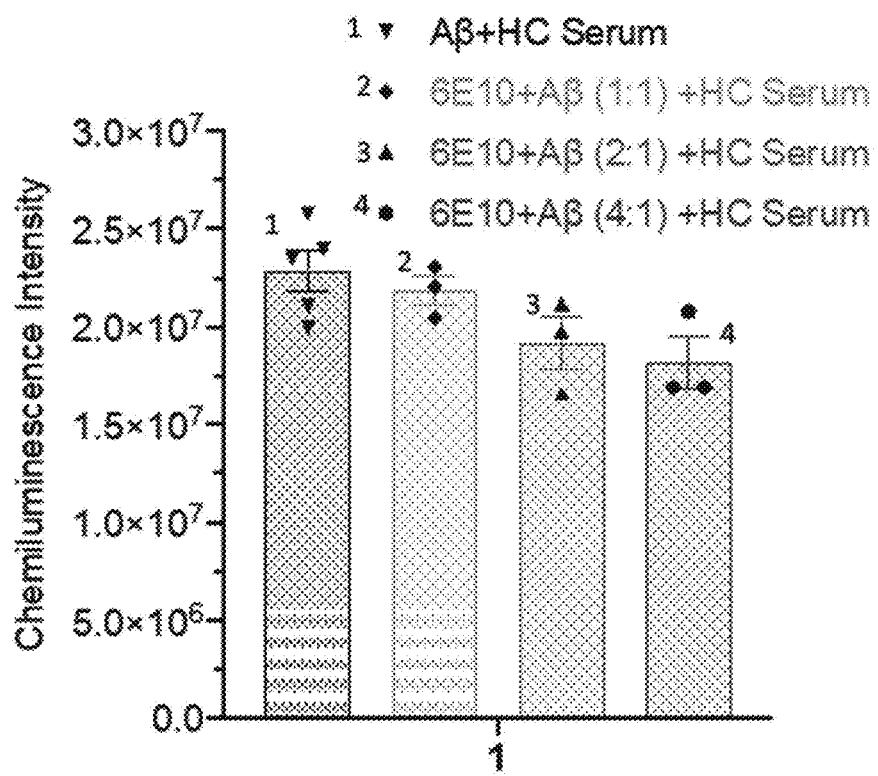
FIG. 16A shows that Aβ antibodies 6E10 and 4G8 could partially alleviate the prion-like-propagation in HC serum. Chemiluminescence signal of ADLumin-1 with Aβ40+HC serum, and Aβ40+HC serum+6E10 (different Aβ/6E10 ratios).
Figure 16B:
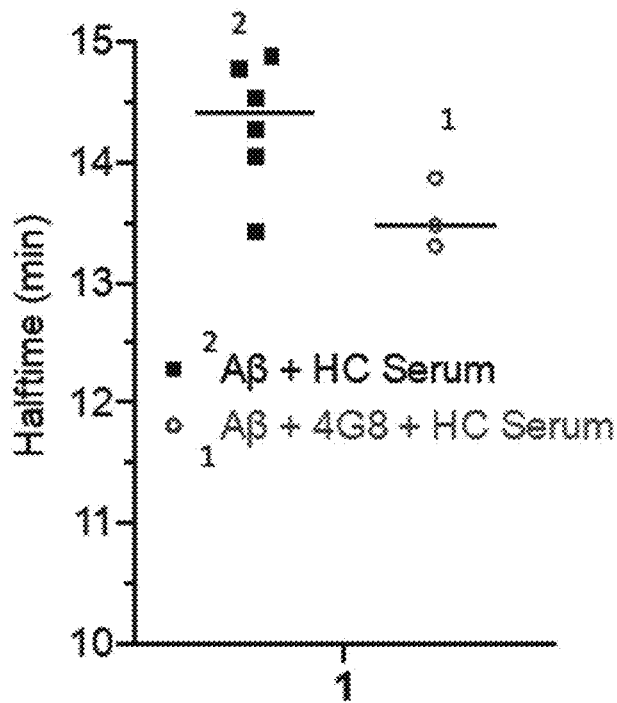
FIG. 16B shows signal decay halftimes ($T_{1/2}$) for Aβ40+HC serum, and Aβ40+HC serum+6E10 (4:1) groups.
Figure 16C:
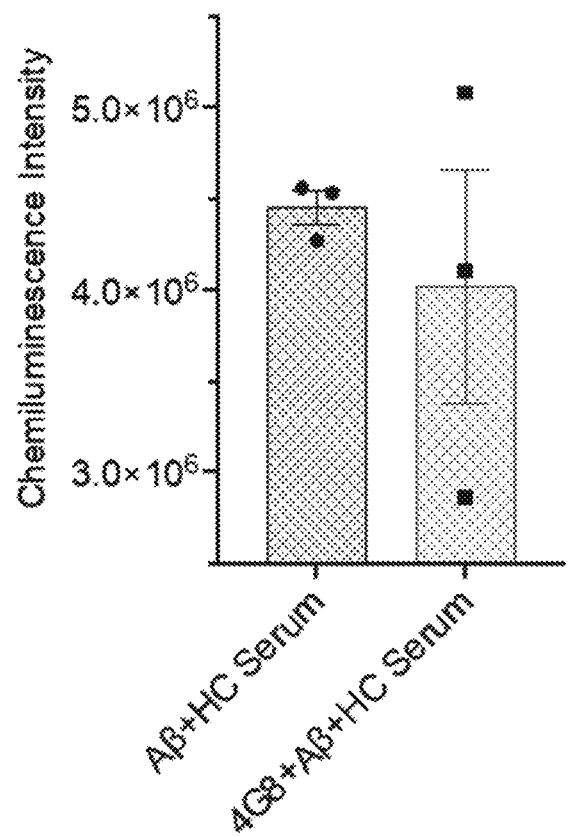
FIG. 16C shows chemiluminescence signal of ADLumin-1 with Aβ40+HC serum, and Aβ40+HC serum+4G8.
Figure 16D:
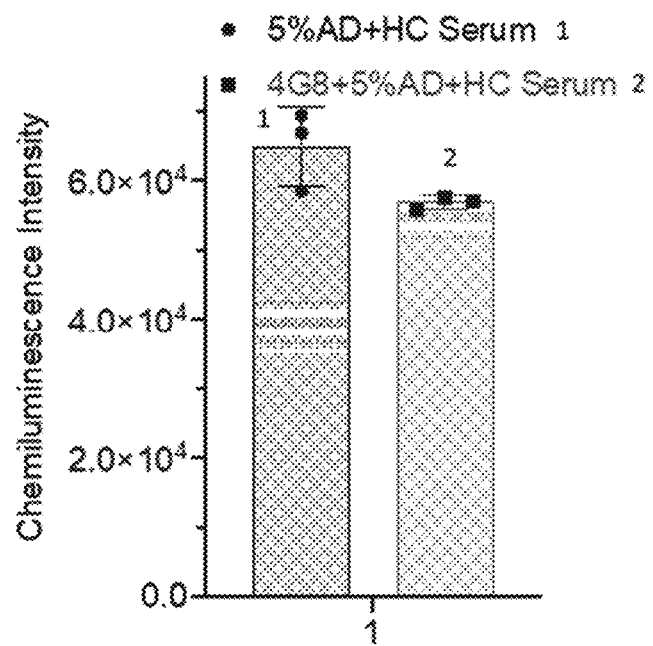
FIG. 16D shows chemiluminescence signal of ADLumin-1 with 5% AD serum+HC serum, and 5% AD serum+HC serum+4G8.

The results support a conclusion that circulating therapeutic antibody has some actions in the serum, i.e., the beneficial effects of therapeutic antibody is partially due to the prevention of prion-like behavior in serum. To investigate whether Aβ antibody can alleviate the prion-like propagation, Aβ aggregates were incubated with 6E10 antibody for 30 minutes, and then the mixture was added to the healthy serum. After the signal subtraction from 6E10 antibody normalization, the signal intensity from the 6E10/Aβ/serum group was lower than that from the Aβ/serum group (FIG. 16a). Moreover, the halftime ($T_{1/2}$) was shorter in the 6E10 group, compared to the control group (FIG. 16b). These results indicate that 6E10 antibody partially blocks Aβ aggregates induced prion-like behavior in healthy serum. Similarly, 6E10 had showed similar effect on Aβ monomers and oligomers. c had similar effect for Aβ species, and 4G8 was able to reduce the prion-like propagation of Aβ40 aggregates and 5% AD serum (FIG. 16c,d).

Discussion of Example 2

ADLumin-1 is a versatile chemiluminescence probe for detecting beta-sheet aggregates of various misfoldons. Compared with the gold standard ThT fluorescence detection, ADLumin-1 chemiluminescence has much higher sensitivity, particularly for low concentrations and in biofluids such as serum. Remarkably and surprisingly, a misfoldon and disease serum could induce prion-like propagation in healthy serum. In addition, ADLumin-1 could provide considerable large signal difference between healthy serum and disease serum, showing that the chemiluminescence signal intensity can be used to evaluate the health state of serum.

Aggregation of misfolded beta-sheet is a general process for various chronic diseases. However, general methods for detecting such aggregation are limited, particularly in biofluids and tissues. Model peptides were used to validate that ADLumin-1 has high specificity for beta-sheet aggregates and is also highly sensitive to these aggregates. Hence, probes of this disclosure, such as ADLumin-1, are an important tool to detect aggregation of beta-sheets.

The detecting capacity of the probes of this disclosure originated from their binding to hydrophobic pockets that are formed by beta-sheets, particularly by Ala, Val, Ile, Leu, and Phe, which are the driving amino acids to form misfolded beta-sheets.

It has been documented that antibody treatment could lead to around 1000-fold increase of Aβ in plasma of AD patients, and such high concentration of Aβ persists in the blood circulation for months. Moreover, IgG, the most abundant immune responsive protein in serum, could be converted into misfolded conformation by Aβ species. Thus, the 1000-fold increase of Aβ during antibody treatment may cause misfolding of IgG, and consequentially lead to dysfunction of IgG in blood. In addition, Aβ antibody could partially alleviate the prion-like propagation in serum. These results are echoing with recent Biogen's aducanumab clinical outcome, in which the cohort with high aducanumab doses showed better clinical benefits. A high dose of the antibody more effectively blocks the Aβ induced prion-like propagation in serum, and thus affords the better clinical outcomes.

IgG can bind with Aβ and inhibit the aggregation of Aβ species. The results show that Aβ can bind to IgG. However, Aβ can induce IgG converting to form misfolded beta-sheets, which is likely the deficiency conformation of function. It is well-known that IgG deficiency could lead to high risk of infection. Interestingly, it has been well documented that AD patients have much higher probability to have infections, such as pneumonia.

The concentration of Aβ40 and Aβ42 in serum of AD patients is lower than health controls. However, ADLumin-1 provided higher chemiluminescence signal for AD serum. The discrepancy shows that 1) Aβs in serum are not the major contributors of the misfoldon; and 2) the conformation (folding form) of Aβ in normal and AD sera are different, because of the results provided in this Example showed that sub-picomolar Aβ42 aggregates can induce prion-like propagation.

ADLumin-1 provided considerably large differences between disease sera and healthy serum. Hence, ADLumin-1 can be used to evaluate health status of serum, and this could be widely applied to routine blood tests. The large differences also indicated that the accumulation of misfoldons is a general feature for chronic diseases and conformational diseases. Accumulation of beta-sheets or misfoldons are likely significantly contributing to the pathology, because chronic diseases are always systemic problems instead of single organ failure. In addition, due to the accumulation of the misfoldons, the blood of chronic patients has poor capacity to clear the malfunctional proteins and other pathogens.

Considering that the disease serum, such as Alzheimer's disease serum or diabetes serum, can induce prion-like-propagation (conformational abnormality) in serum/plasma, it is critical to assess whether the donated blood is safe to be transfused. Probes of this disclosure can be used to evaluate the quality of blood, serum and plasma.

Numbered Paragraphs

In some embodiments, the invention of the present disclosure can be described by reference to the following numbered paragraphs:

1. A compound of Formula (I):

A-L-B     (I), or a pharmaceutically acceptable salt thereof, wherein:
A is a moiety comprising a chemiluminescent scaffold;
L is absent or a $C_{2-12}$ alkenylene, which is optionally substituted with 1, 2, or 3 substituents independently selected from $C_{6-12}$ aryl, 5-10-membered heteroaryl, oxo, halo, cyanide, $C_{1-3}$ haloalkyl, OH, HO—Se—, $C_{1-3}$ alkoxy, $C_{1-3}$ haloalkoxy, amino, $C_{1-6}$ alkylamino, di($C_{1-6}$ alkyl)amino, thio, $C_{1-6}$ alkylthio, and $C_{1-6}$ alkylseleno; or any two oxo or OH substituents of $C_{2-12}$ alkylene together with the carbon atoms to which they are attached form a dioxaborinane ring, which is optionally substituted with 1 or 2 halogen atoms; and
B is a binding moiety capable of non-covalently binding to a misfolding-prone or an aggregating-prone protein.

2. The compound of paragraph 1, wherein L is a $C_{2-12}$ alkenylene, which is optionally substituted with 1, 2, or 3 substituents independently selected from halo, $C_{1-3}$ haloalkyl, OH, $C_{1-3}$ alkoxy, $C_{1-3}$ haloalkoxy, amino, $C_{1-6}$ alkylamino, di($C_{1-6}$ alkyl)amino, thio, and $C_{1-6}$ alkylthio.

3. The compound of paragraph 1, wherein L is a $C_{4-6}$ alkenylene.

4. The compound of any one of paragraphs 1-2, wherein L comprises at least two double bonds.

5. The compound of any one of paragraphs 1-4, wherein L comprises at least two conjugated double bonds comprising delocalized electrons.

6a. The compound of paragraph 1, wherein L is a moiety selected from:

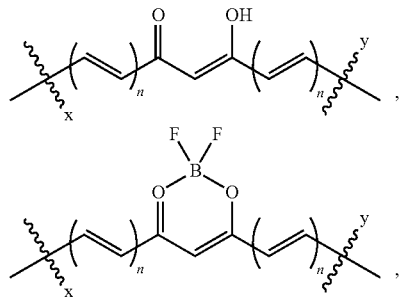

wherein x indicates a point of attachment to A, y indicates a point of attachment to B, and each n is independently an integer from 1 to 6.

6b. The compound of paragraph 1, wherein L is a moiety of formula:

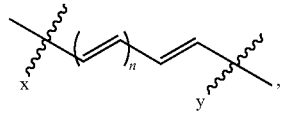

wherein x indicates a point of attachment to A, y indicates a point of attachment to B, and n is an integer from 1 to 6.

7. The compound of paragraph 6a or 6b, wherein n is 1 or 2.

8. The compound of paragraph 6a or 6b, wherein n is 1.

9. The compound of paragraph 6a or 6b, wherein n is 2.

10. The compound of any one of paragraphs 1-9, wherein the chemiluminescent scaffold comprises a moiety selected from dioxetane, luminol, imidazo[1,2-a]pyrazin-3(7H)-one, oxalate, lucigenin, acridinium, and 9,10-dimethyl-anthracene.

11a. The compound of any one of paragraphs 1-9, wherein the chemiluminescent scaffold comprises a imidazo[1,2-a]pyrazin-3(7H)-one of formula:

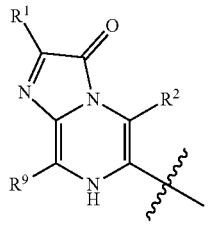

$R^1$ is $C_{1-3}$ alkyl, and $R^2$ and $R^9$ are each independently selected from H, $C_{1-3}$ alkyl, and $L^1$-$R^{10}$;

each $L^1$ is absent or $C_{2-12}$ alkenylene, which is optionally substituted with 1, 2, or 3 substituents independently selected from $C_{6-12}$ aryl, 5-10-membered heteroaryl, oxo, halo, cyanide, $C_{1-3}$ haloalkyl, OH, HO—Se—, $C_{1-3}$ alkoxy, $C_{1-3}$ haloalkoxy, amino, $C_{1-6}$ alkylamino, di($C_{1-6}$ alkyl)amino, thio, $C_{1-6}$ alkylthio, and $C_{1-6}$ alkylseleno; or any two oxo or OH substituents of $C_{2-12}$ alkylene together with the carbon atoms to which they are attached form a dioxaborinane ring, which is optionally substituted with 1 or 2 halogen atoms;

each $R^{10}$ is selected from moiety B, $C_{6-12}$ aryl, and 5-10-membered heteroaryl, wherein said $C_{6-12}$ aryl and 5-10-membered heteroaryl are each optionally substituted with 1, 2, or 3 substituents independently selected from halo, cyanide, $C_{1-3}$ alkyl, $C_{1-3}$ cyanoalkyl, $C_{1-3}$ haloalkyl, OH, $C_{1-3}$ alkoxy, $C_{2-4}$ alkenyl, $C_{2-4}$ cyanoalkenyl, thio, $C_{1-3}$ alkylthio, $C_{1-3}$ haloalkoxy, amino, $C_{1-6}$ alkylamino, and di($C_{1-6}$ alkyl)amino.

11b. The compound of any one of paragraphs 1-9, wherein the chemiluminescent scaffold comprises a imidazo[1,2-a]pyrazin-3(7H)-one of formula:

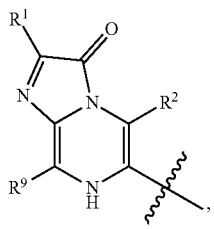

wherein $R^1$ is $C_{1-3}$ alkyl, and $R^2$ and $R^9$ are each independently selected from H and $C_{1-3}$ alkyl.

12. The compound of paragraph 11a or 11b, wherein the chemiluminescent scaffold comprises a imidazo[1,2-a]pyrazin-3(7H)-one of formula:

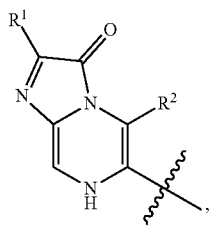

wherein $R^1$ is $C_{1-3}$ alkyl and $R^2$ is selected from H and $C_{1-3}$ alkyl.

13. The compound of paragraph 12, wherein the chemiluminescent scaffold comprises a moiety of formula:

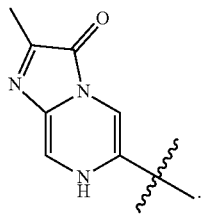 [SMILES: *c1cn2c(=O)c(C)nc-2c[nH]1]

14. The compound of any one of paragraphs 1-13, wherein the chemiluminescent scaffold undergoes auto-oxidation in response to $O_2$.
15. The compound of any one of paragraphs 1-14, wherein the binding moiety B comprises a hydrophobic and planar fragment capable of non-covalently binding to a hydrophobic segment of the misfolding-prone or the aggregation-prone protein.
16. The compound of paragraph 15, wherein the binding moiety B comprises a residue of a fluorescent dye.
17a. The compound of any one of paragraph 1-16, wherein the binding moiety B comprises a moiety of formula:

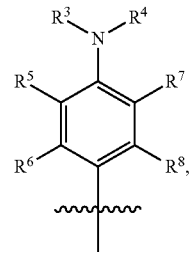

wherein
$R^3$ and $R^4$ are each individually a $C_{1-3}$ alkyl; and
$R^5$, $R^6$, $R^7$, and $R^8$ are each independently selected from H and $C_{1-3}$ alkyl, or
$R^3$ and $R^5$ together with the carbon atom to which $R^5$ is attached and N atom to which $R^3$ is attached form a 5-7 membered heterocycloalkyl ring, or
$R^4$ and $R^7$ together with the carbon atom to which $R^7$ is attached and N atom to which $R^4$ is attached form a 5-7 membered heterocycloalkyl ring.

17b. The compound of any one of paragraphs 1-16, wherein the binding moiety B comprises a moiety of formula:

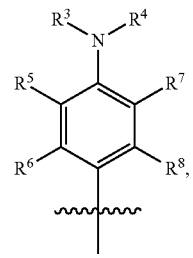

wherein
$R^3$ and $R^4$ are each independently a $C_{1-3}$ alkyl; and
$R^5$, $R^6$, $R^7$, and $R^8$ are each independently selected from H and $C_{1-3}$ alkyl.

18. The compound of paragraph 17a or 17b, wherein $R^5$, $R^6$, $R^7$, and $R^8$ are each H.
19. The compound of paragraph 17a or 17b, wherein the binding moiety B has formula:

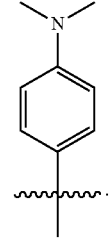

20. The compound of any one of paragraphs 1-19, wherein the non-covalent binding of moiety B to the misfolding-prone or the aggregating-prone protein comprises hydrogen bonds, electrostatic effects, π-effects, hydrophobic interactions, Van der Waals forces, or any combination thereof
21. The compound of any one of paragraphs 1-20, wherein the binding of the moiety B to the misfolding-prone or the aggregating-prone protein leads to amplification of intensity of chemiluminescence of the moiety A.
22. The compound of any one of paragraphs 1-21, wherein the misfolding-prone or the aggregating-prone protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).
23. The compound of any one of paragraphs 1-22, wherein the misfolding-prone or the aggregating-prone protein is selected from amyloid beta (Aβ), tau, alpha-synuclein, TDP-43, amylin, fibrinogen, prion, fused in sarcoma (FUS) protein, SOD and transthyretin.
24. The compound of paragraph 23, wherein the amyloid beta (Aβ) protein is selected from $A\beta_{40}$ and $A\beta_{42}$.
25. The compound of any one of paragraphs 1-24, wherein the misfolding-prone or the aggregating-prone protein is in the misfolded or the aggregated state.
26. The compound of paragraph 25, wherein the protein is amyloid beta (Aβ) protein in a form of aggregates or plaques.
27. The compound of any one of paragraphs 1-26, wherein the misfolding-prone or the aggregating-prone protein comprises hydrophobic beta-sheets capable of non-covalently binding to the moiety B.
28a The compound of paragraph 1, wherein the compound of Formula (I) is selected from any one of the following compounds:

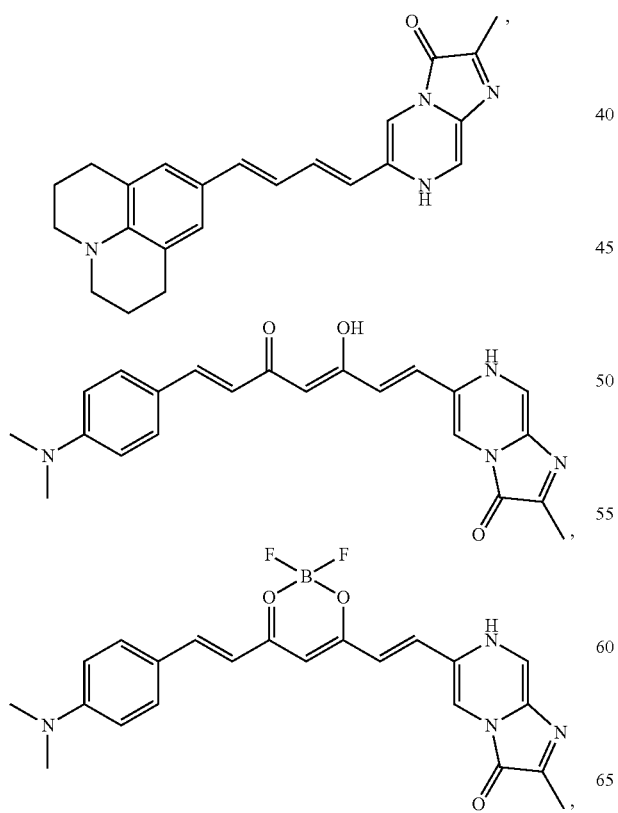

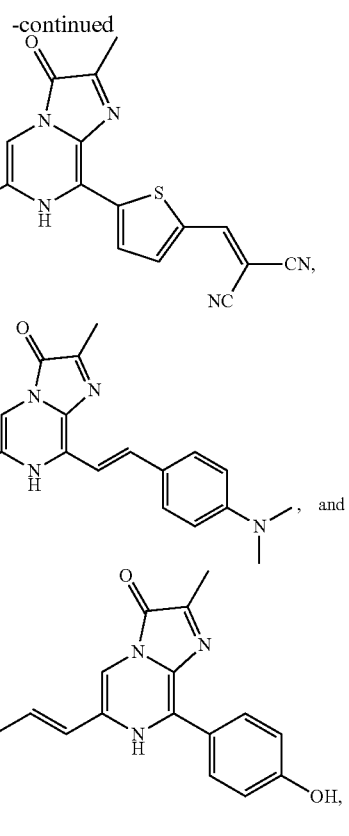

or a pharmaceutically acceptable salt thereof.

28b. The compound of paragraph 1, wherein the compound of Formula (I) is selected from any one of the following compounds:

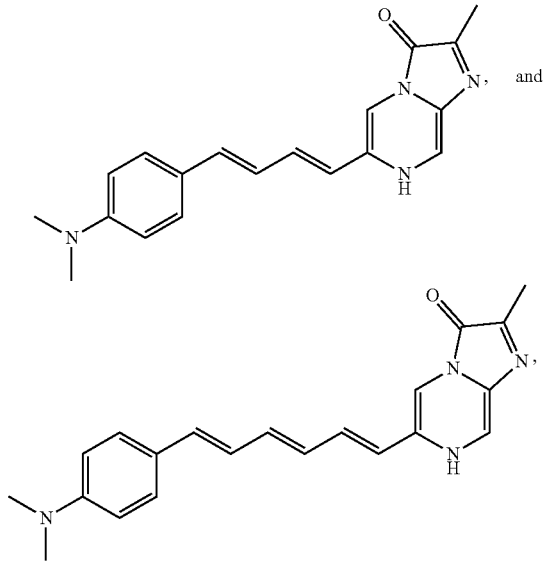

or a pharmaceutically acceptable salt thereof.

29. A composition comprising a compound of any one of paragraphs 1-28b, or a pharmaceutically acceptable salt thereof, and a pharmaceutically acceptable carrier.
30. The composition of paragraph 29, wherein the composition is a pharmaceutical composition.

31. The composition of paragraph 29 or 30, wherein the composition is an aqueous solution for an injection or an infusion to a subject in need thereof
32. The composition of any one of paragraphs 29-31, further comprising a fluorescent probe.
33. The composition of paragraph 32, wherein the fluorescent probe is capable of non-covalently binding to the misfolding-prone or the aggregating-prone protein.
34. The composition of paragraph 33, wherein the non-covalent binding of the fluorescent probe to the misfolding-prone or the aggregating-prone protein comprises hydrogen bonding, electrostatic effects, π-effects, hydrophobic interactions, Van der Waals forces, or any combination thereof
35. The composition of any one of paragraphs 33-34, wherein the binding of the fluorescent probe to the misfolding-prone or the aggregating-prone protein leads to amplification of intensity of fluorescent signal of the fluorescent probe.
36. The composition of any one of paragraphs 32-35, wherein there is an overlap of luminescent emission spectrum of moiety A of the compound of Formula (I) and the excitation spectrum of the fluorescent probe.
37. The composition of any one of paragraphs 32-36, wherein the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.
38. The composition of any one of paragraphs 32-37, wherein the fluorescent probe is selected from a compound of any one of the following Formulae

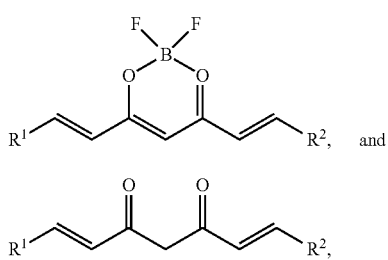

or a pharmaceutically acceptable salt thereof, wherein:
each $R^1$ and $R^2$ is independently selected from $C_{6-12}$ aryl and 5-10-membered heteroaryl, each of which is optionally substituted with 1, 2, or 3 substituents independently selected from amino, $C_{1-3}$ alkylamino, di($C_{1-3}$ alkyl)amino, $C_{1-3}$ alkyl, $C_{1-3}$ alkoxy, halo, CN, $NO_2$, $C_{6-12}$ aryl, and 5-10-membered heteroaryl.
39. The composition of any one of paragraphs 32-38, wherein the fluorescent probe is selected from CRANAD-2, CRANAD-3, CRANAD-17, CRANAD-28, CRANAD-30, CRANAD-44, CRANAD-58, CRANAD-88, and CRANAD-102.
40. The composition of any one of paragraphs 32-38, wherein the fluorescent probe is selected from CRANAD-2, CRANAD-3, CRANAD-30, CRANAD-58, CRANAD-88, and CRANAD-102.
41. The composition of any one of paragraphs 32-40, wherein the fluorescent probe is a CRANAD-3 compound of formula:

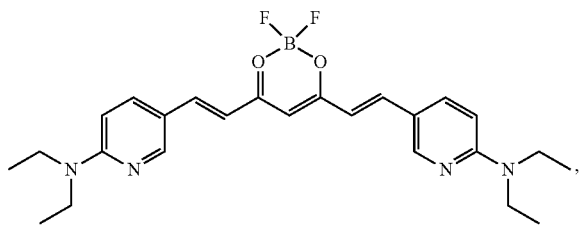

or a pharmaceutically acceptable salt thereof.
42. The composition of any one of paragraphs 32-41, wherein the misfolding-prone or the aggregating-prone protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).
43. The composition of any one of paragraphs 32-41, wherein the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.
44. The composition of paragraph 43, wherein the amyloid beta (Aβ) protein is selected from $Aβ_{40}$ and $Aβ_{42}$.
45. The composition of any one of paragraphs 29-44, wherein the misfolding-prone or the aggregating-prone protein is in the misfolded or the aggregated state.
46. The composition of paragraph 45, wherein the protein is amyloid beta (Aβ) protein in a form of aggregates or plaques.
47. The composition of any one of paragraphs 29-46, wherein the misfolding-prone or the aggregating-prone protein comprises hydrophobic beta-sheets capable of non-covalently binding the moiety B of the compound of Formula (I) and/or the fluorescent probe as recited in paragraphs 37-41.
48. A method of detecting a misfolding-prone or an aggregating-prone protein in a sample, the method comprising contacting the sample with an effective amount of a compound of any one of paragraphs 1-28, or a pharmaceutically acceptable salt thereof, or a composition of any one of paragraphs 29-47.
49. The method of paragraph 48, wherein the method is carried out in vitro or ex vivo.
50. The method of paragraph 48 or 49, wherein the detecting is qualitative.
51. The method of paragraph 48 or 49, wherein the detecting is quantitative.
52. The method of any one of paragraphs 48-51, wherein the sample is a brain homogenate.
53. The method of any one of paragraphs 48-51, wherein the sample is a purified aqueous solution comprising the misfolding-prone or the aggregating-prone protein.
54. The method of any one of paragraphs 48-51, wherein the sample comprises a blood, a serum, a cerebrospinal fluid, a plasma, or a brain interstitial fluid obtained from a subject.

55. The method of any one of paragraphs 48-54, further comprising contacting the sample with a fluorescent probe.
56. The method of paragraph 55, wherein the fluorescent probe is capable of non-covalently binding to the misfolding-prone or the aggregating-prone protein.
57. The method of paragraph 56, wherein the non-covalent binding of the fluorescent probe to the misfolding-prone or the aggregating-prone protein comprises hydrogen bonding, electrostatic effects, π-effects, hydrophobic interactions, Van der Waals forces, or any combination thereof
58. The method of any one of paragraphs 55-57, wherein the binding of the fluorescent probe to the misfolding-prone or the aggregating-prone protein leads to amplification of intensity of fluorescent signal of the fluorescent probe.
59. The method of any one of paragraphs 55-57, wherein contacting the sample with the fluorescent probe leads to the amplification of the detected signal through chemiluminescence resonance energy transfer (CRET).
60. The method of paragraph 59, wherein contacting the sample with the compound of Formula (I) and the fluorescent probe is carried out such that there is an overlap of luminescent emission spectrum of moiety A of the compound of Formula (I) and the excitation spectrum of the fluorescent probe.
61. The method of any one of paragraphs 55-60, wherein the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.
62. The method of any one of paragraphs 55-61, wherein the fluorescent probe is selected from a compound of any one of the following Formulae:

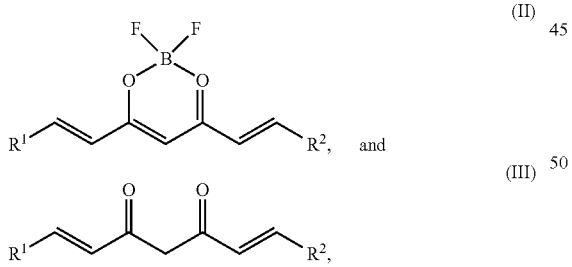

or a pharmaceutically acceptable salt thereof, wherein:
each $R^1$ and $R^2$ is independently selected from $C_{6-12}$ aryl and 5-10-membered heteroaryl, each of which is optionally substituted with 1, 2, or 3 substituents independently selected from amino, $C_{1-3}$ alkylamino, di($C_{1-3}$ alkyl)amino, $C_{1-3}$ alkyl, $C_{1-3}$ alkoxy, halo, CN, $NO_2$, $C_{6-12}$ aryl, and 5-10-membered heteroaryl.
63. The method of any one of paragraphs 55-62, wherein the fluorescent probe is selected from CRANAD-2, CRANAD-3, CRANAD-17, CRANAD-28, CRANAD-30, CRANAD-44, CRANAD-58, CRANAD-88, and CRANAD-102.
64. The method of any one of paragraphs 55-62, wherein the fluorescent probe is selected from CRANAD-2, CRANAD-3, CRANAD-30, CRANAD-58, CRANAD-88, and CRANAD-102.
65. The method of any one of paragraphs 55-62, wherein the fluorescent probe is a CRANAD-3 compound of formula:

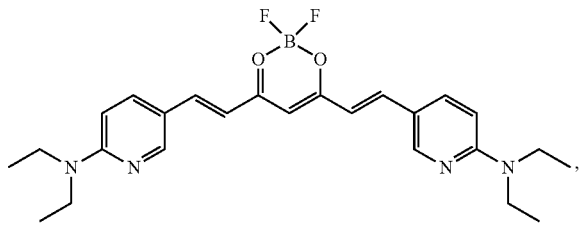

or a pharmaceutically acceptable salt thereof.
66. The method of any one of paragraphs 48-65, wherein the detecting comprises detecting a fluorescence or a luminescence in the sample by an imaging technique.
67. The method of paragraph 66, wherein the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy.
68. The method of any one of paragraphs 48-67, wherein the misfolding-prone or the aggregating-prone protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).
69. The method of any one of paragraphs 48-67, wherein the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.
70. The method of paragraph 69, wherein the amyloid beta (Aβ) protein is selected from $Aβ_{40}$ and $Aβ_{42}$.
71. The method of any one of paragraphs 48-70, wherein the misfolding-prone or the aggregating-prone protein is in the misfolded or the aggregated state.
72. The method of paragraph 71, wherein the protein is amyloid beta (Aβ) protein in a form of aggregates or plaques.
73. The method of any one of paragraphs 48-72, wherein the misfolding-prone or the aggregating-prone protein comprises hydrophobic beta-sheets capable of non-covalently binding the moiety B of the compound of Formula (I) and/or the fluorescent probe as recited in paragraphs 61-65.
74. A method of determining concentration of a misfolding-prone or an aggregating-prone protein in a sample, the method comprising contacting the sample with an effective amount of a compound of any one of paragraphs 1-28, or a pharmaceutically acceptable salt thereof, or a composition of any one of paragraphs 29-47.
75. The method of paragraph 74, wherein the method is carried out in vitro or ex vivo.

76. The method of paragraph 74 or 75, wherein the sample is a brain homogenate.
77. The method of paragraph 74 or 75, wherein the sample is a purified aqueous solution comprising the misfolding-prone or the aggregating-prone protein.
78. The method of paragraph 74 or 75, wherein the sample comprises a blood, a serum, a cerebrospinal fluid, a plasma, or a brain interstitial fluid obtained from a subject.
79. The method of any one of paragraphs 74-78, further comprising contacting the sample with a fluorescent probe.
80. The method of paragraph 79, wherein the fluorescent probe is capable of non-covalently binding to the misfolding-prone or the aggregating-prone protein.
81. The method of paragraph 80, wherein the non-covalent binding of the fluorescent probe to the misfolding-prone or the aggregating-prone protein comprises hydrogen bonding, electrostatic effects, π-effects, hydrophobic interactions, Van der Waals forces, or any combination thereof
82. The method of any one of paragraphs 79-81, wherein the binding of the fluorescent probe to the misfolding-prone or the aggregating-prone protein leads to amplification of intensity of fluorescent signal of the fluorescent probe.
83. The method of any one of paragraphs 79-82, wherein contacting the sample with the fluorescent probe leads to the amplification of the detected signal through chemiluminescence resonance energy transfer (CRET).
84. The method of any one of paragraphs 79-83, wherein contacting the sample with the compound of Formula (I) and the fluorescent probe is carried out such that there is an overlap of luminescent emission spectrum of moiety A of the compound of Formula (I) and the excitation spectrum of the fluorescent probe.
85. The method of any one of paragraphs 74-84, wherein the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.
86. The method of any one of paragraphs 74-85, wherein the fluorescent probe is selected from a compound of any one of the following Formulae

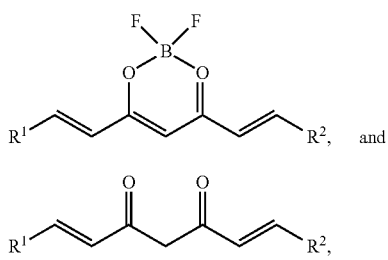

or a pharmaceutically acceptable salt thereof, wherein: each $R^1$ and $R^2$ is independently selected from $C_{6-12}$ aryl and 5-10-membered heteroaryl, each of which is optionally substituted with 1, 2, or 3 substituents independently selected from amino, $C_{1-3}$ alkylamino, di($C_{1-3}$ alkyl)amino, $C_{1-3}$ alkyl, $C_{1-3}$ alkoxy, halo, CN, $NO_2$, $C_{6-12}$ aryl, and 5-10-membered heteroaryl.
87. The method of any one of paragraphs 74-86, wherein the fluorescent probe is selected from CRANAD-2, CRANAD-3, CRANAD-17, CRANAD-28, CRANAD-30, CRANAD-44, CRANAD-58, CRANAD-88, and CRANAD-102.
88. The method of any one of paragraphs 74-86, wherein the fluorescent probe is selected from CRANAD-2, CRANAD-3, CRANAD-30, CRANAD-58, CRANAD-88, and CRANAD-102.
89. The method of any one of paragraphs 74-88, wherein the fluorescent probe is a CRANAD-3 compound of formula:

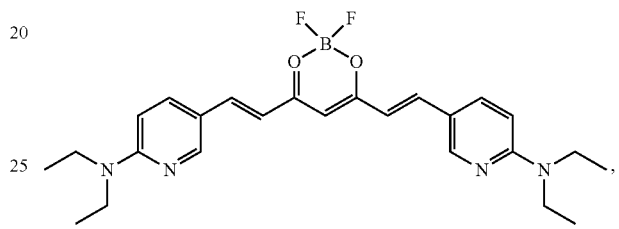

or a pharmaceutically acceptable salt thereof.
90. The method of any one of paragraphs 74-89, wherein determining the concentration of the misfolding-prone or the aggregating-prone protein comprises detecting a fluorescence or a luminescence in the sample by an imaging technique.
91. The method of paragraph 90, wherein an intensity of the fluorescence or the luminescence in the sample is correlated with the concentration of the misfolding-prone or the aggregating-prone protein in the sample.
92. The method of paragraph 90 or 91, wherein the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy.
93. The method of any one of paragraphs 74-92, wherein the misfolding-prone or the aggregating-prone protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).
94. The method of any one of paragraphs 74-92, wherein the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.
95. The method of paragraph 94, wherein the amyloid beta (Aβ) protein is selected from $Aβ_{40}$ and $Aβ_{42}$.
96. The method of any one of paragraphs 74-95, wherein the misfolding-prone or the aggregating-prone protein is in the misfolded or the aggregated state.
97. The method of paragraph 96, wherein the protein is amyloid beta (Aβ) protein in a form of aggregates or plaques.

98. The method of any one of paragraphs 74-97, wherein the misfolding-prone or the aggregating-prone protein comprises hydrophobic beta-sheets capable of non-covalently binding the moiety B of the compound of Formula (I) and/or the fluorescent probe as recited in paragraphs 85-89.
99. A method of imaging an organ or tissue comprising a misfolding-prone or an aggregating-prone protein of a subject, the method comprising:
i) administering to the subject an effective amount of a compound of any one of paragraphs 1-28, or a pharmaceutically acceptable salt thereof, or a composition of any one of paragraphs 29-47;
ii) waiting a time sufficient to allow the compound to accumulate in the organ or tissue to be imaged; and
iii) imaging the organ or tissue with an imaging technique.
100. The method of paragraph 99, wherein the organ or tissue is selected from skin, eyes, and nose.
101. The method of paragraph 99, wherein the organ or tissue is a brain.
102. The method of any one of paragraphs 99-101, further comprising:
i) administering to the subject an effective amount of a fluorescent probe; and
ii) waiting a time sufficient to allow the fluorescent probe to accumulate in the organ or tissue to be imaged.
103. The method of paragraph 102, wherein the compound of Formula (I), or a pharmaceutically acceptable salt thereof, and the fluorescent probe, are administered to the subject simultaneously.
104. The method of paragraph 103, wherein the compound of Formula (I), or a pharmaceutically acceptable salt thereof, and the fluorescent probe, are administered to the subject in the same dosage form.
105. The method of paragraph 103, wherein the compound of Formula (I), or a pharmaceutically acceptable salt thereof, and the fluorescent probe, are administered to the subject in separate dosage forms.
106. The method of paragraph 102, wherein the compound of Formula (I), or a pharmaceutically acceptable salt thereof, and the fluorescent probe, are administered to the subject consecutively.
107. The method of any one of paragraphs 102-106, wherein the fluorescent probe is capable of non-covalently binding to the misfolding-prone or the aggregating-prone protein.
108. The method of paragraph 107, wherein the non-covalent binding of the fluorescent probe to the misfolding-prone or the aggregating-prone protein comprises hydrogen bonding, electrostatic effects, π-effects, hydrophobic interactions, Van der Waals forces, or any combination thereof
109. The method of 107 or 108, wherein the binding of the fluorescent probe to the misfolding-prone or the aggregating-prone protein leads to amplification of intensity of fluorescent signal of the fluorescent probe.
110. The method of any one of paragraphs 102-109, wherein contacting the sample with the fluorescent probe leads to the amplification of the detected signal through chemiluminescence resonance energy transfer (CRET).
111. The method of any one of paragraphs 102-110, wherein the imaging is carried out such that there is an overlap of luminescent emission spectrum of moiety A of the compound of Formula (I) and the excitation spectrum of the fluorescent probe.
112. The method of any one of paragraphs 102-111, wherein the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.
113. The method of any one of paragraphs 102-112, wherein the fluorescent probe is selected from a compound of any one of the following Formulae:

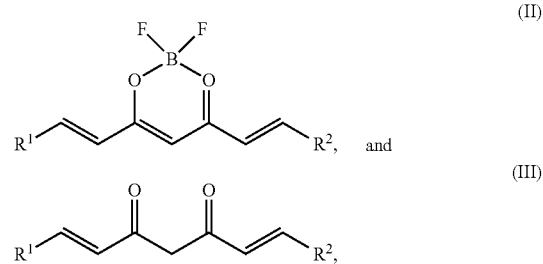

or a pharmaceutically acceptable salt thereof, wherein:
each $R^1$ and $R^2$ is independently selected from $C_{6-12}$ aryl and 5-10-membered heteroaryl, each of which is optionally substituted with 1, 2, or 3 substituents independently selected from amino, $C_{1-3}$ alkylamino, di($C_{1-3}$ alkyl)amino, $C_{1-3}$ alkyl, $C_{1-3}$ alkoxy, halo, CN, $NO_2$, $C_{6-12}$ aryl, and 5-10-membered heteroaryl.
114. The method of paragraph 113, wherein the fluorescent probe is selected from CRANAD-2, CRANAD-3, CRANAD-17, CRANAD-28, CRANAD-30, CRANAD-44, CRANAD-58, CRANAD-88, and CRANAD-102.
115. The method of paragraph 113, wherein the fluorescent probe is selected from CRANAD-2, CRANAD-3, CRANAD-30, CRANAD-58, CRANAD-88, and CRANAD-102.
116. The method of paragraph 113, wherein the fluorescent probe is a CRANAD-3 compound of formula:

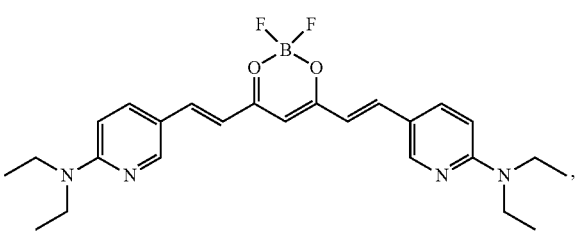

or a pharmaceutically acceptable salt thereof.
117. The method of any one of paragraphs 99-116, wherein the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy.

118. The method of any one of paragraph 99-117, wherein the misfolding-prone or the aggregating-prone protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

119. The method of paragraph 118, wherein the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.

120. The method of paragraph 119, wherein the amyloid beta (Aβ) protein is selected from $Aβ_{40}$ and $Aβ_{42}$.

121. The method of any one of paragraphs 99-120, wherein the misfolding-prone or the aggregating-prone protein is in the misfolded or the aggregated state. 122. The method of paragraph 121, wherein the protein is amyloid beta (Aβ) protein in a form of aggregates or plaques.

123. The method of any one of paragraphs 99-122, wherein the misfolding-prone or the aggregating-prone protein comprises hydrophobic beta-sheets capable of non-covalently binding the moiety B of the compound of Formula (I) and/or the fluorescent probe as recited in paragraphs 112-116.

124. A method of diagnosing a disease or condition in which a misfolding-prone or an aggregating-prone protein is implicated in a subject, the method comprising:
i) administering to the subject an effective amount of a compound of any one of paragraphs 1-28, or a pharmaceutically acceptable salt thereof, or a composition of any one of paragraphs 29-47;
ii) waiting a time sufficient to allow the compound to accumulate in a tissue or a cell site associated with disorder or condition; and
iii) imaging the cell site or the tissue with an imaging technique.

125. The method of paragraph 124, wherein the disease or condition in which a misfolding-prone or an aggregating-prone protein is implicated is a neurological or a neurodegenerative disorder.

126. The method of paragraph 124, wherein the neurological or the neurodegenerative disorder is selected from the group consisting of Alzheimer's disease (AD) (familial or sporadic), Parkinson's disease (PD), Huntington's Disease (HD), motor neuron disease (MND), Prion disease (including rare sporadic prion disease), variably protease-sensitive prionopathy, cerebral amyloid angiopathy, vascular cognitive impairment (VCI), dementia, dementia with Lewy bodies, frontotemporal dementia (FTD), amyotrophic lateral sclerosis (ALS), multiple sclerosis, hippocampal sclerosis, Binswanger's disease, Creutzfeldt-Jakob disease, Gerstmann-Sträussler-Scheinker syndrome, and serpinopathy.

127. The method of paragraph 124, wherein the neurological or the neurodegenerative disorder is selected from the group consisting of Alzheimer's disease (AD), Parkinson's disease (PD), Huntington's Disease (HD), motor neuron disease (MND), Prion disease, cerebral amyloid angiopathy, vascular cognitive impairment (VCI), dementia, dementia with Lewy bodies, frontotemporal dementia (FTD), amyotrophic lateral sclerosis (ALS), multiple sclerosis, hippocampal sclerosis, Binswanger's disease, and Creutzfeldt-Jakob disease.

128. The method of any one of paragraphs 124-127, further comprising:
i) administering to the subject an effective amount of a fluorescent probe; and
ii) waiting a time sufficient to allow the fluorescent probe to accumulate the tissue or the cell site associated with the disorder or condition.

129. The method of paragraph 128, wherein the compound of Formula (I), or a pharmaceutically acceptable salt thereof, and the fluorescent probe, are administered to the subject simultaneously.

130. The method of paragraph 129, wherein the compound of Formula (I), or a pharmaceutically acceptable salt thereof, and the fluorescent probe, are administered to the subject in the same dosage form.

131. The method of paragraph 128, wherein the compound of Formula (I), or a pharmaceutically acceptable salt thereof, and the fluorescent probe, are administered to the subject in separate dosage forms.

132. The method of paragraph 128, wherein the compound of Formula (I), or a pharmaceutically acceptable salt thereof, and the fluorescent probe, are administered to the subject consecutively.

133. The method of any one of paragraphs 124-132, wherein the fluorescent probe is capable of non-covalently binding to the misfolding-prone or the aggregating-prone protein.

134. The method of paragraph 133, wherein the non-covalent binding of the fluorescent probe to the misfolding-prone or the aggregating-prone protein comprises hydrogen bonding, electrostatic effects, π-effects, hydrophobic interactions, Van der Waals forces, or any combination thereof 135. The method of any one of paragraphs 128-134, wherein the binding of the fluorescent probe to the misfolding-prone or the aggregating-prone protein leads to amplification of intensity of fluorescent signal of the fluorescent probe.

136. The method of any one of paragraphs 128-135, wherein contacting the sample with the fluorescent probe leads to the amplification of the detected signal through chemiluminescence resonance energy transfer (CRET).

137. The method of any one of paragraphs 128-136, wherein contacting the sample with the compound of Formula (I) and the fluorescent probe is carried out such that there is an overlap of luminescent emission spectrum of moiety A of the compound of Formula (I) and the excitation spectrum of the fluorescent probe.

138. The method of any one of paragraphs 128-136, wherein the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.

139. The method of any one of paragraphs 128-138, wherein the fluorescent probe is selected from a compound of any one of the following Formulae

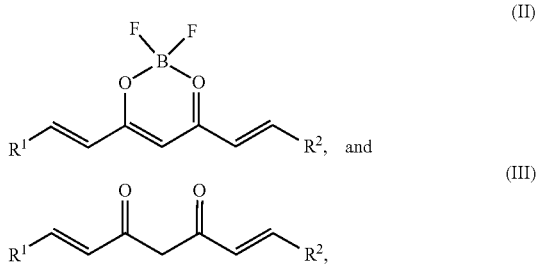

or a pharmaceutically acceptable salt thereof, wherein:
each $R^1$ and $R^2$ is independently selected from $C_{6-12}$ aryl and 5-10-membered heteroaryl, each of which is optionally substituted with 1, 2, or 3 substituents independently selected from amino, $C_{1-3}$ alkylamino, di($C_{1-3}$ alkyl)amino, $C_{1-3}$ alkyl, $C_{1-3}$ alkoxy, halo, CN, $NO_2$, $C_{6-12}$ aryl, and 5-10-membered heteroaryl.

140. The method of paragraph 139, wherein the fluorescent probe is selected from CRANAD-2, CRANAD-3, CRANAD-17, CRANAD-28, CRANAD-30, CRANAD-44, CRANAD-58, CRANAD-88, and CRANAD-102.

141. The method of paragraph 139, wherein the fluorescent probe is selected from CRANAD-2, CRANAD-3, CRANAD-30, CRANAD-58, CRANAD-88, and CRANAD-102.

142. The method of paragraph 141, wherein the fluorescent probe is a CRANAD-3 compound of formula:

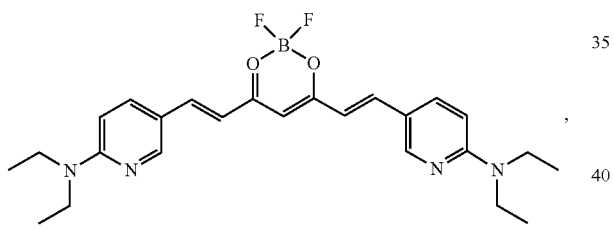

or a pharmaceutically acceptable salt thereof.

143. The method of any one of paragraphs 124-142, wherein the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy.

144. The method of any one of paragraphs 124-143, wherein the misfolding-prone or the aggregating-prone protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

145. The method of any one of paragraphs 124-144, wherein the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.

146. The method of paragraph 145, wherein the amyloid beta (Aβ) protein is selected from $Aβ_{40}$ and $Aβ_{42}$.

147. The method of any one of paragraphs 124-146, wherein the misfolding-prone or the aggregating-prone protein is in the misfolded or the aggregated state.

148. The method of paragraph 147, wherein the protein is amyloid beta (Aβ) protein in a form of aggregates or plaques.

149. The method of any one of paragraphs 124-148, wherein the misfolding-prone or the aggregating-prone protein comprises hydrophobic beta-sheets capable of non-covalently binding the moiety B of the compound of Formula (I) and/or the fluorescent probe as recited in paragraphs 138-142.

150. A method of diagnosing a disease or condition in which a misfolding-prone or an aggregating-prone peptide or protein is implicated in a subject, the method comprising:
i) contacting a sample comprising a blood, a serum, a cerebrospinal fluid, a plasma, or a brain interstitial fluid obtained from a subject with an effective amount of a compound of any one of paragraphs 1-28, or a pharmaceutically acceptable salt thereof, or a composition of any one of paragraphs 29-47.

151. A method of diagnosing a disease or condition characterized by accumulation of misfolding-prone or aggregation-prone peptides or proteins in a blood of a subject, the method comprising
i) contacting a sample comprising a blood, a serum, a cerebrospinal fluid, a plasma, or a brain interstitial fluid obtained from a subject with an effective amount of a compound of any one of paragraphs 1-28, or a pharmaceutically acceptable salt thereof, or a composition of any one of paragraphs 29-47.

152. The method of paragraph 150 or 151, further comprising contacting the sample with a fluorescent probe.

153. The method of paragraph 152, wherein the fluorescent probe is capable of non-covalently binding to the misfolding-prone or the aggregating-prone protein.

154. The method of paragraph 153, wherein the non-covalent binding of the fluorescent probe to the misfolding-prone or the aggregating-prone protein comprises hydrogen bonding, electrostatic effects, π-effects, hydrophobic interactions, Van der Waals forces, or any combination thereof 155. The method of any one of paragraphs 152-154, wherein the binding of the fluorescent probe to the misfolding-prone or the aggregating-prone protein leads to amplification of intensity of fluorescent signal of the fluorescent probe.

156. The method of any one of paragraphs 152-155, wherein contacting the sample with the fluorescent probe leads to the amplification of the detected signal through chemiluminescence resonance energy transfer (CRET).

157. The method of any one of paragraphs 152-156, wherein contacting the sample with the compound of Formula (I) and the fluorescent probe is carried out such that there is an overlap of luminescent emission spectrum of moiety A of the compound of Formula (I) and the excitation spectrum of the fluorescent probe.

158. The method of any one of paragraphs 152-157, wherein the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.

159. The method of any one of paragraphs 152-158, wherein the fluorescent probe is selected from a compound of any one of the following Formulae

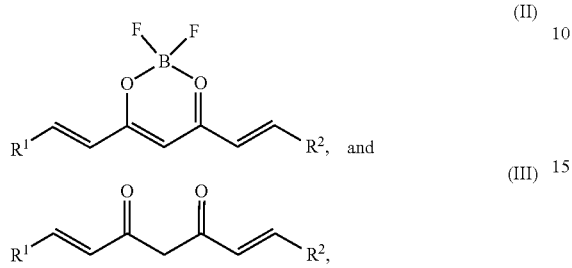

or a pharmaceutically acceptable salt thereof, wherein:
each $R^1$ and $R^2$ is independently selected from $C_{6-12}$ aryl and 5-10-membered heteroaryl, each of which is optionally substituted with 1, 2, or 3 substituents independently selected from amino, $C_{1-3}$ alkylamino, di($C_{1-3}$ alkyl)amino, $C_{1-3}$ alkyl, $C_{1-3}$ alkoxy, halo, CN, $NO_2$, $C_{6-12}$ aryl, and 5-10-membered heteroaryl.

160. The method of paragraph 159, wherein the fluorescent probe is selected from CRANAD-2, CRANAD-3, CRANAD-17, CRANAD-28, CRANAD-30, CRANAD-44, CRANAD-58, CRANAD-88, and CRANAD-102.

161. The method of paragraph 159, wherein the fluorescent probe is selected from CRANAD-2, CRANAD-3, CRANAD-30, CRANAD-58, CRANAD-88, and CRANAD-102.

162. The method of paragraph 159, wherein the fluorescent probe is a CRANAD-3 compound of formula:

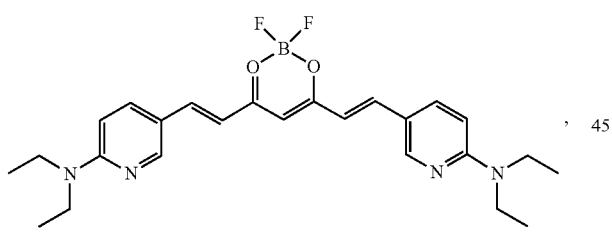

or a pharmaceutically acceptable salt thereof.

163. The method of paragraph 150 or 151, further comprising detecting a chemiluminescence emission of the compound of Formula (I) from the sample.

164. The method of any one of paragraphs 152-162, further comprising detecting a fluorescence emission of the fluorescent probe from the sample.

165. The method of paragraph 163 or 164, wherein said detecting is indicative of a presence of a misfolding-prone or an aggregating-prone peptide or protein in a blood, a serum, a cerebrospinal fluid, a plasma, or a brain interstitial fluid of the subject.

166. The method of any one of paragraph 150-165, wherein the misfolding-prone or the aggregating-prone protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

167. The method of paragraph 166, wherein the amyloid beta (Aβ) protein is selected from $Aβ_{40}$ and $Aβ_{42}$.

168. The method of any one of paragraphs 150-167, wherein the misfolding-prone or the aggregating-prone protein is in the misfolded or the aggregated state.

169. The method of paragraph 168, wherein the protein is amyloid beta (Aβ) protein in a form of aggregates or plaques.

170. The method of any one of paragraphs 150-169, wherein the misfolding-prone or the aggregating-prone protein comprises hydrophobic beta-sheets capable of non-covalently binding the moiety B of the compound of Formula (I) and/or the fluorescent probe as recited in paragraphs 158-162.

171. The method of any one of paragraphs 150-170, wherein the disease or condition is a neurological or the neurodegenerative disorder.

172. The method of paragraph 171, wherein the neurological or the neurodegenerative disorder is selected from the group consisting of Alzheimer's disease (AD) (familial or sporadic), Parkinson's disease (PD), Huntington's Disease (HD), motor neuron disease (MND), Prion disease (including rare sporadic prion disease), variably protease-sensitive prionopathy, cerebral amyloid angiopathy, vascular cognitive impairment (VCI), dementia, dementia with Lewy bodies, frontotemporal dementia (FTD), amyotrophic lateral sclerosis (ALS), multiple sclerosis, hippocampal sclerosis, Binswanger's disease, Creutzfeldt-Jakob disease, Gerstmann-Sträussler-Scheinker syndrome, and serpinopathy.

173. The method of any one of paragraphs 150-170, wherein the disease or condition is a chronic disease or conditions.

174. The method of paragraph 173, wherein the chronic disease or condition is selected from diabetes, multiple sclerosis, pulmonary fibrosis, arthritis, rheumatoid arthritis, cystic fibrosis, osteoporosis, asthma, and cancer.

175. A method of monitoring treatment of a disease or condition in which a misfolding-prone or an aggregating-prone protein is implicated in a subject, the method comprising:
i) administering to the subject an effective amount of a compound of any one of paragraphs 1-28, or a pharmaceutically acceptable salt thereof, or a composition of any one of paragraphs 29-47;
ii) waiting a time sufficient to allow the compound to accumulate in a cell site or a tissue associated with the disease or condition;
iii) imaging the cell site or the tissue with an imaging technique;
iv) administering to the subject a therapeutic agent in an effective amount to treat the disease or condition;
v) after iv), administering to the subject an effective amount of a compound any one of paragraphs 1-28, or a pharmaceutically acceptable salt thereof, or a composition of any one of paragraphs 29-47;
vi) waiting a time sufficient to allow the compound to accumulate in the cell site or the tissue associated with the disease or condition;
vii) imaging the cell site or the tissue with an imaging technique; and viii) comparing the image of step iii) and the image of step vii).

176. The method of paragraph 175, wherein the cell site or the tissue is a brain.

177. The method of paragraph 175 or 176, wherein the disease or condition in which a misfolding-prone or an aggregating-prone protein is implicated is a neurological or a neurodegenerative disorder.

178. The method of paragraph 177, wherein the neurological or the neurodegenerative disorder is selected from the group consisting of Alzheimer's disease (AD) (familial or sporadic), Parkinson's disease (PD), Huntington's Disease (HD), motor neuron disease (MND), Prion disease (including rare sporadic prion disease), variably protease-sensitive prionopathy, cerebral amyloid angiopathy, vascular cognitive impairment (VCI), dementia, dementia with Lewy bodies, frontotemporal dementia (FTD), amyotrophic lateral sclerosis (ALS), multiple sclerosis, hippocampal sclerosis, Binswanger's disease, Creutzfeldt-Jakob disease, Gerstmann-Sträussler-Scheinker syndrome, and serpinopathy.

179. The method of paragraph 177, wherein the neurological or the neurodegenerative disorder is selected from the group consisting of Alzheimer's disease (AD), Parkinson's disease (PD), Huntington's Disease (HD), motor neuron disease (MND), Prion disease, cerebral amyloid angiopathy, vascular cognitive impairment (VCI), dementia, dementia with Lewy bodies, frontotemporal dementia (FTD), amyotrophic lateral sclerosis (ALS), multiple sclerosis, hippocampal sclerosis, Binswanger's disease, and Creutzfeldt-Jakob disease.

180. The method of any one of paragraphs 175-179, further comprising:
i) administering to the subject an effective amount of a fluorescent probe; and
ii) waiting a time sufficient to allow the fluorescent probe to accumulate at the cell site or the tissue associated with the disease or condition.

181. The method of paragraph 180, wherein the compound of Formula (I), or a pharmaceutically acceptable salt thereof, and the fluorescent probe, are administered to the subject simultaneously.

182. The method of paragraph 181, wherein the compound of Formula (I), or a pharmaceutically acceptable salt thereof, and the fluorescent probe, are administered to the subject in the same dosage form.

183. The method of paragraph 181, wherein the compound of Formula (I), or a pharmaceutically acceptable salt thereof, and the fluorescent probe, are administered to the subject in separate dosage forms.

184. The method of paragraph 180, wherein the compound of Formula (I), or a pharmaceutically acceptable salt thereof, and the fluorescent probe, are administered to the subject consecutively.

185. The method of any one of paragraphs 180-184, wherein the fluorescent probe is capable of non-covalently binding to the misfolding-prone or the aggregating-prone protein.

186. The method of paragraph 185, wherein the non-covalent binding of the fluorescent probe to the misfolding-prone or the aggregating-prone protein comprises hydrogen bonding, electrostatic effects, π-effects, hydrophobic interactions, Van der Waals forces, or any combination thereof.

187. The method of any one of paragraphs 180-186, wherein the binding of the fluorescent probe to the misfolding-prone or the aggregating-prone protein leads to amplification of intensity of fluorescent signal of the fluorescent probe.

188. The method of any one of paragraphs 180-186, wherein contacting the sample with the fluorescent probe leads to the amplification of the detected signal through chemiluminescence resonance energy transfer (CRET).

189. The method of any one of paragraphs 180-188, wherein contacting the sample with the compound of Formula (I) and the fluorescent probe is carried out such that there is an overlap of luminescent emission spectrum of moiety A of the compound of Formula (I) and the excitation spectrum of the fluorescent probe.

190. The method of any one of paragraphs 180-188, wherein the fluorescent probe is any one of the fluorescent probes described in NATURE BIOMEDICAL ENGINEERING 1, 0010 (2017), Sensors, 2016, 16(9), 1488, Front Neural Circuits, 2013, 7, 163, Curr Med Chem, 2018, 25 (23), 2736-2759, Journal of Analytical Methods in Chemistry, 2018, Article ID 1651989, Sci Rep, 9, 12052 (2019), Acta Pharm Sin B, 2015, 5(1), 25-33, PNAS, 2015, 112 (31), 9734-9739, and Scientific Reports, 6, 35613, all of which are incorporated herein by reference in their entirety.

191. The method of any one of paragraphs 180-188, wherein the fluorescent probe is selected from a compound of any one of the following Formulae

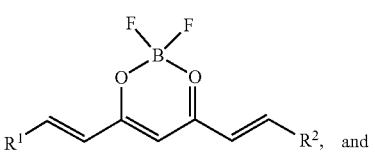

(II)

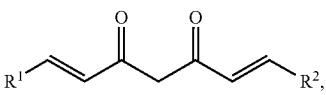

(III)

or a pharmaceutically acceptable salt thereof, wherein:
each $R^1$ and $R^2$ is independently selected from $C_{6-12}$ aryl and 5-10-membered heteroaryl, each of which is optionally substituted with 1, 2, or 3 substituents independently selected from amino, $C_{1-3}$ alkylamino, di($C_{1-3}$ alkyl)amino, $C_{1-3}$ alkyl, $C_{1-3}$ alkoxy, halo, CN, $NO_2$, $C_{6-12}$ aryl, and 5-10-membered heteroaryl.

192. The method of paragraph 191, wherein the fluorescent probe is selected from CRANAD-2, CRANAD-3, CRANAD-17, CRANAD-28, CRANAD-30, CRANAD-44, CRANAD-58, CRANAD-88, and CRANAD-102.

193. The method of any one of paragraphs 180-192, wherein the fluorescent probe is selected from CRANAD-2, CRANAD-3, CRANAD-30, CRANAD-58, CRANAD-88, and CRANAD-102.

194. The method of paragraph 193, wherein the fluorescent probe is a CRANAD-3 compound of formula:

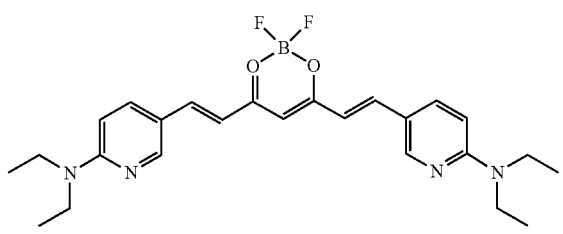

or a pharmaceutically acceptable salt thereof.

195. The method of any one of paragraphs 175-194, wherein the imaging technique is selected from two-photon microscopic imaging, fluorescent imaging, 2D optical or 3D optical tomography, tomographic technologies comprising MR, CT or PET, two-photon excitation microscopy, confocal microscopy, and confocal laser scanning microscopy.

196. The method of any one of paragraphs 175-195, wherein the misfolding-prone or the aggregating-prone protein is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

197. The method of any one of paragraphs 175-195, wherein the misfolding-prone or the aggregating-prone protein is selected from amyloid beta (Aβ), tau, an alpha-synuclein, TDP-43, amylin, fibrinogen, prion, fused in sarcoma (FUS) protein, SOD and transthyretin.

198. The method of paragraph 197, wherein the amyloid beta (Aβ) protein is selected from $A\beta_{40}$ and $A\beta_{42}$.

199. The method of any one of paragraphs 175-198, wherein the misfolding-prone or the aggregating-prone protein is in the misfolded or the aggregated state.

200. The method of paragraph 199, wherein the protein is amyloid beta (Aβ) protein in a form of aggregates or plaques.

201. The method of any one of paragraphs 175-200, wherein the misfolding-prone or the aggregating-prone protein comprises hydrophobic beta-sheets capable of non-covalently binding the moiety B of the compound of Formula (I) and/or the fluorescent probe as recited in paragraphs 190-194.

Other Embodiments

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:

1. The compound of Formula (I):

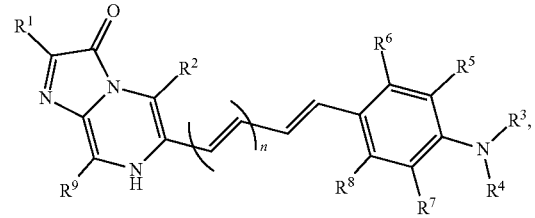

wherein:
n is an integer from 1 to 6;
$R^1$ is $C_{1-3}$ alkyl;
$R^2$ and $R^9$ are each independently selected from H and $C_{1-3}$ alkyl;
$R^3$ and $R^4$ are each individually a $C_{1-3}$ alkyl; and
$R^5$, $R^6$, $R^7$, and $R^8$ are each independently selected from H, halo, CN, $NO_2$, $C_{1-3}$ alkyl, and $C_{1-3}$ alkoxy.

2. The compound of claim 1, wherein, $R^5$, $R^6$, $R^7$, and $R^8$ are each independently selected from H and $C_{1-3}$ alkyl.

3. The compound of claim 1, wherein the compound of Formula (I) is selected from any one of the following compounds:

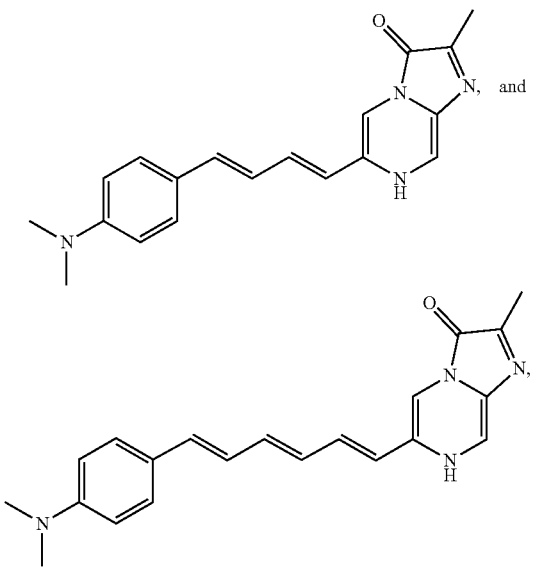

or a pharmaceutically acceptable salt thereof.

4. The compound of claim 1, wherein the compound non-covalently binds to a misfolding-prone or aggregating prone which is selected from amyloid beta (Aβ), tau, an alpha-synuclein, TDP-43, amylin, fibrinogen, prion, fused in sarcoma (FUS) protein, superoxide dismutase (SOD), transthyretin, Aβ peptide, polyglutamine (PolyQ), serum amyloid A, serpin, immunoglobulin G (IgG), proinsulin, insulin, and apolipoprotein A-I (APO).

5. The compound of claim 1, wherein the compound non-covalently binds to a misfolding-prone or an aggregating-prone protein that comprises hydrophobic beta sheets.

6. A composition comprising a compound of claim 1, or a pharmaceutically acceptable salt thereof, and a pharmaceutically acceptable carrier.

7. The composition of claim 6, further comprising a fluorescent probe.
8. The compound of claim 1, wherein the compound of Formula (I) is the following compound
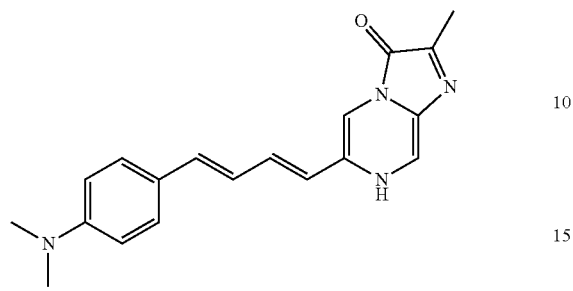
or a pharmaceutically acceptable salt thereof.
* * * * *